United States Patent
Bhargava et al.

(10) Patent No.: US 11,143,672 B2
(45) Date of Patent: Oct. 12, 2021

(54) METHOD AND APPARATUS FOR CORRECTING RESPONSIVITY VARIATION IN PHOTOTHERMAL IMAGING

(71) Applicant: The Board of Trustees of the University of Illinois, Urbana, IL (US)

(72) Inventors: Rohit Bhargava, Urbana, IL (US); Seth Kenkel, East Dubuque, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/910,495

(22) Filed: Jun. 24, 2020

(65) Prior Publication Data
US 2020/0408806 A1    Dec. 31, 2020

Related U.S. Application Data

(60) Provisional application No. 62/866,098, filed on Jun. 25, 2019.

(51) Int. Cl.
| | |
|---|---|
| *G01Q 20/02* | (2010.01) |
| *G01Q 60/38* | (2010.01) |
| *G01Q 60/24* | (2010.01) |

(52) U.S. Cl.
CPC ............. *G01Q 20/02* (2013.01); *G01Q 60/38* (2013.01); *G01Q 60/24* (2013.01)

(58) Field of Classification Search
CPC ......... G01Q 20/02; G01Q 60/38; G01Q 60/24
(Continued)

(56) References Cited

U.S. PATENT DOCUMENTS

| | | | | |
|---|---|---|---|---|
| 2003/0081651 A1* | 5/2003 | Gianchandani | ........ | G01K 7/028 374/185 |
| 2011/0055986 A1* | 3/2011 | Torun | ..................... | B82Y 35/00 850/33 |

(Continued)

OTHER PUBLICATIONS

Ambrosio et al., "Observation of Nanoscale Refractive Index Contrast via Photoinduced Force Microscopy," *ACS Photonics* 2017, 4 (4), pp. 846-851.

(Continued)

*Primary Examiner* — Nicole M Ippolito
(74) *Attorney, Agent, or Firm* — Crowell & Moring LLP

(57) ABSTRACT

The disclosure is directed to a method and apparatus for correcting responsivity variation in photothermal imaging. The method includes sending, during a first time period, light-driving signal to a light source so that the light source is configured to output a series of light pulses onto a sample, wherein the sample is under photothermal-induced expansion according to the series of light pulses. The method includes obtaining, during the first time period, first deflection signal from a cantilever. The method includes sending, during a second time period, actuator-driving signal to an electromechanical actuator so that the electromechanical actuator is configured to move according to the actuator-driving signal, wherein the electromechanical actuator is coupled with the sample. The method includes obtaining, during the second time period, second deflection signal from the cantilever and obtaining a photothermal image of the sample based on the first deflection signal and the second deflection signal.

20 Claims, 26 Drawing Sheets
(22 of 26 Drawing Sheet(s) Filed in Color)

(58) Field of Classification Search
USPC .............................................. 850/5, 6, 7, 33
See application file for complete search history.

(56) References Cited

U.S. PATENT DOCUMENTS

| | | | | |
|---|---|---|---|---|
| 2012/0260374 A1* | 10/2012 | Mcconney | ............. | B82Y 35/00 850/1 |
| 2015/0247881 A1* | 9/2015 | Su | ........................ | G01Q 30/06 850/1 |
| 2019/0094265 A1* | 3/2019 | Sahin | .................... | G01Q 10/065 |

OTHER PUBLICATIONS

Ambrosio et al., "Mechanical Detection and Imaging of Hyperbolic Phonon Polaritons in Hexagonal Boron Nitride," *ACS Nano*, 11(9), pp. 8741-8746 (2017).

Amenabar, et al., "Structural analysis and mapping of individual protein complexes by infrared nanospectroscopy," *Nature Communications*, 4, pp. 2890-2890 (2013).

Anderson, "Locally enhanced Raman spectroscopy with an atomic force microscope" *Applied Physics Letters* 76(31), pp. 3130-3132 (2000).

Babicheva, "Near-field edge fringes at sharp material boundaries," *Optics Express*, 25, pp. 23935-23944 (2017).

Baldassarre, et al., "Mapping the amide I absorption in single bacteria and mammalian cells with resonant infrared nanospectroscopy," *Nanotechnology*, 27 pp. 1-9 (2016).

Bao et al., "Graphene Photonics, Plasmonics, and Broadband Optoelectronic Devices,"*ACS Nano*, 6, pp. 3677-3694 (2012).

Barlow et al., "The importance of correcting for variable probe-sample interactions in AFM-IR spectroscopy: AFM-IR of dried bacteria on a polyurethane film," *Analyst*, 141, pp. 4848-4854 (2016).

Bhargava, "Infrared Spectroscopic Imaging: The Next Generation," *Applied Spectroscopy*, 66, pp. 1091-1120 (2012).

Binnig et al., "Atomic Force Microscope," *Physical Review Letters*, 56(9), pp. 930-933 (1986).

Brehm et al., "Antenna-mediated back-scattering efficiency in infrared near-field microscopy,"*Optics Express*, 16, pp. 11203-11215 (2008).

Burrows et al., "Surface Chemistry of Gold Nanorods," *Langmuir*, 32, pp. 9905-9921 (2016).

Centrone, "Infrared Imaging and Spectroscopy Beyond the Diffraction Limit," *Annual Review of Analytical Chemistry*, 8, pp. 101-126 (2015).

Chae et al. "Nanophotonic Atomic Force Microscope Transducers Enable Chemical Composition and Thermal Conductivity Measurements at the Nanoscale," *Nano Letters*, 17, pp. 5587-5594 (2017).

Collins et al., "Breaking the Time Barrier in Kelvin Probe Force Microscopy: Fast Free Force Reconstruction Using the G-Mode Platform." *ACS Nano*, 11(9), pp. 8717-8729 (2017).

Cvitkovic et al., Analytical model for quantitative prediction of material contrasts in scattering-type near-field optical microscopy. *Optics Express* 15, pp. 8550-8565 (2007).

Dazzi et al., "AFM-IR: Technology and Applications in Nanoscale Infrared Spectroscopy and Chemical Imaging," *Chemical Reviews*, 117, pp. 5146-5173 (2017).

Dazzi et al., "Theory of infrared nanospectroscopy by photothermal induced resonance," *Journal of Applied Physics*, 107, pp. 1-8 (2010).

Dazzi et al., "Local infrared microspectroscopy with subwavelength spatial resolution with an atomic force microscope tip used as a photothermal sensor," *Optics Letters*, 30, pp. 2388-2390 (2005).

Dazzi et al,, "Resonance enhanced AFM-IR: A new powerful way to characterize blooming on polymers used in medical devices," *International Journal of Pharmaceutics*, 484, pp. 109-114 (2015).

Dazzi etal., "Chemical mapping of the distribution of viruses into infected bacteria with a photothermal method," *Ultramicroscopy*, 108(7), pp. 635-641 (2008).

Dazzi et al., "Subwavelength infrared spectromicroscopy using an AFM as a local absorption sensor. Infrared," *Physics and Technology*, 49(1-2), pp. 113-121 (2006).

Doerner et al., "A method for interpreting the data from depth-sensing indentation instruments," *Journal of Materials Research*, 1(4), pp. 601-609 (1986).

Dufrêne et al., "Imaging modes of atomic force microscopy for application in molecular and cell biology," *Nature Nanotechnology*, pp. 1-32 (2017).

Felts et al., "Nanometer-Scale Infrared Spectroscopy of Heterogeneous Polymer Nanostructures Fabricated by Tip-Based Nanofabrication," *ACS Nano*, 6(9), pp. 8015-8021 (2012).

Ferrari et al., "Raman spectroscopy as a versatile tool for studying the properties of graphene," *Nature Nanotechnology*, 8, pp. 235-246 (2013).

Giliberti et al., "Protein clustering in chemically stressed HeLa cells studied by infrared nanospectroscopy," *Nanoscale* 8(40), pp. 17560-17567 (2016).

Hammiche et al., "Progress in near-field photothermal infra-red microspectroscopy," *Journal of Microscopy*, 213, pp. 129-134 (2004).

Heiderhoff et al., "Thermal microscopy of electronic materials," *Materials Science in Semiconductor Processing*, 43, pp. 163-176 (2016).

Hinrichs et al., "Polarization-Dependent Atomic Force Microscopy—Infrared Spectroscopy (AFM-IR): Infrared Nanopolarimetric Analysis of Structure and Anisotropy of Thin Films and Surfaces," *Applied Spectroscopy* 72(6), pp. 817-832 (2018) 2016.

Hui et al., "Modulating Electrocatalysis on Graphene Heterostructures: Physically Impermeable Yet Electronically Transparent Electrodes," *ACS Nano* 12, pp. 2980-2990 (2018).

Hurley et al., "Mapping mechanical properties on the nanoscale using atomic-force acoustic microscopy," JOM 59 (1), pp. 23-29 (2007).

Huth, F. et al. "Resonant Antenna Probes for Tip-Enhanced Infrared Near-Field Microscopy," *Nano Letters*, 13, pp. 1065-1072 (2013).

Huth et al., Schnell, M., Wittborn, J., Ocelic, N. & Hillenbrand, R. Infrared-spectroscopic nanoimaging with a thermal source. *Nature Materials*, 10, pp. 352-356 (2011).

Huth et al., "Nano-FTIR absorption spectroscopy of molecular fingerprints at 20 nm spatial resolution," *Nano Letters* 12(8), pp. 3973-3978 (2012).

Jahng et al., "Tip-Enhanced Thermal Expansion Force for Nanoscale Chemical Imaging and Spectroscopy in Photoinduced Force Microscopy," *Analytical Chemistry* 90, pp. 11054-11061 (2018).

Jang et al., "Polymeric microfluidic continuous flow mixer combined with hyperspectral FT-IR imaging for studying rapid biomolecular events,"*Lab on a Chip*, 19, pp. 2598-2609 (2019).

Katzenmeyer et al., "Nanoscale infrared spectroscopy: Improving the spectral range of the photothermal induced resonance technique," *Anal. Chem.*, 85(4), pp. 1972-1979 (2013).

Katzenmeyer et al., "Nanoscale Imaging and Spectroscopy of Plasmonic Modes with the PTIR Technique," *Advanced Optical Materials*, 4, 2(8), pp. 718-722 (2014).

Katzenmeyer et al., "Absorption Spectroscopy and Imaging from the Visible through Mid-Infrared with 20 nm Resolution," *Analytical Chemistry* 87, pp. 3154-3159 (2015).

Kenkel et al., "Probe—Sample Interaction-Independent Atomic Force Microscopy—Infrared Spectroscopy: Toward Robust Nanoscale Compositional Mapping," *Analytical Chemistry*, 90, pp. 8845-8855 (2018).

Kennedy et al., "Quantifying nanoscale biochemical heterogeneity in human epithelial cancer cells using combined AFM and PTIR absorption nanoimaging," *Journal of Biophotonics*, 8(1-2), pp. 133-141 (2015).

Khanal et al., "Biospectroscopy of Nanodiamond-Induced Alterations in Conformation of Intra- and Extracellular Proteins: A Nanoscale IR Study," *Analytical Chemistry*, 88, pp. 7530-7538 (2016).

Kim et al., "Imaging and three-dimensional reconstruction of chemical groups inside a protein complex using atomic force microscopy," *Nature Nanotechnology*, 10, pp. 1-14 (2015).

Kim et al., "None of us is the same as all of us: resolving the heterogeneity of extracellular vesicles using single-vesicle, nanoscale

(56) References Cited

OTHER PUBLICATIONS characterization with resonance enhanced atomic force microscope infrared spectroscopy (AFM-IR)," *Nanoscale Horizons* 3, pp. 430-438 (2018).
Kjoller et al., "High-sensitivity nanometer-scale infrared spectroscopy using a contact mode microcantilever with an internal resonator paddle," *Nanotechnology* 21, pp. 1-7 (2010).
Knoll et al., "Near-field probing of vibrational absorption for chemical microscopy," *Nature*, 399, pp. 134-137 (1999).
Kyle et al., "Industrial graphene metrology," *Nanoscale*, 4, pp. 3807-3819 (2012).
Lee et al., "Graphene laminated gold bipyramids as sensitive detection platforms for antibiotic molecules," *Chemical Communications*, 51, pp. 15494-15497 (2015).
Lin et al., "100-GHz Transistors from Wafer-Scale Epitaxial Graphene," *Science*, 327, p. 662 (2010).
Liu et al., "Direct observation of oxygen configuration on individual graphene oxide sheets," *Carbon*, 127, pp. 141-148 (2018).
Lu et al., "Infrared absorption nano-spectroscopy using sample photoexpansion induced by tunable quantum cascade lasers," *Optics Express* 19, pp. 19942-19947 (2011).
Lu et al., "Tip-enhanced infrared nanospectroscopy via molecular expansion force detection," *Nature Photonics* 8, pp. 307-312 (2014).
Maboudian et al., "Self-assembled monolayers as anti-stiction coatings for MEMS: characteristics and recent developments," *Sensors and Actuators*, 82, pp. 219-223 (2000).
Maivald et al., "Using force modulation to image surface elasticities with the atomic force microscope," *Nanotechnology*, 2(2), pp. 103-106 (1991).
Marcott et al., "Spatial differentiation of sub-micrometer domains in a poly(hydroxyalkanoate) copolymer using instrumentation that combines atomic force microscopy (AFM) and infrared (IR) spectroscopy," *Applied Spectroscopy*, 65, pp. 1145-1150 (2011).
Mas-Ballesté et al., "2D materials: to graphene and beyond," *Nanoscale* 3, pp. 20-30 (2011).
Mastel et al. "Understanding the Image Contrast of Material Boundaries in IR Nanoscopy Reaching 5 nm Spatial Resolution," *ACS Photonics* 5, pp. 3372-3378 (2018).
Mittal et al., "Simultaneous cancer and tumor microenvironment subtyping using confocal infrared microscopy for all-digital molecular histopathology," *Proceedings of the National Academy of Sciences* 115(25) pp. E5651-E5660 (2018).
Muller, "Structure and bonding at the atomic scale by scanning transmission electron microscopy," *Nature Materials*, 8, pp. 263-270 (2009).
Nowak et al., Nanoscale chemical imaging by photoinduced force microscopy, *Science Advances*, pp. 1-10 (2016).
O'Callahan et al., "Photoinduced Tip—Sample Forces for Chemical Nanoimaging and Spectroscopy," *Nano Letters* 18, pp. 5499-5505 (2018).
Ong et al., "Response to Critical Assessment of the Evidence for Striped Nanoparticles," *PLOS ONE*, pp. 1-19 (2015).

Policar et al., "Subcellular IR imaging of a metal-carbonyl moiety using photothermally induced resonance,", 50, pp. 860-864 (2011).
Rabe et al., "Quantitative determination of contact stiffness using atomic force acoustic microscopy," *Ultrasonics*, 38, pp. 430-437 (2000).
Rabe et al., "Imaging and measurement of local mechanical material properties by atomic force acoustic microscopy," *Surface and Interface Analysis*, 33(2), pp. 65-70 (2002).
Ramer et al., "Quantitative Chemical Analysis at the Nanoscale Using the Photothermal Induced Resonance Technique," *Analytical Chemistry*, 89, pp. 13524-13531 (2017).
Ramer et al., "Implementation of Resonance Tracking for Assuring Reliability in Resonance Enhanced Photothermal Infrared Spectroscopy and Imaging", *Applied Spectroscopy*, 71, pp. 2013-2020 (2017).
Rodriguez et al., "Optical Absorption Imaging by Photothermal Expansion with 4 nm Resolution," *ACS Photonics* 5, pp. 3338-3346 (2018).
Rosenberger et al., "Measuring individual carbon nanotubes and single graphene sheets using atomic force microscope infrared spectroscopy," *Nanotechnology* 28, pp. 1-10 (2017).
Ruggeri et al., "Infrared nanospectroscopy characterization of oligomeric and fibrillar aggregates during amyloid formation," *Nature Communication*, pp. 1-9 (2015).
Ruggeri et al., "Nanoscale studies link amyloid maturity with polyglutamine diseases onset," *Scientific Reports*, pp. 1-11, (2016).
Stirling et al., "Critical Assessment of the Evidence for Striped Nanoparticles," *PLOS ONE*, 9(11) pp. 1-18 (2014).
Stöckle et al., "Nanoscale chemical analysis by tip-enhanced Raman spectroscopy," *Chemical Physics Letters*, 318, pp. 131-136 (2000).
Tan et al., "Reactivity of Monolayer Chemical Vapor Deposited Graphene Imperfections Studied Using Scanning Electrochemical Microscopy," *ACS Nano* 6, pp. 3070-3079 (2012).
Van Eerdenbrugh et al., "Nanoscale mid-infrared evaluation of the miscibility behavior of blends of dextran or maltodextrin with poly(vinylpyrrolidone)," *Molecular Pharmaceutics*, 9(5), pp. 1459-1469 (2012).
Varesi et al., "Scanning Joule expansion microscopy at nanometer scales," *Applied Physics Letters*, 72, pp. 37-39 (1998).
Wang et al., "Nanoscale simultaneous chemical and mechanical imaging via peak force infrared microscopy," *Science Advances*, 3 pp. 1-11 (2017).
Xu et al., "Pushing the sample-size limit of infrared vibrational nanospectroscopy: From monolayer toward single molecule sensitivity," *Journal of Physical Chemistry Letters*, 3(13), pp. 1836-1841 (2012).
Yang et al., "Resonant optical gradient force interaction for nano-imaging and -spectroscopy," *New Journal of Physics*, 18, pp. 1-7 (2016).
Yuya et al., "Contact-resonance atomic force microscopy for viscoelasticity," *Journal of Applied Physics*, 104(7), pp. 1-8 (2008).

\* cited by examiner

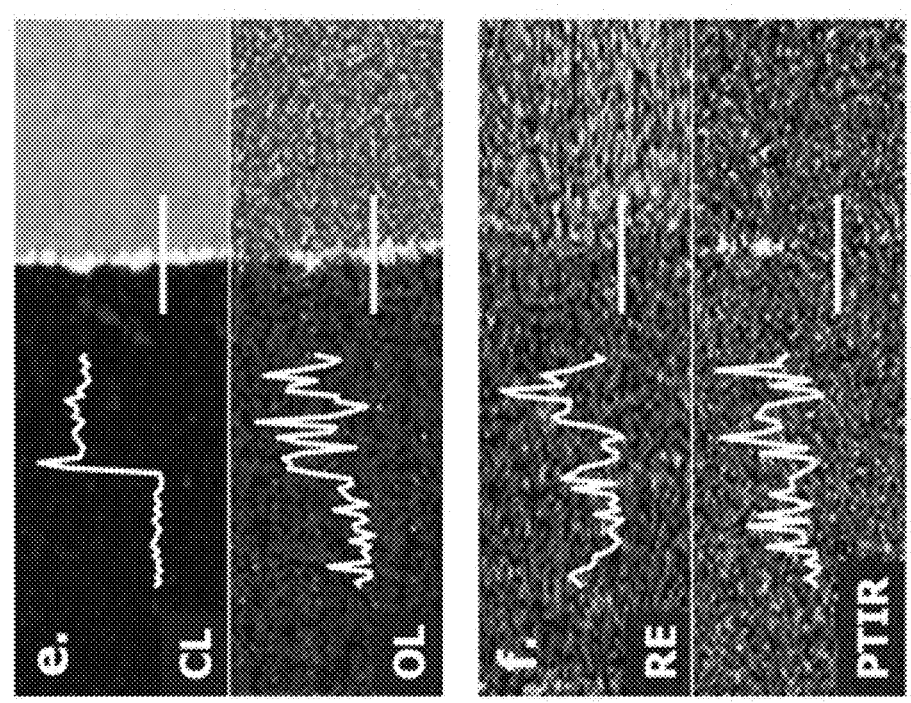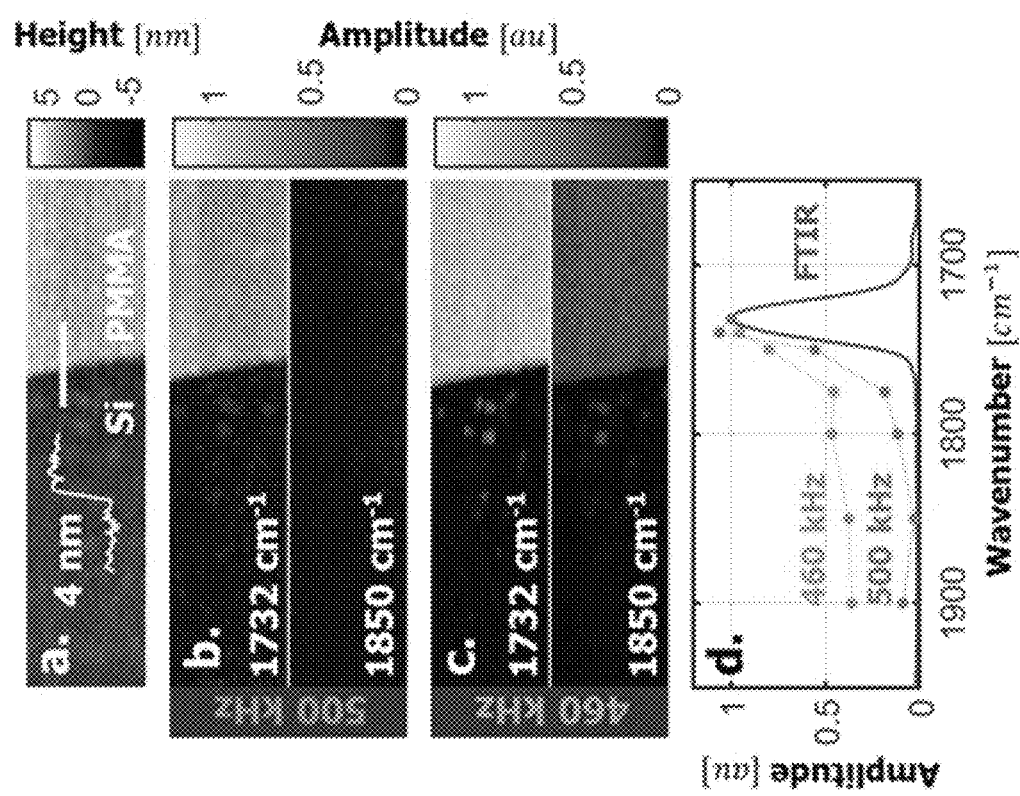
Figure 23

2400

```
┌─────────────────────────────────────────────────────────────────┐
│ sending, during a first time period, a light-driving signal to  │
│ a light source so that the light source is configured to output │
│ a series of light pulses onto a sample, wherein the sample is   │
│ under photothermal-induced expansion according to the series    │
│ of light pulses;                                          2410  │
└─────────────────────────────────────────────────────────────────┘
                                │
                                ▼
┌─────────────────────────────────────────────────────────────────┐
│ obtaining, during the first time period, a first deflection     │
│ signal from a cantilever, wherein the cantilever is configured  │
│ to interact with the sample;                              2420  │
└─────────────────────────────────────────────────────────────────┘
                                │
                                ▼
┌─────────────────────────────────────────────────────────────────┐
│ sending, during a second time period, an actuator-driving       │
│ signal to an electromechanical actuator so that the             │
│ electromechanical actuator is configured to move according to   │
│ the actuator-driving signal, wherein the electromechanical      │
│ actuator is coupled with the sample;                      2430  │
└─────────────────────────────────────────────────────────────────┘
                                │
                                ▼
┌─────────────────────────────────────────────────────────────────┐
│ obtaining, during the second time period, a second deflection   │
│ signal from the cantilever;                                     │
│                                                           2440  │
└─────────────────────────────────────────────────────────────────┘
                                │
                                ▼
┌─────────────────────────────────────────────────────────────────┐
│ obtaining a photothermal image of the sample based on the       │
│ first deflection signal and the second deflection signal        │
│                                                           2450  │
└─────────────────────────────────────────────────────────────────┘
```

Figure 24 obtaining a raw-sample image based on the first deflection signal;
2510 obtaining a raw-actuator image based on the second deflection signal;
2520 obtaining the photothermal image based on the raw-sample image and the raw-actuator image
2530

Figure 25

```
┌─────────────────────────────────────────────────────────────┐
│ obtaining the light-driving signal based on a first         │
│ Transistor-Transistor Logic (TTL) pulse-train signal;       │
│                                                      2610   │
└─────────────────────────────────────────────────────────────┘
                              │
                              ▼
┌─────────────────────────────────────────────────────────────┐
│ obtaining an actuator-driving signal based on a second      │
│ TTL pulse-train signal.                                     │
│                                                      2620   │
└─────────────────────────────────────────────────────────────┘
```

Figure 26

```
┌─────────────────────────────────────────────────────────────┐
│ feeding the first deflection signal to a closed loop        │
│ controller;                                                 │
│                                                      2710   │
└─────────────────────────────────────────────────────────────┘
                              │
                              ▼
┌─────────────────────────────────────────────────────────────┐
│ obtaining, by the closed loop controller, an updated        │
│ actuator-driving signal based on the first deflection       │
│ signal and a pre-determined setpoint, so that a resulting   │
│ deflection signal is zero                            2720   │
└─────────────────────────────────────────────────────────────┘
```

Figure 27

METHOD AND APPARATUS FOR CORRECTING RESPONSIVITY VARIATION IN PHOTOTHERMAL IMAGING

RELATED APPLICATION

This application claims priority to Provisional Application No. 62/866,098, filed on Jun. 25, 2019, which is incorporated by reference in its entirety.

GOVERNMENT LICENSE RIGHTS

This invention was made with government support under T32EB019944 awarded by the National Institute of Health. The government has certain rights in the invention.

BACKGROUND

1. Technical Field

The present disclosure relates to a method and apparatus for correcting responsivity variation in what may be referred to as heterodyne expansion or photothermal imaging. In particular, the present disclosure relates to a method and apparatus for minimizing the effect of variations of probe-sample interaction and/or mechanical probe responsivity to improve technologies of atomic force microscopy infrared imaging.

2. Background Information

Nanoscale topological imaging, for example, atomic force microscopy (AFM) are used to obtain imaging resolutions at nanometer scale. AFM has been widely used to detect optical spectroscopic data from absorbing samples, including Photoinduced Force Microscopy (PiFM), Peak Force Infrared microscopy (PFIR) and Photo Thermal Induced Resonance (PTIR).

Nanoscale infrared (IR) imaging, particularly AFM-IR, uses a pulsed Infrared sources such as a Quantum Cascade Laser to heat a sample and uses an AFM to measure the thermal expansion. The signal is called Photo Thermal Induced Resonance (PTIR). One of the problems associated with existing AFM-IR imaging is that the signal variation due to AFM response changes based on variations in sample stiffness. For some samples, the signal can vary >100% due to sample stiffness variations, which masks the desired thermal expansion signal. This problem results from the use of a mechanical probe such as an AFM cantilever which produces artifacts know as either probe-sample mechanical variations or cantilever responsivity variations.

The present disclosure is directed toward addressing one or more drawbacks, including but not limited to those set forth above. The present disclosure may minimize the effect of variations of probe-sample interaction and/or mechanical probe responsivity to improve technologies of atomic force microscopy infrared imaging.

BRIEF SUMMARY

The present disclosure is directed to a method and an apparatus for correcting responsivity variation in photothermal imaging. The method and the apparatus described in the present disclosure are applicable for various photothermal imaging corrections, for example but not limited to, AFM based photothermal imaging, and/or photothermal imaging obtained via other forms of photothermal detection such as optical approaches.

The present disclosure describes a method for correcting responsivity variation in photothermal imaging. The method includes sending, during a first time period, a light-driving signal to a light source so that the light source is configured to output a series of light pulses onto a sample, wherein the sample is under photothermal-induced expansion according to the series of light pulses; obtaining, during the first time period, a first deflection signal from a cantilever, wherein the cantilever is configured to interact with the sample; sending, during a second time period, an actuator-driving signal to an electromechanical actuator so that the electromechanical actuator is configured to move according to the actuator-driving signal, wherein the electromechanical actuator is coupled with the sample; obtaining, during the second time period, a second deflection signal from the cantilever; and obtaining a photothermal image of the sample based on the first deflection signal and the second deflection signal.

The present disclosure describes an apparatus for correcting responsivity variation in nanoscale photothermal imaging. The apparatus includes a memory storing instructions; and a processor in communication with the processor. When the processor executes the instructions, the processor is configured to cause the apparatus to send, during a first time period, light-driving signal to a light source so that the light source is configured to output a series of light pulses onto a sample, wherein the sample is under photothermal-induced expansion according to the series of light pulses, obtain, during the first time period, a first deflection signal from a cantilever, wherein the cantilever is configured to interact with the sample, send, during a second time period, an actuator-driving signal to an electromechanical actuator so that the electromechanical actuator is configured to move according to the actuator-driving signal, wherein the electromechanical actuator is coupled with the sample, obtain, during the second time period, a second deflection signal from the cantilever, obtain a nanoscale photothermal image of the sample based on the first deflection signal and the second deflection signal.

The above and other aspects and their implementations are described in details in the drawings, the descriptions, and the claims.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the disclosure. The patent or application file contains at least one drawing executed in color. Copies of this patent or patent application publication with color drawing(s) will be provided by the Office upon request and payment of the necessary fee.

FIG. 3 describes a responsivity correction on polymer samples in one or more of the embodiments.

FIG. 23 describes mapping molecular information of nanothin materials on silicon.

FIG. 24 describes a flow diagram of an embodiment for correcting responsivity variation in photothermal imaging.

FIG. 25 describes a flow diagram of an embodiment for correcting responsivity variation in photothermal imaging.

FIG. 26 describes a flow diagram of an embodiment for correcting responsivity variation in photothermal imaging.

FIG. 27 describes a flow diagram of an embodiment for correcting responsivity variation in photothermal imaging.

Figure 1:
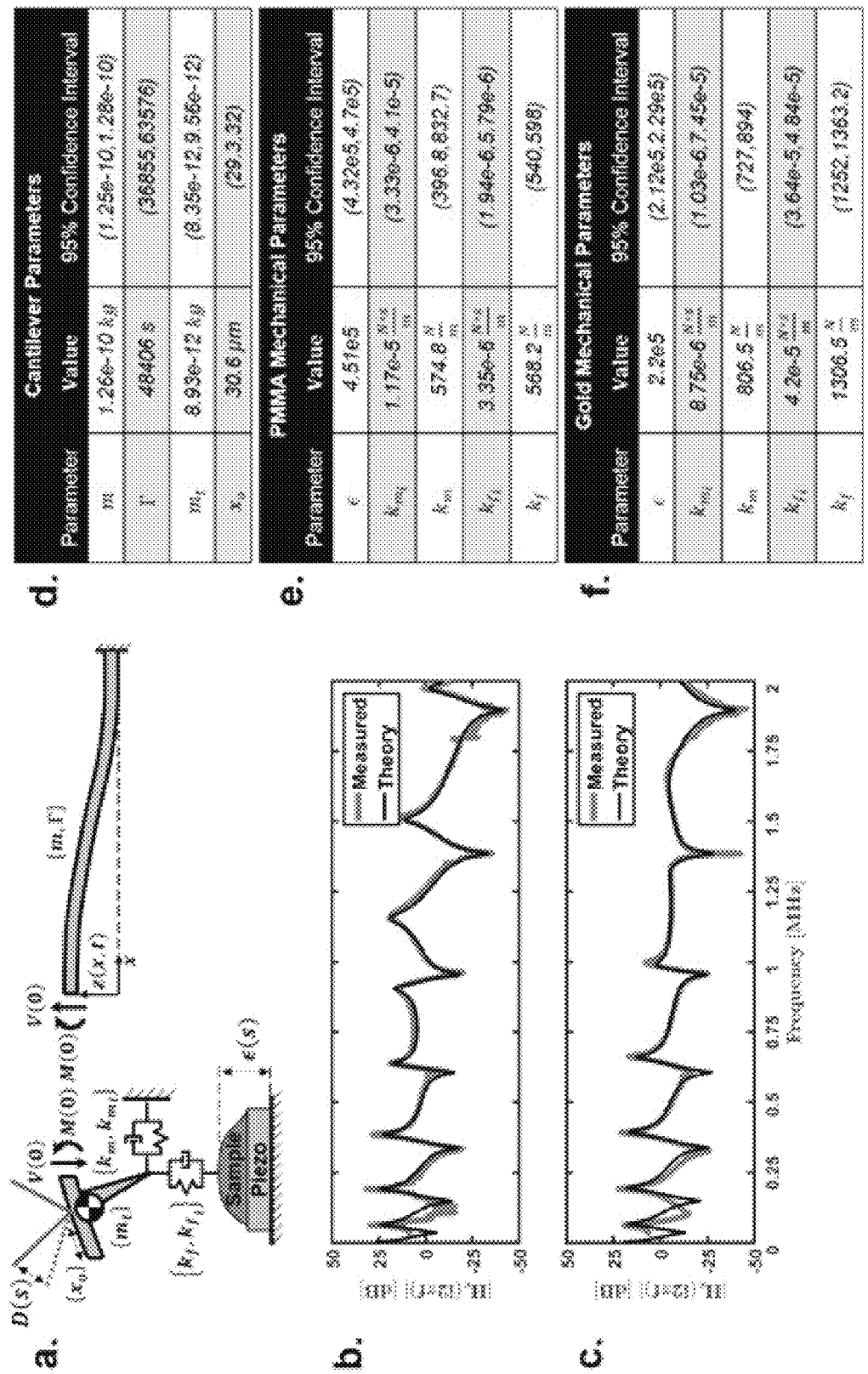
FIG. 1 describes a transfer function validation in one or more of the embodiments.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION OF THE DISCLOSURE

The disclosed systems and methods will now be described in detail hereinafter with reference to the accompanied drawings, which form a part of the present application, and which show, by way of illustration, specific examples of embodiments. Please note that the systems and methods may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", or "in some implementations" as used herein does not necessarily refer to the same implementation or different implementation. It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes at least two embodiments for correcting responsivity variation in photothermal imaging. The method may include using a system for correcting responsivity variation in photothermal imaging. In one implementation, the system may be any portion or all of the embodiments as described above. In another implementation, the system may be a combination of any portion of at least one embodiment and any portion of the other at least one embodiment.

Referring to FIG. 24, the method 2400 may include a portion or all of the following steps.

Referring to step 2410, the method 2400 may include sending, during a first time period, a light-driving signal to a light source so that the light source is configured to output a series of light pulses onto a sample. The sample is under photothermal-induced expansion according to the series of light pulses. In one implementation, the light source is configured to output infrared (IR) light.

Referring to step 2420, the method 2400 may include obtaining, during the first time period, a first deflection signal from a cantilever. The cantilever is configured to interact with the sample. In one implementation, the cantilever is a part of an Atomic Force Microscope (AFM).

Referring to step 2430, the method 2400 may include sending, during a second time period, an actuator-driving signal to an electromechanical actuator so that the electromechanical actuator is configured to move according to the actuator-driving signal. The electromechanical actuator is coupled with the sample. In one implementation, the electromechanical actuator is configured to move along an out-of-plane direction based on the actuator-driving signal. In another implementation, the first time period and the second time period are consecutive time period.

Referring to step 2440, the method 2400 may include obtaining, during the second time period, a second deflection signal from the cantilever.

Referring to step 2450, the method 2400 may include obtaining a photothermal image of the sample based on the first deflection signal and the second deflection signal.

In one implementation, referring to FIG. 25, the step 2450 may include a portion or all of the following steps: step 2510, obtaining a raw-sample image based on the first deflection signal; step 2520, obtaining a raw-actuator image based on the second deflection signal; and step 2530, obtaining the photothermal image based on the raw-sample image and the raw-actuator image.

In another implementation, step 2530 may include dividing the raw-sample image by the raw-actuator image to obtain the nanoscale photothermal image.

In another implementation, referring to FIG. 26, the first time period and the second time period are consecutive time periods and the method 2400 may further include a portion or all of the following steps: step 2610, obtaining the light-driving signal based on a first Transistor-Transistor Logic (TTL) pulse-train signal; and step 2620, obtaining an actuator-driving signal based on a second TTL pulse-train signal.

Optionally and/or alternatively, in method 2400, the first time period and the second time period are concurrent time periods; and the first deflection signal and the second deflection signal are same deflection signal. In one implementation, referring to FIG. 27, the method 2400 may further include a portion or all of the following steps: step 2710, feeding the first deflection signal to a closed loop controller; and step 2720, obtaining, by the closed loop controller, an updated actuator-driving signal based on the first deflection signal and a pre-determined setpoint, so that a resulting deflection signal is zero.

In another implementation, the step 2720 may include obtaining the updated actuator-driving signal by calculating $v_2[n+1]=v_2[n]+K_I[n](s-L[n])$, wherein n is a positive integer, $v_2[n+1]$ is the updated actuator-driving signal at a time point n+1, $v_2[n]$ is the actuator-driving signal at a time point n, $K_I[n]$ is a time-varying integral gain at the time point n, s is the pre-determined setpoint, and $L[n]$ is a demodulated lock-in voltage at the time point n.

Optionally and/or alternatively, in the method 2400, the electromechanical actuator comprises a piezo actuator; and the light source comprises a quantum cascade laser (QCL).

Optionally and/or alternatively, in the method 2400, the electromechanical actuator comprises a nanoscale stage configured to comprise a flat frequency response over a pre-determined frequency range.

Optionally and/or alternatively, in the method 2400, the pre-determined frequency range comprising a frequency range between 1 KHz and 2 MHz.

The present disclosure also describes embodiments of an apparatus for correcting responsivity variation in nanoscale photothermal imaging. The apparatus may include a memory storing instructions; and a processor in communication with the processor. When the processor executes the instructions, the processor is configured to cause the apparatus to perform a portion, all, or a combination of steps in the methods described above.

Embodiment One: Introduction

Described below is one example or embodiment for performing probe-sample interaction-independent Atomic Force Microscopy-Infrared (AFM-IR) spectroscopy towards robust nanoscale compositional mapping.

Nano scale infrared imaging uses a pulsed infrared source such as a Quantum Cascade Laser to periodically heat a sample and uses an Atomic Force Microscope (AFM) to measure the thermal expansion. The signal is called Photo Thermal Induced Resonance (PTIR). This technique has been around since 2005 or so, but one major issue that has never been sufficient addressed is the signal variation due to AFM response changes due to variations in sample stiffness. For some samples, the signal may vary >100% due to sample stiffness variations, which may completely mask the desired thermal expansion signal. Resonance enhanced imaging techniques have been used in the past to limit this effect; however, this doesn't completely remove the stiffness variation. In the present disclosure, a piezo material is coupled under the sample which produces an out of plane vibration similar to Acoustic Force Atomic Microscopy (AFAM). Unlike AFAM however, the piezo contrast image at a single frequency may be used to uniquely determine the stiffness variation in the PTIR image and may remove it thus isolating the pure infrared thermal expansion signal. The present work suggests that some previous PTIR measurements are nearly completely dominated by this stiffness contrast. By isolating the thermal expansion signal from the stiffness signal, nano scale infrared absorbance imaging can be used to provide chemically rich detail for biology and polymer sciences. This is especially true for samples with high variations in stiffness such as polymer blends as well as thick samples such as tissues and cells.

The present disclosure describes an embodiment for performing probe-sample interaction-independent Atomic Force Microscopy-Infrared (AFM-IR) spectroscopy towards robust nanoscale compositional mapping.

Nanoscale topological imaging using Atomic Force Microscopy (AFM) combined with infrared (IR) spectroscopy is a rapidly emerging modality (AFM-IR) to record correlated structural and chemical images. While the expectation is that the spectral data faithfully represents the underlying chemical composition, sample mechanical properties affect the recorded data (known as the probe-sample interaction effect). Although experts in the field are aware of this effect, the contribution is not fully understood. Further, when the sample properties are not well known or when AFM-IR experiments are conducted by non-experts, there is a chance that these non-molecular properties may affect analytical measurements in an uncertain manner. Techniques such as resonance enhanced imaging and normalization of IR signal using ratios might improve fidelity of recorded data but are not universally effective. The present disclosure provides a fully analytical model that relates cantilever response to the local sample expansion which opens several avenues. A new method is demonstrated for removing probe-sample interaction effects in AFM-IR images by measuring the cantilever responsivity using a mechanically induced out-of-plane sample vibration. This method is then applied to model polymers and mammary epithelial cells to show improvements in sensitivity, accuracy and repeatability for measuring soft matter compared to current state of the art (resonance enhanced operation). Rigorous analytical model driven sample-dependent cantilever responsivity understanding is an essential addition to AFM-IR imaging if identification of chemical features at nanoscale resolutions is to be realized for arbitrary samples.

Atomic Force Microscopy (AFM) has been widely used to detect optical spectroscopic data from absorbing samples, including Photoinduced Force Microscopy (PiFM), Peak Force Infrared microscopy (PFIR) and Photo Thermal Induced Resonance (PTIR). Each technique provides a measure of the local sample absorbance, but other properties that might also contribute to image contrast are not fully understood. In particular, AFM-IR is an imaging modality that uses an AFM to measure the PTIR signal produced by a pulsed IR laser with theorized resolutions significantly below the diffraction limits of far-field IR microscopy. In response to an IR laser with a slow repetition rate (~1 kHz), the approach records data by exciting cantilever oscillation at resonant modes to produce a ringdown signal with an amplitude proportional to the local sample absorbance. Newer adaptations of this technique operate at higher frequencies and incorporate lock-in detection of the cantilever deflection signal, demonstrating improvements in signal to noise ratio (SNR) and data acquisition speed. The AFM-IR technique has been shown to closely resemble far-field FTIR transmission spectra. At present, however, this imaging modality suffers from signal fluctuations resulting from probe-sample mechanical interactions. These fluctuations can have little or no correlation to the local sample expansion (or spectral contrast). It has been shown that these fluctuations can be mitigated by tracking a cantilever resonance peak during data acquisition (hereafter referred to as resonance enhanced operation) or by using IR peak ratios for analysis post-acquisition. These methods, however, restrict the available data and are not always effective. Improved optomechanical probes can be designed to be less sensitive to mechanical property variations. The present disclosure demonstrates imaging the sample expansion free of probe-sample mechanical interactions.

Resonance enhanced AFM-IR outperforms scattering based techniques with greatly improved detection sensitivity and has been successfully demonstrated for thin, weakly absorbing samples across many fields of study. However, for thick samples at wavelengths corresponding to mid-IR fundamental modes (best for molecular spectral analysis), absorption is strong and results in a large sample expansion. The sensitivity improvement on resonance is not necessarily realized in these cases as the laser intensity needs to be reduced (sometimes less than 1% of full power) to avoid signal saturation or sample melting. Moreover, both the amplitude and frequency of resonance peaks are functions of the local mechanical properties of the sample. This results in an undesirable outcome in some cases where the variation in the resonance amplitude becomes dominant, especially for high frequency resonance modes. As a result, resonance tracking is typically restricted to the low frequency cantilever resonance modes, which have higher levels of noise. Thus, this current state of the art approach can result in lower sensitivity from the lower illumination signal and higher noise from operating at lower resonance modes. The performance ceiling is seemingly limited without an alternate approach. The present disclosure shows that an explicit analytical understanding of the fundamental imaging process and its dependence on experimental parameters can prevent artifacts in PTIR signal acquisition and raise the limits of sensitivity and accuracy of AFM-IR imaging. The present disclosure describes the AFM-IR image formation process theoretically and then uses the insight obtained to develop techniques for improving the accuracy and repeatability of AFM-IR imaging.

The present disclosure describes a method and apparatus to overcome error introduced with PTIR measurements on account of mechanical properties of the sample. The present disclosure may be easy to implement for improving accuracy of PTIR in context with samples having varying mechanical properties. The present disclosure may obtain reliably extend PTIR measurements to biological or polymer samples at nanometer scale imaging.

Embodiment One: Description of Method and Apparatus

The present disclosure may be implemented as embodiment one alone, or may be implemented as a combination of a portion or all of embodiment one and a portion or all of embodiment two as discussed below.

Instrumentation Design and Implementation. The Quantum Cascade Laser (QCL) and piezo signals are generated using 2 trigger outputs from a commercially available Nano-IR2 from a vendor, for example but not limited to, Anasys Instruments Corporation with a standard Anasys contact mode probe (PN PR-EX-nIR2-10). The first trigger output is a 100 μs Transistor-Transistor Logic (TTL) pulse which occurs at the start of every trace and retrace scan. Using a data acquisition device and associated software, for example but not limited to, National Instruments Data Acquisition (DAQ) device (USB-6009) and lab view, the falling edge of this trigger signal is used to generate two TTL output signals. These output signals switch between high and low voltages at the start of every alternate trace scan, so if one signal is high during the scan the other signal is low. The second trigger output from the instrument is a TTL pulse train with the repetition rate and pulse width set in the analysis studio software from a vendor, for example but not limited to, Anasys. The two output signals from the DAQ and this trigger signal are fed to a logic circuit to create two TTL pulse train signals which switch on and off at alternating trace scans. These two signals are fed to the QCL and piezo trigger inputs respectively resulting in the desired, interlaced image.

Data Collection and Processing. Measured transfer function curves are collected using a commercial Nano-IR2 instrument from a vendor, for example but not limited to, Anasys Instruments Corporation. The curves are measured by pulsing the QCL laser at 1 kHz repetition rate with a 300 ns pulse width, averaging 2048 time-series ringdown profiles, multiplying the time series ringdown data with a triangle curve and then applying a Fourier transform. The ringdown measurement is repeated up to 1000 times and averaged in time domain to further reduce noise for some of the curves shown.

For the equipment used here, the frequency range used for curve fitting is 250 kHz to 2 MHz. Curve fitting is conducted using a curve fitting software, for example but not limited to, lsqcurvefit in Matlab, with the equations first defined symbolically then converted to functions using matlabFunction( ). An array of n parameters x(1:n) are fitted, which had the following functional form $\{m, \Gamma, \ldots\} = \{e^{x(1)}, e^{x(2)}, \ldots\}$ in relation to the unknown parameters. This is done to constrain the parameters $\{m, \Gamma, \ldots\}$ to be positive. The desired parameters $\{m, \Gamma, \ldots\}$ and 95% confidence intervals are then determined from the array of fit parameters x(1:n). The 95% confidence intervals are computed using outputs from lsqcurvefit as inputs for nlparci functions in Matlab.

A standard protocol is followed for optimally focusing the QCL laser spot to the sample under the AFM tip. The QCL spot position is swept through the area using the Analysis Studio spot optimization software from a vendor, for example but not limited to, Anasys Corporation, while pulsing at the 3rd cantilever resonance mode (~390 kHz) to reduce the influence of the cantilever heating. This provides a sufficient QCL focus optimization for all samples tested.

Some other data and images shown are collected using the operations described in the responsivity correction methodology section with the QCL laser pulse width set to 500 ns and the lock-in time constant set according to the scan rate of the collected data (unless otherwise specified). For example, the polystyrene-polybutadiene-polystyrene polymer images are collected at 0.5 Hz scan rate (trace and retrace) with 1000×1000 pixels resulting in a lock-in time constant of 1 ms. Resonance tracking is performed using the built-in procedure for the Nano-IR2 with frequency threshold values approximately +/−20 kHz around the desired resonant frequency. All datasets are collected using nominally identical probes.

Polymer Test Sample Preparation. PMMA films are fabricated by spinning 950PMMA A2 photoresist from a vendor, for example but not limited to, MicroChem Corporation, to 100 nm thickness. For another example, the gold mirrors used may be Thor Labs economy gold mirrors (PN ME05S-M01) and the Silicon wafer is from University Wafers (ID 453). The films were spun at 3000 rpm for 60 seconds using a headway spinner then heated to 180 Celsius for 5 minutes. The 1951 United States Air Force (USAF) target is fabricated using a Raith Eline (electron beam lithography system) at a voltage of 10 kV, working distance of 10 mm, area dose of 100 mC/cm2 and line dose of 300 PC/cm to generate the USAF pattern. The targets are then developed in 1:3 MIBK:IPA solution and heated again above 125 C to reflow the polymer to produce smooth features.

Polystyrene polybutadiene polymer films are prepared using 0.983 grams of a Polystyrene-polybutadiene-polystyrene triblock copolymer from a vendor, for example but not limited to, Sigma Aldrich (PN 432490-250G), mixed with 23 mL of Toluene and spun at 3000 RPM on a low-E slide. Films are scratched to allow for determining the absolute height of the sample and then heated over night between 60 to 90 Celsius to allow for phase separation of the two polymers. Overnight the final film appeared slightly brown and showed observable phase separated domains using a visible microscope. The phase separation is also apparent when observed using FTIR.

Cell Culture and Sample Preparation. MCF 10A (breast epithelial cells) are grown in DMEM—Dulbecco's Modified Eagle Medium supplemented with Horse Serum, Hydrocortisone, Cholera Toxin, Epidermal Growth Factor, Insulin and Pen/Strep. The cells are grown on sterilized low emissivity glass (Low-E) until 60-70% confluency. Finally, the cells are incubated with 4% paraformaldehyde solution followed by three PBS washes, quenching with 0.15M glycine, two PBS washes and two sterile water washes. These fixed cells are dried overnight for subsequent imaging.

Embodiment One: Description of Exemplary Results

Theoretical description of the cantilever transfer function. The present disclosure quantifies the dependence of the recorded signal as a function of the actual sample perturbation and the response of the cantilever. The response of a cantilever to an IR absorbing sample has been studied previously. The development of an analytical model is described in detail in the supplemental section. A summary of this analysis as well as specific extensions for studying nanoscale IR response are explained below.

Figure 6:
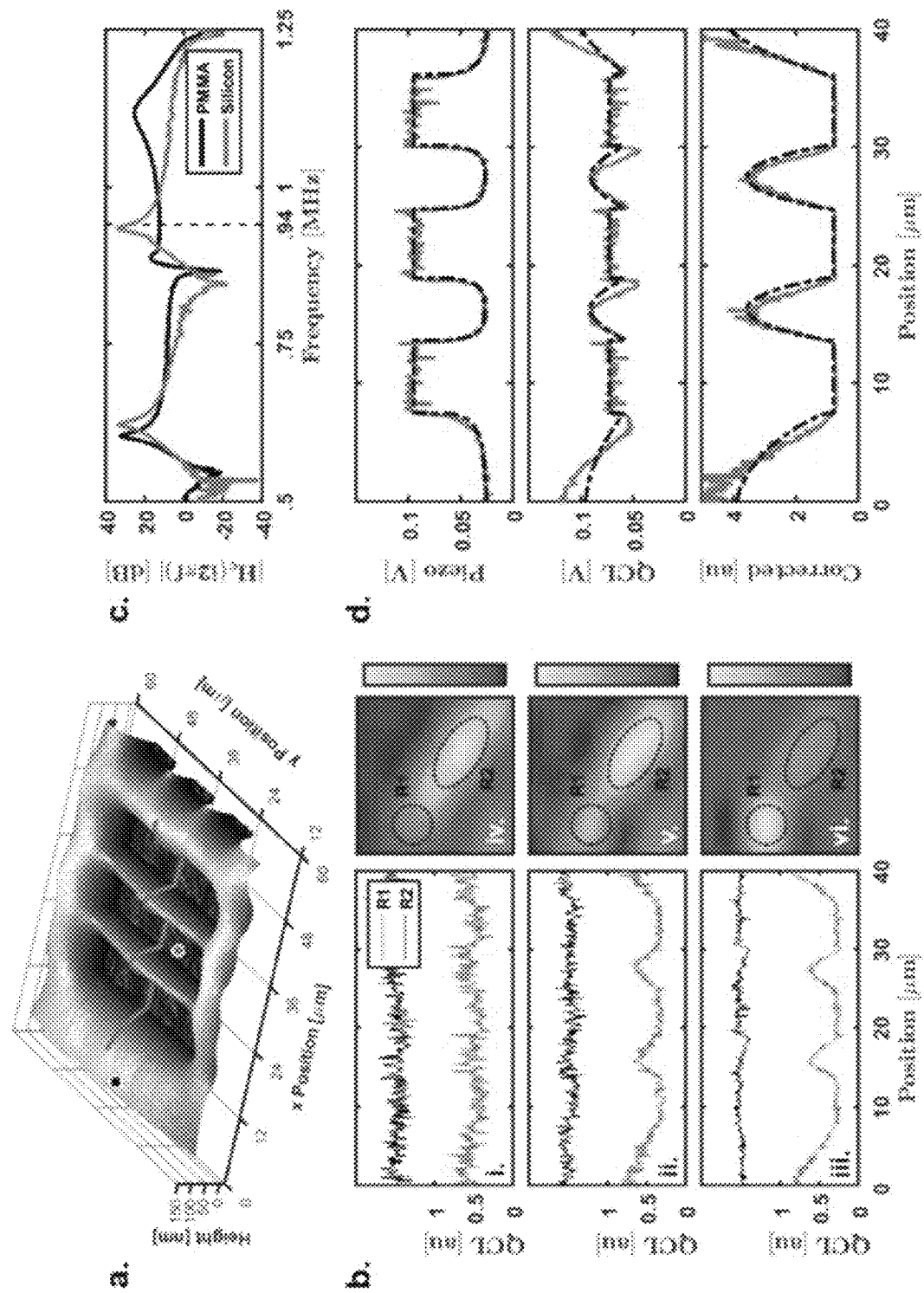

FIG. 6 describes a transfer function validation. (a) Free body diagram of the AFM cantilever beam. The deflection signal (D) is defined as the slope of the cantilever at xo. The deflection signal (D) is proportional to the sample expansion (∈) via the cantilever transfer function (Hc). (b) and (c) show the transfer function comparison of the theoretical fit to measured data for a PMMA polymer film and a gold coated mirror respectively. (d) Sample independent curve fit parameters for fit data shown in (b) and (c). (e) and (f) are sample dependent fit parameters for fit data from (b) and (c).

Considering the free body diagrams shown in FIG. 6a, the position of the cantilever can be described as follows $$\frac{\partial^4 z}{\partial x^4} + \frac{3m}{k_c}\frac{\partial^2 z}{\partial t^2} + \Gamma\frac{3m}{k_c}\frac{\partial z}{\partial t} = 0, \quad (1)$$

$$z(1, t) = 0, \quad \frac{\partial z}{\partial x}\bigg|_{(1, t)} = 0,$$

$$\frac{\partial^2 z}{\partial x^2}\bigg|_{(0, t)} - \frac{3k_m}{k_c}\left(\frac{L_{tip}}{L}\right)^2 \frac{\partial z}{\partial x}\bigg|_{x=0} -$$

$$\frac{3k_{m_i}}{k_c}\left(\frac{L_{tip}}{L}\right)^2 \frac{\partial^2 z}{\partial t \partial x}\bigg|_{x=0} = 0,$$

$$\frac{\partial^3 z}{\partial x^3}\bigg|_{(0, t)} + \frac{3m_{tip}}{k_c}\frac{\partial^2 z}{\partial t^2}\bigg|_{x=0} + \frac{3k_f}{k_c}(z(0, t) - \epsilon) + \frac{3k_{f_i}}{k_c}\frac{\partial(z(0, t) - \epsilon)}{\partial t} = 0.$$

Equation (1) is a normalized form of Euler-Bernoulli beam theory with a set of boundary conditions specific to this analysis. Here m is the mass of the cantilever, $k_c$ is the cantilever spring constant, $\Gamma$ is the viscous dampening of the cantilever, L is the length of the cantilever, $L_{tip}$ is the length of the cantilever tip and $m_{tip}$ is the additional tip mass. The properties which depend on the sample are the expansion signal E, the lateral spring and damper parameters $k_m$ and $k_{m_i}$ and the vertical spring and damper parameters $k_f$ and $k_{f_i}$ respectively. These parameters are depicted in FIG. 6.

Some embodiments of the present disclosure may be comparable to expressions from previous theories with two major differences: there is additional mass at the tip to account for the tip geometry and the source which generates the deflection signal is an out-of-plane sample expansion E instead of a harmonic point force. These additions are both rigorous and necessary for accurately relating the cantilever response to an out-of-plane sample expansion. One relatively straight forward solution to this system is by means of a transfer function defined by the following $$H_c(s) = \frac{D(s)}{\epsilon(s)} = \frac{\frac{\partial z(x_o, s)}{\partial x}}{\epsilon(s)} = \frac{\partial H_c^*(x_o, s)}{\partial x}. \quad (2)$$

Here $x_o$ is the position of the deflection laser on the cantilever and $H_c(s)$ is the cantilever transfer function. The deflection laser position parameter $x_o$ is depicted in FIG. 6. Equation (2) describes the Laplace domain representation of the input/output response of the cantilever deflection D(s) to an out-of-plane, free surface sample expansion signal $\epsilon(s)$.

The expansion signal $\epsilon(s)$ can be considered the expansion of the surface without the presence of the cantilever tip, or a stress-free surface expansion. This follows from concepts in contact mechanics and has been described in previous work. Here, it may be assumed that the expansion is out-of-plane, however, the deflection signal could theoretically be influenced by lateral sample motion as well. The preferential direction of motion of the sample is normal to the surface due to the low mechanical impedance of air (i.e. vertical). Special consideration should be taken for samples which are mechanically isolated from neighboring material such as beads which would expand isotopically. The vertical expansion assumption has proven reliable for all samples considered here.

The transfer function from equation (2) can also be considered the cantilever's responsivity. Unlike typical photon detectors, however, the cantilever's responsivity is influenced by sample mechanical properties which masks the desired expansion signal. Variations in the cantilever responsivity may provide an analytical formulation which explains the previously reported probe-sample interaction effect. The general solution for the transfer function can be determined by solving the system shown here $$H_c^*(x, s) = C_1 e^{-K_c x} + C_2 e^{K_c x} + C_3 e^{-iK_c x} + C_4 e^{iK_c x}, \quad (3)$$

$$\begin{bmatrix} e^{-K_c} & e^{K_c} & e^{-iK_c} & e^{iK_c} \\ -K_c e^{-K_c} & K_c e^{K_c} & -iK_c e^{-iK_c} & iK_c e^{iK_c} \\ (-K_c)^2 - K_m(-K_c) & (K_c)^2 - K_m(K_c) & (-iK_c)^2 - K_m(-iK_c) & (iK_c)^2 - K_m(iK_c) \\ (-K_c)^3 + K_f & (K_c)^3 + K_f & (-iK_c)^3 + K_f & (iK_c)^3 + K_f \end{bmatrix} \begin{bmatrix} C_1 \\ C_2 \\ C_3 \\ C_4 \end{bmatrix} = \begin{bmatrix} 0 \\ 0 \\ 0 \\ K_e \end{bmatrix}.$$

The analytical solution of the transfer function is determined by performing a matrix inversion of equation (3) and then applying the solution to equation (2). For clarity and ease of calculation, the mechanical properties in the formalism have been grouped into four K values. These K values are frequency dependent stiffness functions which are defined depending on the choice of tip-sample stiffness model. For the tip-sample spring-damper model depicted in FIG. 6a, the K values are defined here $$K_f = \frac{3 m_{tip}}{k_c} s^2 + \frac{3 k_{f_i}}{k_c} s + \frac{3 k_f}{k_c}, \quad (3)$$

$$K_e = \frac{3 k_{f_i}}{k_c} s + \frac{3 k_f}{k_c},$$

$$K_c^4 = -\left(\frac{3m}{k_c} s^2 + \Gamma \frac{3m}{k_c} s\right),$$

$$K_m = \frac{3 k_{m_i}}{k_c}\left(\frac{L_{tip}}{L}\right)^2 s + \frac{3 k_m}{k_c}\left(\frac{L_{tip}}{L}\right)^2.$$

The four K values shown in equation (3) may be determined by taking the Laplace transform of equation (1). $K_c^4$, $K_f$, $K_m$ and $K_e$ arise from the resistance to motion of the cantilever, the tip translation, the tip rotation and the sample motion respectively. Aspects of the responsivity behavior, such as resonance frequency shifts, have been demonstrated previously. More generally, the definition of the transfer function discussed here reveals all the intricate changes to the cantilever responsivity due to sample mechanical properties.

Referring to FIGS. 6, b and c show a comparison of the theoretical transfer function to experimentally measured data using a standard commercial contact mode probe for a 100 nm polymethyl methacrylate (PMMA) polymer film and a gold substrate respectively. Only frequencies between 250 kHz and 2 MHz are chosen for curve fitting due to noise and discrepancies between model and measured data of FIG. 6, see methods section for details. There may be a behavioral change in the cantilever response for low frequencies which is not accounted for by the model; however, for frequencies above 250 kHz, this model provides a theoretical understanding for improving the accuracy of AFM-IR imaging. Possible sources of this behavior are discussed in a later section.

A list of curve fit values with 95% confidence intervals is provided in FIGS. 6d, e and f. Since there are only 8 unique parameters; approximate values for $k_c$, $L_{tip}$ and $L$ based on supplier data are used. In one implementation, for example, these three values are assumed to be 0.2 [N/m], 10 [μm], and 450 [μm] respectively. All sample stiffness values show relatively accurate trends and the added tip mass is about 7% of the total mass of the cantilever. Assuming Hertz contact behavior, it may be approximated that the stiffness values as the product of the local effective Youngs modulus and the tip contact area radius. Assuming a contact radius of 20 nm, the effective Youngs modulus for PMMA and gold are 28 GPa and 65 GPa, respectively. These values are largely dependent on the tip geometry, AFM engagement settings and the film thickness. Regardless, the values presented here are the correct order of magnitude and provide accurate relative values. The mass values equate to a 10 μm radius ball of Silicon at the end of a Silicon cylindrical beam with radius of 6 μm and length 450 μm. The addition of this tip mass is essential for accurately describing the unique shape of the transfer function. This theory could be adapted to improve the accuracy of measuring mechanical properties of samples. The idealized spring model from FIG. 6 depends on sample mechanical properties local to the AFM tip (on the order of the tip radius). Stiffness measurements of layered samples (like the PMMA film here) would have a localized depth dependence and could offer a means to detect surface mechanical properties. In some embodiments of the present disclosure, the transfer function may be used to provide understanding of responsivity variation present in AFM-IR images.

Figure 7:
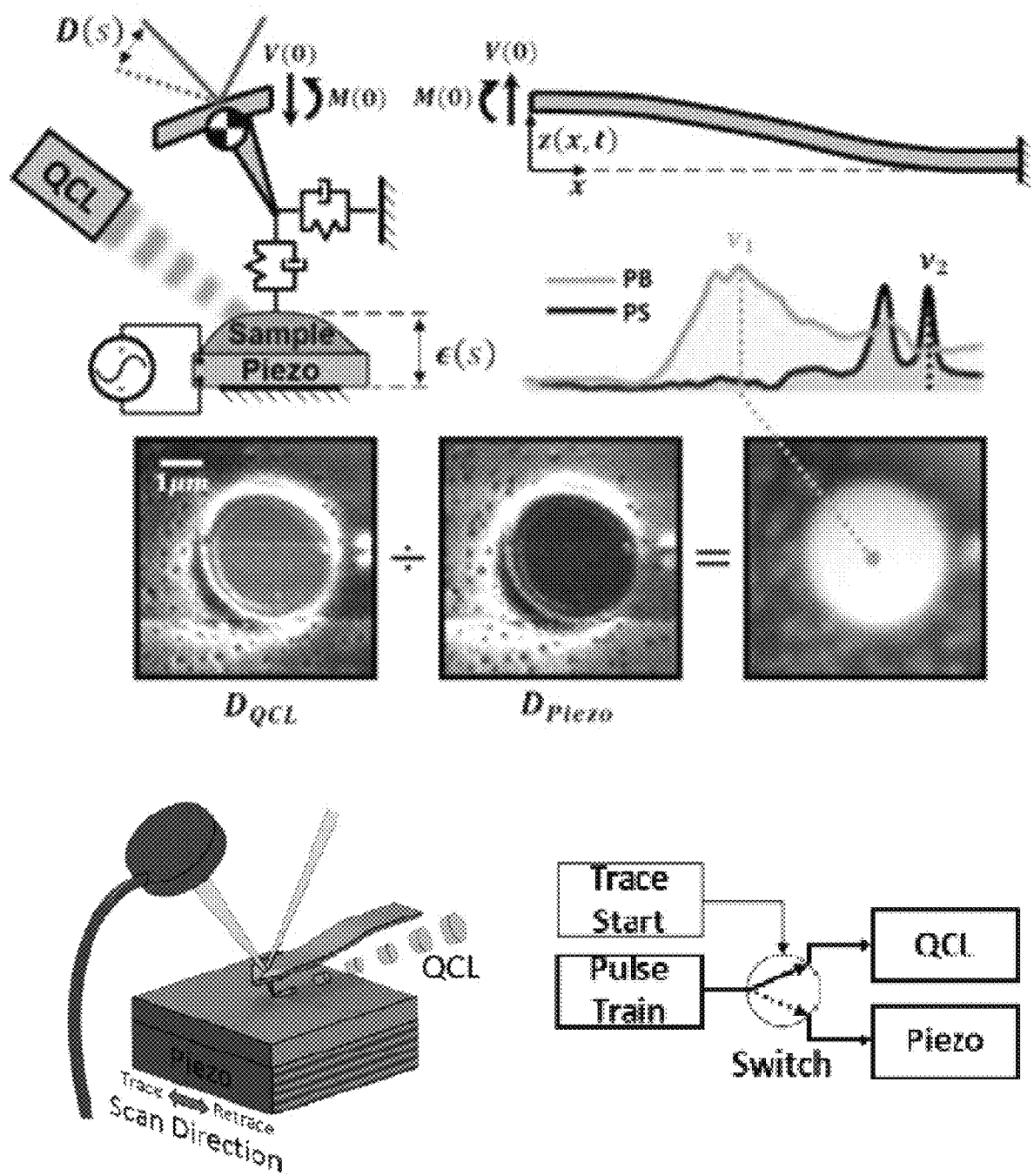
FIG. 7 describes schematic diagram of one or more of the embodiments.

FIG. 7 describes a piezo/QCL frequency response. (a) Measured transfer function on 100 nm PMMA film and gold mirror surface normalized to the scaling factor determined from their respective curve fits from FIG. 1. The green arrow (210) indicates a large amplitude change on the 4th resonance mode and the two blue arrows (212 and 214) indicate locations where the transfer functions overlap suggesting little change in responsivity effect for 225 kHz and 420 kHz. (b) Table of percent relative difference (PRD) between normalized measured transfer functions on PMMA and gold for ~390 kHz (3rd harmonic), 420 kHz, 485 kHz, ~665 kHz (4th harmonic) and 840 kHz. (c) Ratio of measured gold and PMMA transfer functions using QCL and Piezo.

Cantilever frequency response investigation. A detailed investigation of the mathematical nature of this transfer function may lead to two major conclusions: the deflection signal responds linearly to any out-of-plane sample motion and the responsivity of the cantilever is dependent on the mechanical properties of the sample local to the cantilever tip. To test the transfer function dependence on sample mechanical properties, the transfer function is measured by pulsing a Quantum Cascade Laser (QCL) at 1 kHz on both a gold mirror and 100 nm thick PMMA photoresist film. The resulting ringdown is used to produce the frequency response curves shown in FIG. 7a. These are the same curves from FIGS. 6b and c, now normalized by the expansion amplitude of PMMA and gold respectively to isolate the probe-sample mechanical interaction.

After normalization, the two response curves overlap at the two locations indicated by the blue arrows at ~225 kHz and ~420 kHz. This overlap indicates two fixed frequencies which are unaffected by changes in probe-sample mechanical interactions for this setup. It is important to note that these overlap points are specific to the cantilever and instrumentation tested and would vary for different equipment. Interestingly, the amplitudes of the resonance peaks show significant variations between polymer and substrate. An example is the amplitude of the 4th resonance mode (665 kHz), indicated by the green arrow in FIG. 7a. In this example, tracking this resonance peak over a heterogeneous sample would produce significant signal fluctuations due to sample mechanical properties. The 5th and 6th cantilever resonance modes would be entirely impossible to track as they vanish completely upon transition between PMMA and gold substrate. Because the transfer function is multiplicative, influence of the probe-sample effect can be quantified as the percent relative difference (PRD) between the normalized response curves of any two points P1 and P2 on a given sample, defined as follows $$PRD = 2 \times \left| \frac{H_{cP1} - H_{cP2}}{H_{cP1} + H_{cP2}} \right| \times 100\%. \quad (4)$$

The PRD values for two points located on PMMA and gold for select frequencies are shown in FIG. 7b. Low PRD values implies a smaller contribution from the sample mechanical properties in the PTIR signal. The resonance modes do not appear to exhibit any unique isolation from mechanical variations indicated by large PRD values for this sample. In fact, pulsing at fixed 420 kHz appears to be the best candidate for detecting the pure sample expansion signal for the equipment tested here. In general, for an arbitrary sample, measuring the PRD at multiple points could reveal an optimum fixed pulsing frequency for minimizing responsivity effects in AFM-IR images.

The above studies clearly point to the role of cantilever responsivity in both the magnitude and quality of recorded data as well as in the difficulty in conducting resonance mode experiments. It may be hypothesized that real time detection of changes in the cantilever responsivity could greatly improve the fidelity of chemical imaging at nanoscale resolutions. Atomic Force Acoustic Microscopy (AFAM) is one technique which uses out-of-plane vibrations generated by a piezo below the sample for determining sample mechanical properties. Alternative methods exist for determining the mechanical properties of the sample by vibrating the cantilever (known as Force Modulation Mode); however, it is proposed that out-of-plane sample vibrations more accurately replicate the photo-induced thermal expansion. Hence, it is hypothesized that measuring the cantilever response variations in AFM-IR images with a sub-sample piezo as used in AFAM measurements can provide an accurate measure of the transfer function variation present in the PTIR signal. To test this idea, the curves in FIG. 7a are re-measured using an out-of-plane vibration generated by a piezo actuator placed under the sample. Unlike the curves generated by the QCL alone, the piezo used here has additional acoustic behavior which makes a direct comparison of QCL and piezo signals impossible; however, it is only required that the ratio of two sample locations have similar frequency response for proper correction of the responsivity effect. FIG. 7c shows the ratio of the measured transfer function on gold and PMMA for both piezo and QCL with good agreement between 250 kHz and 2 MHz. The bandwidth of the piezo used in some embodiments may be limited to about 2 MHz, thus the piezo data becomes increasingly noisy above 1.25 MHz. Additionally, it is currently unclear as to why the behavior deviates for low frequencies. For frequencies above 250 kHz, the piezo signal response to a stiffness change matches the QCL signal. This data suggests the piezo signal can be used at fixed frequencies to completely remove cantilever responsivity variations due to sample mechanical properties allowing for an accurate measure of the local sample expansion induced by the absorption of a pulsed infrared laser. Moreover, this technique allows for accurate detection of any thermal expansion signal and could have potential applications in measuring nanoscale heat transfer as well.

Figure 8:
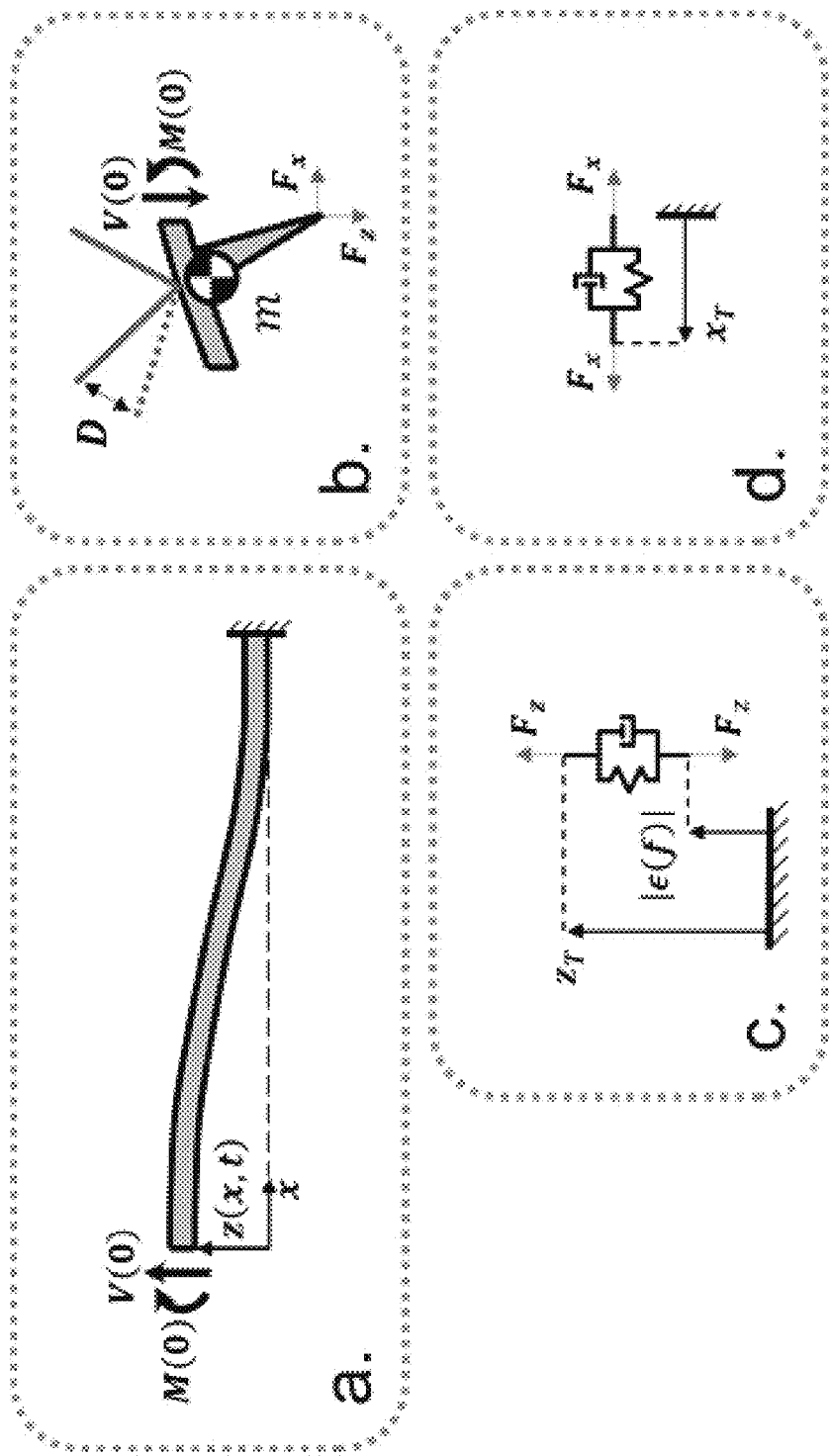
FIG. 8 describes a cantilever model free body diagrams in one or more of the embodiments.

FIG. 8 describes a responsivity correction methodology. Four-dimensional dataset of interlaced QCL and piezo amplitude data showing cantilever responsivity correction operation. The interlaced images are separated into the raw QCL 310 and raw piezo signals 320, and then divided to produce the corrected images 330.

Responsivity correction in nanoscale chemical imaging. A commercial nano-IR2 system may be modified with the addition of a piezo under the sample. The standard instrument operates by pulsing a QCL while the AFM scans the sample in the standard AFM trace/retrace pattern. The deflection signal is then filtered and fed to a lock-in amplifier to extract the harmonic amplitude of the expansion signal induced by the QCL absorption. The addition of a piezo under the sample allows for generating a constant out-of-plane mechanical vibration at the same spatial location and pulsing frequency as the QCL signal to uniquely determine the cantilever responsivity. Real time detection of 2 harmonic signals with the same frequency, however, is not possible, so the signals must be separated in either time or frequency space.

The best way to do this would be to scan the same line twice, once for the QCL signal and again for the piezo. Another path involves co-recording by interlacing the piezo and QCL signals in the same image with a small enough step size to allow for approximate overlap of the two signals. This limits the step size to either the smallest mechanical feature of the sample or the cantilever tip radius to ensure accurate overlap and requires minimal changes to the commercial instrument. A full description of signal processing is described in the materials and methods section. FIG. 8 shows the 4-dimensional data set of interlaced images. After collection, the interlaced lock-in amplitude images can be separated into the two unique data sets and divided to isolate the sample expansion signal. This is the procedure used for the data presented in the present disclosure. More generally, this process could be extended to measure complex amplitude of the expansion signal by processing the lock-in phase data as well.

Figure 9:
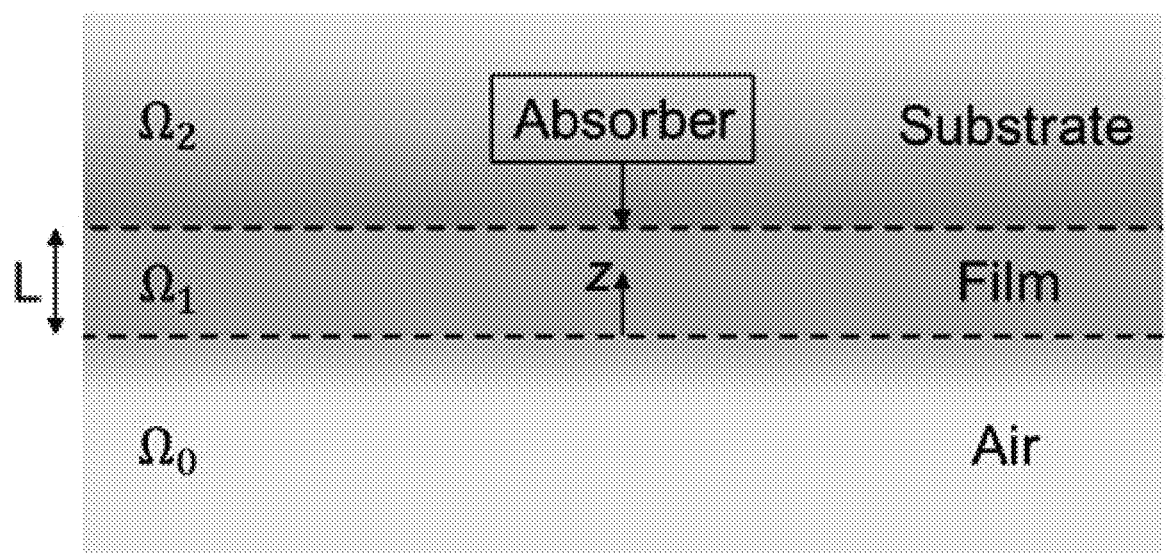
FIG. 9 describes a 1D film expansion schematic in one or more of the embodiments.

FIG. 9 describes a responsivity correction on polymer samples. (a) AFM height image flattened and offset relative to the substrate (blue region, 410). Scale bar is 10 um. Scan rate is 0.5 Hz. (b) 1485 cm$^{-1}$ 420 kHz responsivity corrected PTIR image of the same region from (a). (c) PTIR point spectra taken at the orange and blue points in (b). (d) Red ROI from (b) showing the raw and responsivity corrected PTIR images for 1309 cm$^{-1}$ and 1485 cm$^{-1}$. Blue arrows indicate regions with high responsivity variation resulting from local sample mechanical variations. Scale bar is 1 um. Scan rate is 1 Hz. (e) The raw piezo signal for each pulsing frequency of the same region as (d). (f) 1485 cm$^{-1}$ divided by the 1309 cm$^{-1}$ ratio images for 485 kHz pulsing frequency. The left is the ratio using the raw QCL data and the right is the ratio using the corrected data.

Responsivity and IR ratio correction methods on polymer samples. The responsivity effect produces a multiplicative error which is constant for different wavenumbers but changes with pulsing frequency. As a result, the ratio of recorded absorbance at two wavenumbers post-acquisition is a common method for obtaining chemical images. The use of two wavenumbers reduces the effectiveness of using a discrete frequency imaging approach and has increased susceptibility to system drift due to sequential image collection. Hence, this common approach may not be recommended. Moreover, it may be proposed that identifying the contrast of a single wavenumber without responsivity variations is only possible with responsivity correction techniques. To illustrate the recommendation, PTIR images of a polystyrene polybutadiene polymer film are collected. FIG. 9*a* shows the absolute height image near the edge of the film and FIG. 9*b* shows the responsivity corrected 1485 cm$^{-1}$ image of the same region. FIG. 9*c* shows point spectra taken at the orange and blue points in FIG. 9*b*. The 1309 cm$^{-1}$ and the 1485 cm$^{-1}$ peaks are selected as characteristic polybutadiene and polystyrene frequencies respectively consistent with FTIR spectroscopy data. Additional details are provided in the supplemental section.

To avoid aliasing any small features, a 6 µm region is selected and imaged at these wavenumbers for pulsing frequencies 300 kHz, 420 kHz and 485 kHz. The pulsing frequencies are chosen to sample the available modulation range—the first harmonic of the laser is limited to 500 kHz and responsivity correction provides high quality correction above 250 kHz. Moreover, each of these frequencies reveals a significantly different contrast (due to their location on the cantilever transfer function curve). FIG. 9*d* shows both the raw and responsivity corrected PTIR images at these pulsing frequencies. The raw images of the bead like feature for 1309 cm$^{-1}$ show enhanced contrast near the interface indicated by the blue arrows in FIG. 9*d*.

Without knowledge of the cantilever responsivity effect, any one of these images might incorrectly suggest a unique chemical feature at the interface of this bead domain. This behavior appears to change with different pulsing frequencies and is equally present in the raw piezo signal also indicated by blue arrows in FIG. 9*e*. After dividing the raw PTIR images with the piezo data, the corrected images for all pulsing frequencies produce comparable contrast and the interface variation becomes completely absent. This suggests the variation at the interface is the result of contrast due to variations in cantilever responsivity at different pulsing frequencies. This effect is equally present in the 1485 cm$^{-1}$ as well as most images collected to date using this technique to varying degrees. Peak ratios have also been used to remove responsivity variations; however, here it may be shown that measuring the responsivity variations in real time ensures reliable IR ratio data. FIG. 9*f* shows 1485 cm$^{-1}$ to 1309 cm$^{-1}$ infrared peak ratio images for 485 kHz pulsing frequency. The left image 450 is the ratio using the conventionally recorded data and the right 458 is the ratio using the corrected images proposed here. An inconsistency in the ratio images using current state of the art methods is shown by the green arrow 455. This artifact is not present in the ratio data for the other pulsing frequencies using either technique. The wavenumber images are collected 15 minutes apart, over which time the cantilever response changed slightly due to system drift. Redundancies such as repeated measurements or hyperspectral imaging could rule out such artifacts, but that reduces the effectiveness of discrete frequency imaging. Ratio images can be supplemented with local spectra to provide a better understanding in studies. However, the decision to scan the spectrum often relies on a few wavenumber images susceptible to the effects of sample mechanical properties and their heterogeneity. Here, real time detection using the piezo signal allowed for proper correction of cantilever responsivity effects when the ratio method failed.

Figure 10:
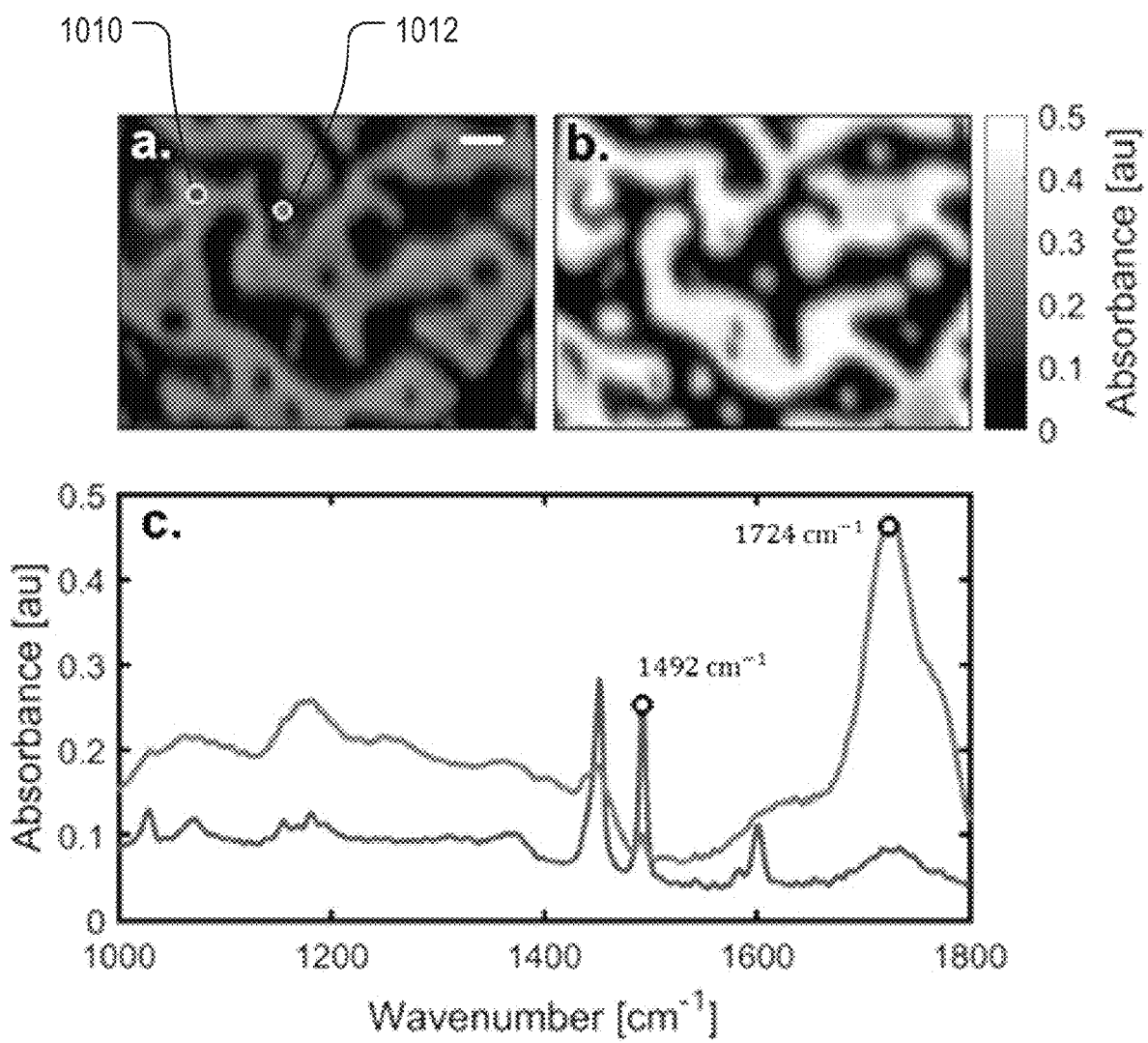
FIG. 10 describes a Fourier-transform infrared spectroscopy (FTIR) images of polystyrene polybutadiene copolymer film in one or more of the embodiments.

FIG. 10 describes a responsivity variations on resonance. (a) 1236 cm$^{-1}$ PTIR image of a 5 µm×5 µm region of a MCF-10A wild type mammary epithelial cell using a fixed 420 kHz repetition rate. (b) 1236 cm$^{-1}$ PTIR image collected by tracking the 2nd harmonic of the cantilever for the same region as (a). (c) Peak frequency image of the 2nd resonant mode collected simultaneously with (b). Green, red and blue zoomed sections 530 at the bottom compare the regions of interest indicated in (a), (b) and (c) respectively. (d) PTIR line profiles for 1525 cm$^{-1}$ resonance tracking operation using the 2nd cantilever resonance mode with scan rate of 0.05 Hz. Plot shows 1 scan and the average of 50 scans for calculating SNR values. (e) The same line profile as (d) for responsivity corrected 420 kHz fixed frequency operation for scan rate 0.25 Hz. (f) Comparison of scan rate (SR), signal to noise ratio (SNR) and normalized pixel rate (NPR) for resonance enhanced operation (using the 2nd resonance mode) as well as 420 kHz and 485 kHz responsivity correction operation using the line profiles from (d) and (e).

Responsivity variations with resonance tracking techniques. IR chemical imaging of biological samples has been widely attempted with AFM-IR. Resonance enhanced operation is the current gold standard for minimizing responsivity effects, however, it may be found that this is not the case for many samples in biology. The present disclosure demonstrates improvements in chemical specificity for AFM-IR imaging compared to standard resonance enhanced operation using MCF-10A wild type mammary epithelial cell samples. FIG. 10*a* and FIG. 10*b* show the raw PTIR images for a 5 µm×5 µm region on a cell sample using fixed 420 kHz and resonance enhance operation at the 2nd resonance mode respectively. The image domain and scan speed here are restricted to ensure accurate tracking for resonance enhanced operation and sufficient sampling of all sample features. Tracking accuracy is confirmed by comparing the trace and retrace signals for consistency. Further details are provided in supplemental section. Comparing the images from FIG. 10*a* and FIG. 10*b* reveals that operating at different laser repetition rates can have a significant effect on the contrast due to the dependence on sample mechanical properties.

The present disclosure may also confirm that the responsivity corrected 420 kHz image reveals little change from the raw data suggesting the difference in contrast shown is due to responsivity effects present in the resonance tracking image. See supplemental section for responsivity corrected images. FIG. 10c shows the 2nd resonance mode peak frequency image for the same region, which is commonly used to indicate mechanical contrast (resulting from responsivity variations). Here, the resonance peak frequency and amplitude images show a clear correlation suggesting a strong influence of responsivity variations in the PTIR signal while tracking the 2nd cantilever resonance mode. The green, red and blue boxed regions 530 of FIGS. 10a, b and c are enlarged for clear comparison. Unlike the polymer sample of FIG. 9, the PTIR signal variations here are largely a result of the sample surface topography and illustrate the challenge of imaging samples that are not prepared with controlled surface characteristics. Tracking a cantilever resonance mode is insufficient for imaging the pure sample expansion isolated from responsivity variations for heterogeneous samples.

In addition to responsivity effects on resonance, the benefits of the theory and subsequent approach developed here may be quantified. FIG. 10d shows the PTIR signal of a 5 μm line profile taken at the edge of a breast epithelial cell for 1525 cm$^{-1}$ using resonance enhanced operation at the 2nd resonance mode of the cantilever and a scan rate of 0.05 Hz. The plot shows a representative single scan as well as the average of 50 consecutive scans. FIG. 10e shows responsivity corrected PTIR line profiles for pulsing frequency of 420 kHz at a scan rate of 0.25 Hz. For equal comparison, the scan rate and lock-in time constant are adjusted such that all datasets had 1000 samples for every trace scan. Because the resonance tracking method used requires testing multiple frequency for locating the resonance peak, the scan rate is 5 times slower when compared to fixed frequency operation. FIG. 10f shows the dark field corrected signal to noise ratio (SNR) calculation for each of these profiles. The signal and noise measurements are taken from region 1 of FIG. 10d and the dark field signal is taken from the substrate section of region 2 for each scan. SNR and scan rate do not provide a good metric for directly comparing imaging techniques. A better way to compare these modalities is via the normalized pixel rate (NPR) defined by $$R_{21} = \frac{n_2}{n_1}\frac{t_1}{t_2}\left(\frac{SNR_2}{SNR_1}\right)^2. \quad (5)$$

The NPR is proportional to the number of pixels (n) and the well-known scaling between the acquisition time (t) and the resulting SNR for random white noise (SNR~t½). Operating at 420 kHz with responsivity correction is nearly 30 times faster than resonance enhanced operation using the 2nd resonance mode. Operation at 485 kHz is still faster but only by a factor of ~5 times compared to resonance enhanced measurement. This reduction of speed at 485 kHz is due to an increase in responsivity variations combined with repeatability of the instrument reducing the SNR by a factor of 2. Raw line profiles as well as repeated measurements using smooth samples (SU8 polymer films) are provided in supplemental FIG. 12. Responsivity correction at frequencies with minimal responsivity variations allow for rapid imaging of heterogeneous samples. It may be emphasized that this demonstration is simply a first example of the implementation of the theoretical insight; better controls and hardware could further improve these figures of merit.

Figure 2:
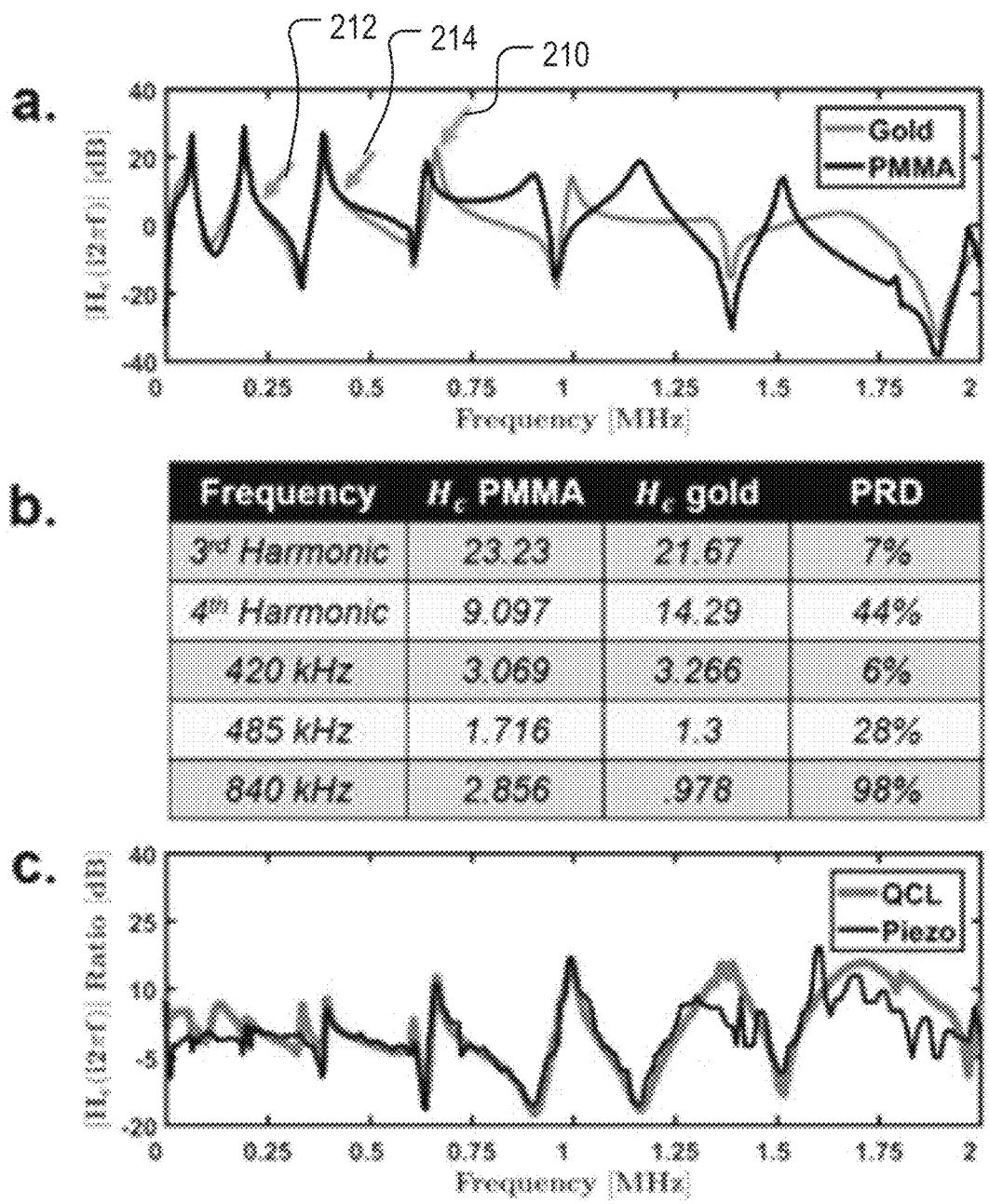
FIG. 2 describes a piezo/quantum cascade laser (QCL) frequency response in one or more of the embodiments.
Figure 3:
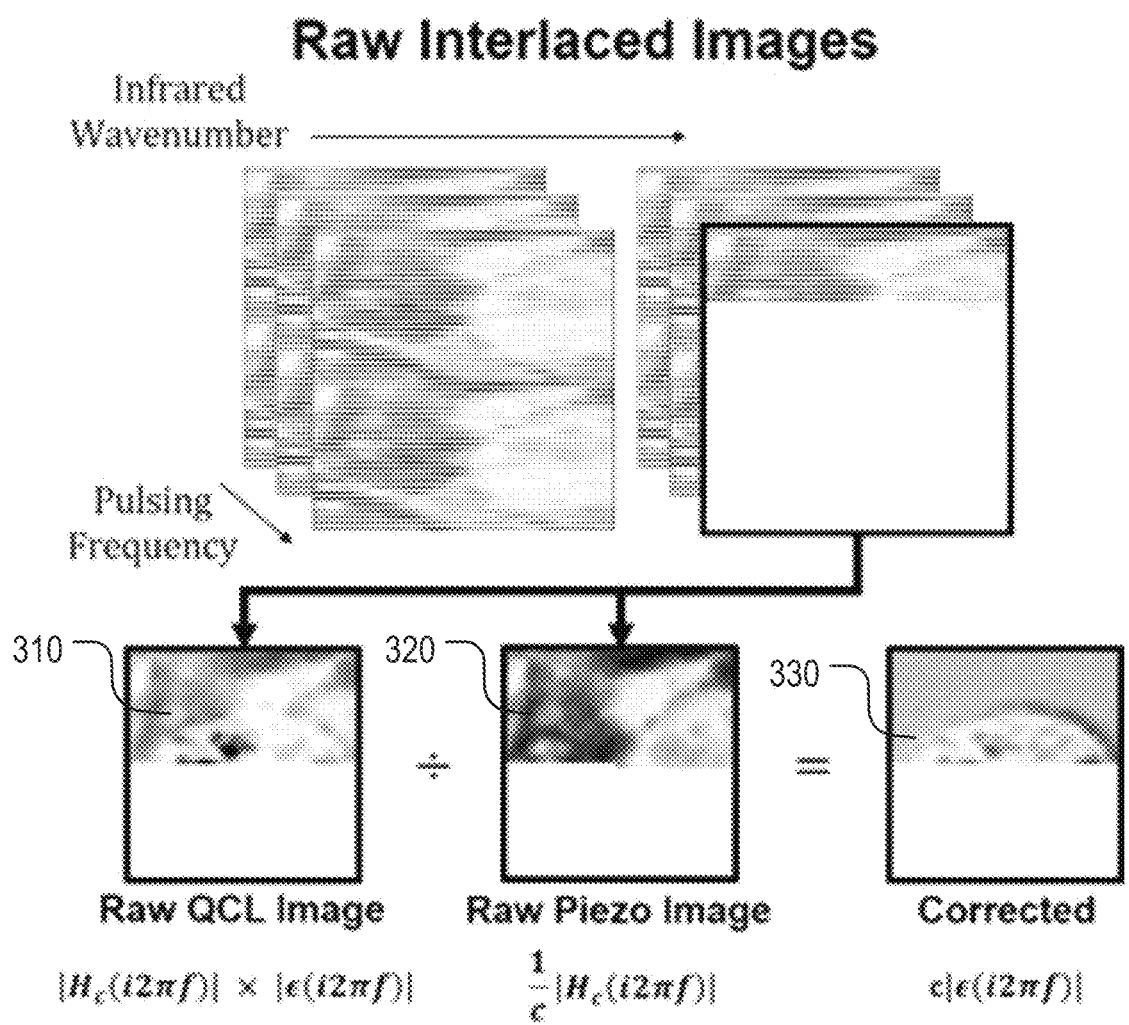
FIG. 3 describes a responsivity correction methodology in one or more of the embodiments.
Figure 4:
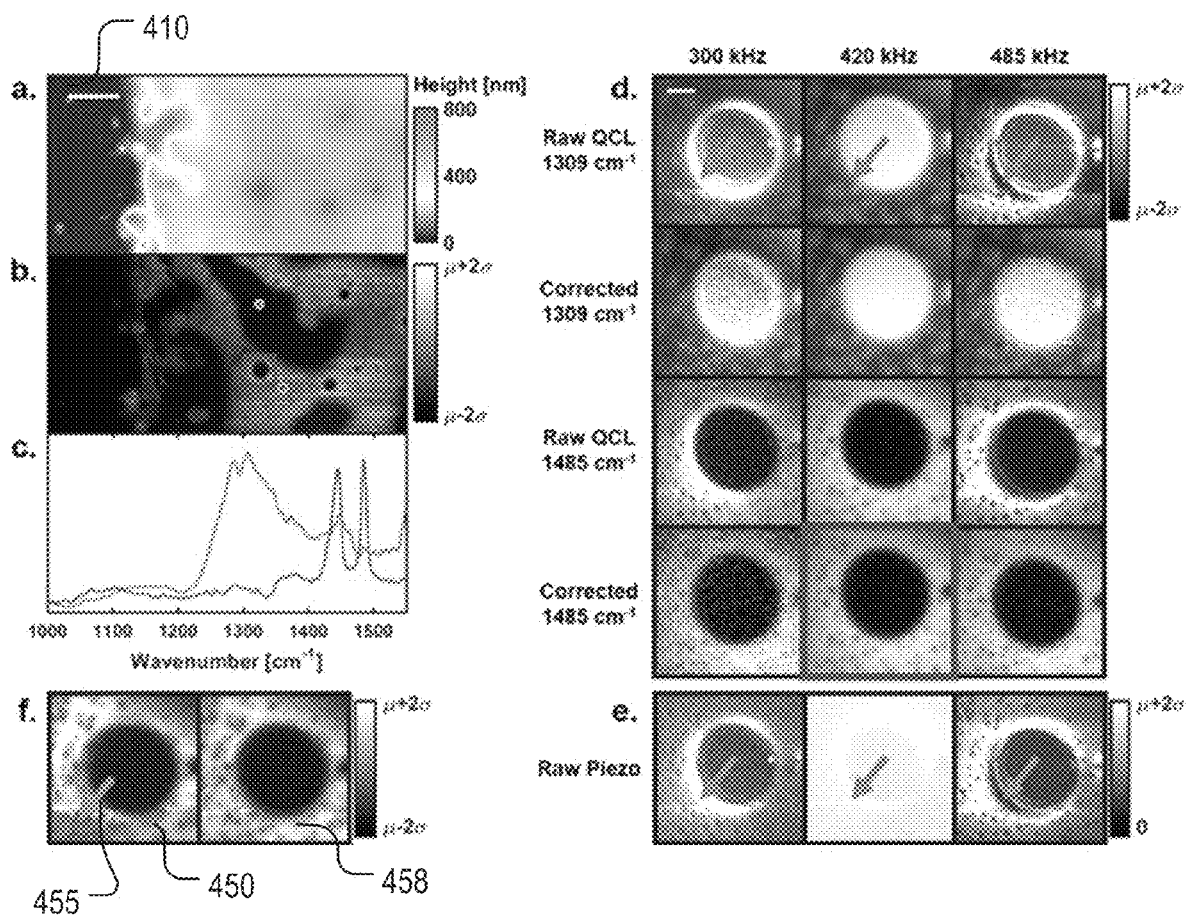
FIG. 4 describes a responsivity correction comparison to resonance enhanced technique in one or more of the embodiments.
Figure 5:
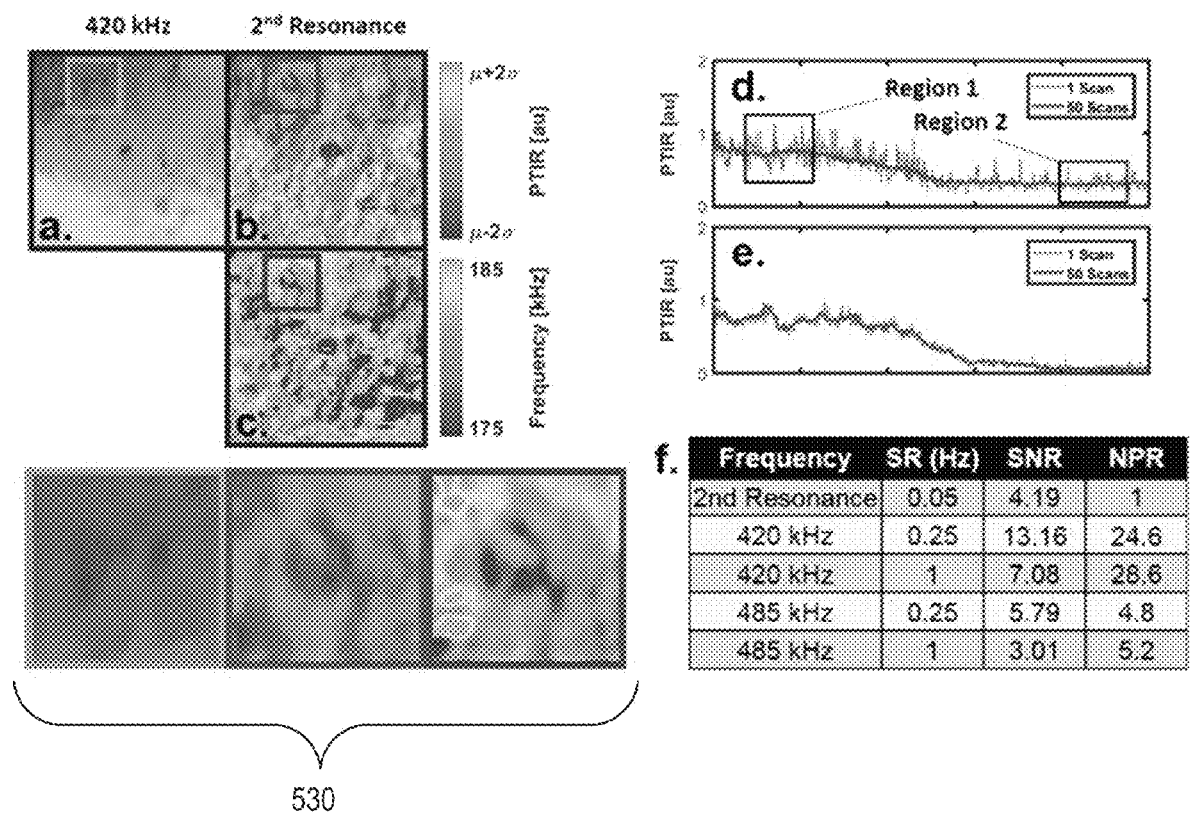
FIG. 5 describes an accurate detection of polymer thermal expansion in one or more of the embodiments.
Figure 11:
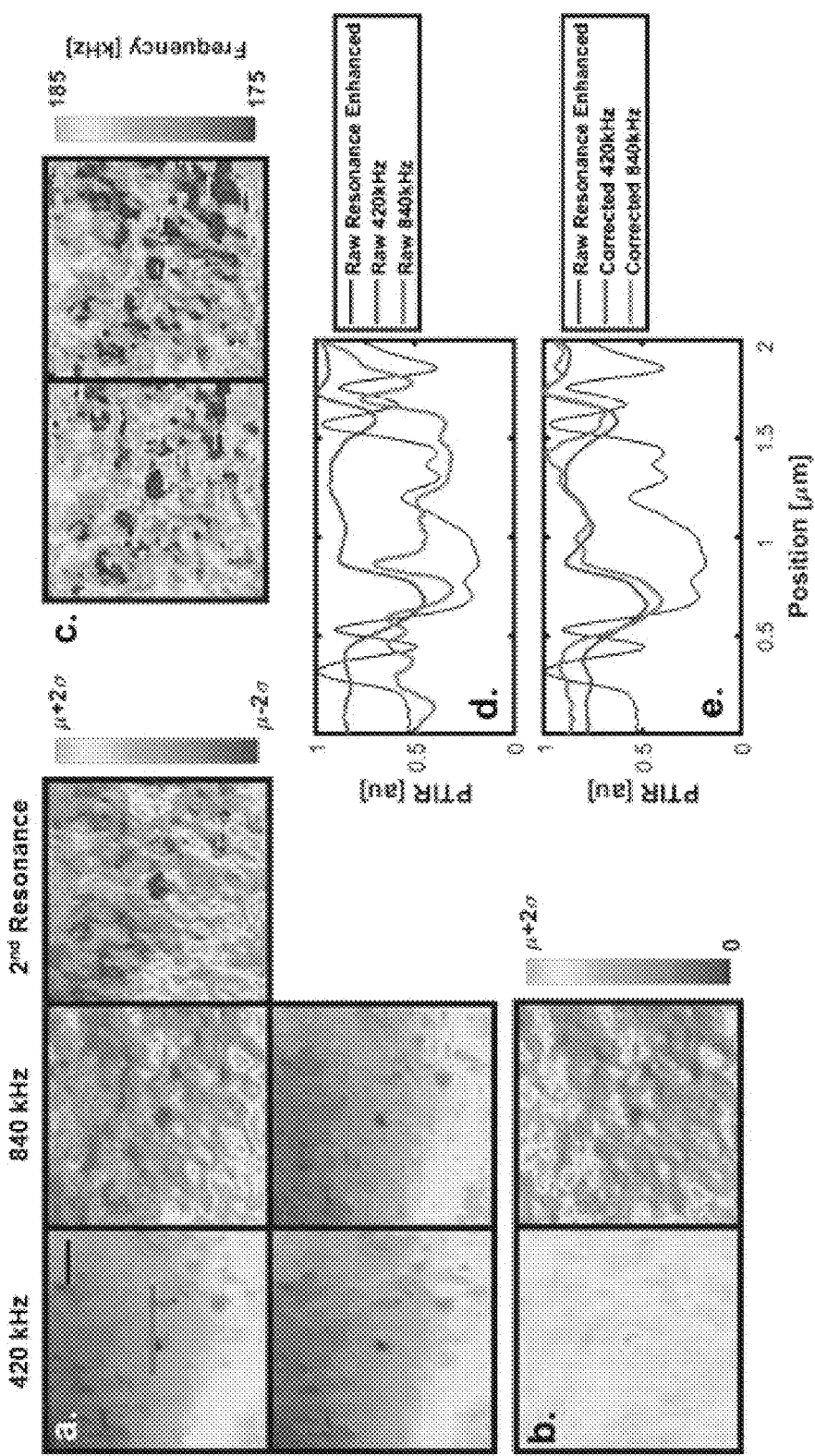
FIG. 11 describes a piezo correction/resonance enhanced comparison for cell sample in one or more of the embodiments.

FIG. 11 describes an accurate detection of polymer thermal expansion. (a) Height image of group 6 element 4 of 100 nm thick PMMA 1951 USAF target. (b) PTIR signal line profiles collected at the magenta line in (a). (i), (ii) and (iii) are line profiles for 1st, 2nd and 3rd harmonic resonance tracking operation respectively. The frequencies for the 1st, 2nd, and 3rd resonance modes are approximately 66 kHz, 185 kHz and 390 kHz respectively. The magenta and black plots are taken with the QCL laser focused to regions R1 and R2 respectively. The magenta plot is normalized by its maximum value and the black plot mean value is set to 1.5 for clarity. (iv), (v) and (vi) show the PTIR signal intensity with the QCL focus scanned across the sample for 1st, 2nd and 3rd harmonic respectively. Regions R1 and R2 light up due to focus on the sample and cantilever beam respectively. The line profiles reveal the most accurate signal when the QCL is focused to region R1 and shows decreased noise for as the frequency increases. (c) The transfer function for the black and orange points in (a). These plots are normalized according to the procedure shown in FIG. 2. Tracking the 5th harmonic (940 kHz) resonance mode failed due to large variations in peak amplitude. (d) Piezo, QCL and corrected signal for fixed 940 kHz pulsing frequency at the magenta line in (a). Magenta is the actual signal and the black line is the predicted signal using only the measured height profile.

Improving AFM-IR accuracy and sensitivity. The sensitivity of resonance enhanced AFM-IR may be demonstrated. Responsivity correction may be applied to demonstrate further improvements in sensitivity and accuracy. FIG. 11a shows an AFM height plot of a 1951 USAF resolution target on a Silicon wafer fabricated using 100 nm PMMA e-beam photo resist. Resonance enhanced operation PTIR line profiles are collected along the magenta line in FIG. 11a. FIG. 11b (i), (ii) and (iii) show the PTIR signal for resonance tracking operation using the 1st, 2nd and 3rd cantilever resonance modes respectively. The magenta and black line plots are collected using different QCL laser focus positions R1 and R2 respectively. The QCL laser focus optimization plots are shown to the right of their respective line profiles. The focus optimization plots indicate the QCL focus position which produces the highest deflection response. The maximum signal is expected to occur when the laser is optimally focus to the sample under the AFM tip. For the 1st and 2nd resonance modes, the highest signal in the focus optimization plots occurs in region R2; however, the PTIR data produced with this laser focus position shows little contrast. This is true for all three black line profiles and most likely suggests the laser is focused directly to the cantilever beam. Operation using the 3rd resonance mode shows the highest signal with the QCL laser focused to region R1 and the respective magenta line profile shows reduced noise and improved contrast (resembling the sample height profile) when compared to the other two resonance modes. This data suggests the QCL focus position R1 is optimal for maximizing the signal produced by the sample expansion and minimizing the effects of cantilever heating on the recorded data. Moreover, this result demonstrates an increased susceptibility to cantilever heating for the lower cantilever resonance modes which is the most likely culprit for the deviation of the measured data and the transfer function fit observed previously. Top side QCL illumination, as opposed to earlier practice of evanescent heating in AFM-IR, will likely heat the cantilever more, which for very weakly absorbing samples (where sensitivity is crucial), will render the first and second harmonic modes less effective. One solution is to operate at higher repetition rates (above the 3rd harmonic, as the data suggests). FIG. 11c shows the normalized transfer function on PMMA and Silicon for this setup. From lessons learned modeling the cantilever, the presence of the additional mass in the cantilever tip results in large amplitude variations near the 4th (~610 kHz) and 5th (~940 kHz) cantilever resonance modes making tracking methods virtually impossible in this frequency regime or, at the very least, highly susceptible to sample mechanical properties. Thus, responsivity correction at fixed frequencies above the 3rd harmonic is one practical solution for avoiding the influence of cantilever heating on recorded data and removing sample mechanical variations. These factors illustrate the practical challenges in present state of the art of nanoscale IR measurements and often necessitate careful sample preparation and/or experimental design by experts. An approach in some embodiments implements data collection in a manner that will enable this technology to be broadly used by those unfamiliar with the intricate details of potential artifacts.

To demonstrate the approach, instead of tracking the 5th resonance peak, profiles are collected using fixed 940 kHz pulsing frequency and applied responsivity correction. In addition, the subsample piezo signal represents the local cantilever responsivity contrast by predicting the raw QCL and piezo profiles using only the Silicon and PMMA transfer function curve fits and the AFM height profile. Since the laser used here is limited to a 500 kHz repetition rate, it is measured the laser 2nd harmonic produced by pulsing at 470 kHz with a 300 ns pulse width. The magenta plots of FIG. 11$d$ show raw piezo, raw QCL and responsivity corrected line profiles for the magenta line in FIG. 11$a$. Using the curve fits from the transfer functions on PMMA and Silicon, the piezo signal profile may be accurately predicted, however, the transfer functions only represent 2 locations on the sample. Since the local sample mechanical properties are dependent on film thickness, a standard correction may be applied. The predicted piezo signal using the transfer function fit data suggests the contrast measured results from changes in the cantilever responsivity at 940 kHz. The presence of this effect is also apparent in the raw QCL signal. To predict the QCL data, the local sample expansion is also required. The sample chosen for this experiment is sufficiently smooth and thin which allows for approximating the local sample expansion as a 1-dimensional thin film expansion (i.e. linear with thickness). Thus, the expansion of this sample, to first approximation, should be proportional to the local thickness of the film with an additional offset to account for substrate heating. Details regarding the 1-dimensional expansion model are provided in the supplemental section.

The measured height data and transfer function fits allow for predicting the raw piezo and QCL signals. More sophisticated analytical models could be incorporated to better understand the thermal expansion behavior of samples with well-defined geometries and relate the responsivity corrected PTIR data to sample expansion. This could provide a heightened understanding of governing thermoelastic behavior of these materials. For a more complex geometry, predicting these signals would require more information and numerical methods for determining the sample expansion. Regardless, this demonstrates correcting AFM-IR with the signal generated by the piezo enables accurate, model free detection of the PTIR signal free of responsivity effects. This contrast is theoretically proportional to the desired sample expansion which more closely resembles the desired spectral information. Additionally, responsivity correction can be performed at any pulsing frequency and is not restricted to low frequency resonance modes. This allows for lower noise, higher sensitivity and more accurate imaging than resonance enhanced operation.

Embodiment One: Summary and Conclusion

The present disclosure describes a method and apparatus including an usage of a piezo base for subtraction of signal produced on the basis of mechanical stiffness properties of sample, as shown in FIG. 7. The present disclosure describes that responsivity due to sample stiffness may be measured using a piezo dataset and in turn be removed from the PTIR signal to obtain the true PTIR signal that is independent of sample stiffness. The present disclosure may use a commercial nano-IR2 and incorporated a custom built circuit and a piezo with surface modified to reflect infrared radiation to it, wherein the piezo material may be either placed under the sample or the sample is directly applied to it, and the signal generated by the piezo may be proportional to the cantilever response to sample stiffness. Therefore, in the present disclosure, pure sample expansion due to infrared absorbance may be obtained by dividing the measured signal and the piezo signal.

Detection of photo-induced thermal expansion with Atomic Force Microscopy (AFM) offers high sensitivity, nanoscale correlated chemical imaging. However, variations in probe-sample mechanical interactions may corrupt the underlying chemical contrast. These variations are a direct result of changes in the cantilever response to sample expansion. Here, an analytical understanding of the process is developed to provide practical paths to realizing its advantages. Using a mechanically induced out-of-plane vibration, the responsivity variations can be measured and removed from the AFM-IR signal to isolate the sample expansion. Removing responsivity variations in this way allows for fixed pulsing frequency operation which is shown to improve signal sensitivity by operating outside the noise bandwidth of the system where resonance tracking fails. The methods proposed here demonstrate a more robust chemical imaging modality with improved accuracy and repeatability when compared to the present state of the art, i.e. resonance enhanced operation. Better piezo controls and hardware as well as higher frequencies offer untapped potential in terms of sensitivity and accuracy which resonance enhanced operation alone will never achieve. The present disclosure may lead to practical achievements of high-fidelity, robust, lower noise and faster nanoscale IR imaging. Moreover, by eliminating the need for detailed knowledge of artifacts and pitfalls to avoid in acquiring accurate data by means of a theoretical understanding, it paves the way for this emerging technique to be widely used by nanoscale researchers with confidence.

Embodiment One: Supplemental Section 51: Transfer Function Derivation

S1.1 Free Body Diagrams

The response of an atomic force microscope cantilever to a sample expansion signal in contact mode has been studied previously. The solution method is a modal analysis described in Principles and Techniques of Vibrations. the transfer function of the cantilever to an out-of-plane expansion is solved by converting the governing time domain equations to Laplace domain.

FIG. 8 describes a cantilever model free body diagrams. (a) Free body diagram of the cantilever beam with fixed boundary condition at x=L with an arbitrary shear and bending moment condition at x=0. (b) Free body diagram of the cantilever tip with shear and bending moment from (a). This also includes the tip forces Fx and Fz, the additional tip mass m, and the deflection laser D. (c) Free body diagram of the vertical sample spring damper model with vertical force Fz from (b). The positions of the ends of the spring are zT and the sample out-of-plane surface expansion $\epsilon$. (d) Free body diagram of the sample lateral spring damper model with force Fx from (b). The position of this spring is fixed at one end and xT at the other.

FIG. 9 describes a 1-dimensional (1D) film expansion schematic. 1D film absorber with insulating air domain and conduction semi-infinite substrate domain. The dimension z is vertical into the substrate constraining z to be strictly positive for the analysis of the film and substrate domains.

FIG. 10 describes an FTIR images of polystyrene polybutadiene copolymer film. (a) and (b) are FTIR images of Polystyrene Polybutadiene polymer sample for 1492 cm$^{-1}$ and 1724 cm$^{-1}$ respectively. White scale bar is 50 µm. (c) shows the FTIR spectra at the blue point (1010) and orange point (1012) in (a).

FIG. 11 describes a piezo correction/resonance enhanced comparison for cell sample. (a) 1236 cm$^{-1}$ PTIR images of a 5 um region of a cell. Top row is the raw PTIR signal for 420 kHz, 840 kHz and resonance enhanced operation using the 2nd resonance mode of the cantilever. Bottom row shows piezo corrected PTIR images for 420 kHz and 840 kHz. Black scale bar is 1 um. Since both corrected images produce similar contrast, the structure in the resonance enhanced image is most likely strongly influenced by responsivity variations. (b) Piezo images for 420 kHz and 840 kHz of same region as (a). (c) Shows the cantilever 2nd resonance peak frequency images for trace (left) and retrace (right). Although the tracking has intermittent issues (orange colors where tracking fails), there are clear, similar features suggesting the bulk of the contrast represents accurate tracking. (d) Line plots of the raw PTIR signal taken from the magenta line of (a) for fixed 420 kHz and 840 kHz as well as resonance enhanced operation using the 2nd resonance mode of the cantilever. (e) Responsivity corrected line profiles for fixed 420 kHz and 840 kHz compared to the raw resonance enhanced line profile. All plots in (d) and (e) are normalized by their maximum value.

Figure 12:
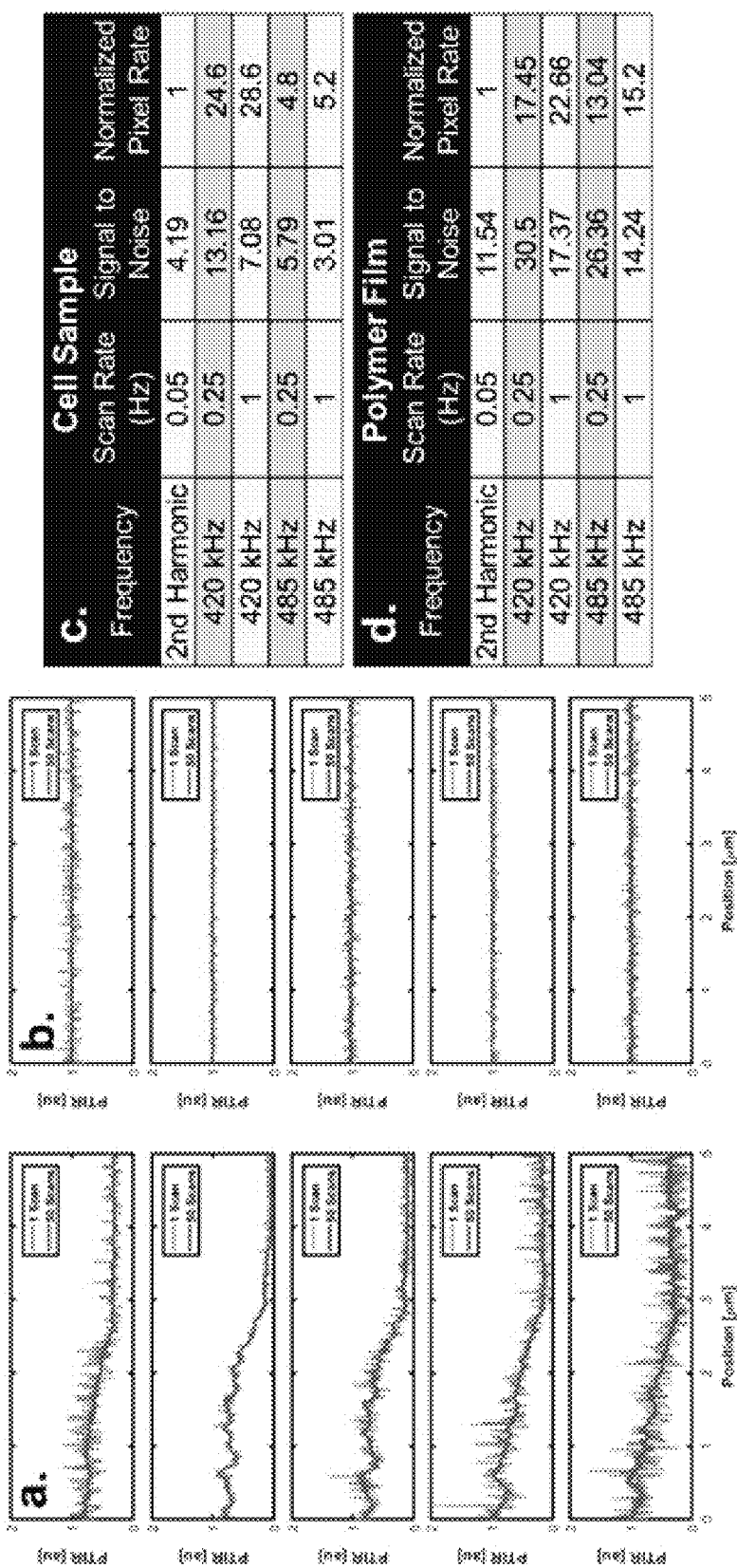
FIG. 12 describes an acquisition speed comparison in one or more of the embodiments.

FIG. 12 describes an acquisition speed comparison. (a) shows line profiles for 1525 cm$^{-1}$ on the edge of a MCF-10A wild type mammary epithelial cell on low-e glass. (b) shows line profiles for 1244 cm$^{-1}$ on a uniform 500 nm thick SU8 polymer film on a gold mirror. The 5 plots for each sample from top to bottom are the following: Resonance enhanced using 2nd cantilever resonance mode, piezo corrected 420 kHz at 0.25 Hz scan rate, piezo corrected 420 kHz at 1 Hz scan rate, piezo corrected 485 kHz at 0.25 Hz scan rate and piezo corrected 485 kHz at 1 Hz scan rate. (c) and (d) are tables with comparisons of SNR and normalized pixel rate for the cell and polymer film line profiles from (a) and (b) respectively.

Applying standard shear and bending moment sign conventions, the coupling of cantilever and sample can be separated into 4 free-body diagrams (FBD) shown in Figure. The governing equations of the cantilever can be determined from FBD shown in Figure a. Euler-Bernoulli beam equation with viscous dampening has proven to be sufficient for modeling this behavior for select AFM cantilevers below 5 MHz frequencies. Timoshenko beam theory is found to have little effect while fitting to the measured signal for the range of pulsing frequencies of interest. Thus, Euler-Bernoulli beam theory is used here. Applying fixed boundary conditions to the right side of the cantilever and arbitrary shear and bending moments to the other, it can be shown that the height of the cantilever beam z=f(x,t) can be described by the following system of equations $$EI\frac{\partial^4 z}{\partial x^4} + \rho A \frac{\partial^2 z}{\partial t^2} + \rho A \Gamma \frac{\partial z}{\partial t} = 0, \tag{7}$$

$$z(L, t) = 0, \quad \frac{\partial z}{\partial x}\bigg|_{(L, t)} = 0,$$

$$EI\frac{\partial^2 z}{\partial x^2}\bigg|_{(0, t)} - M(0, t) = 0$$

$$EI\frac{\partial^3 z}{\partial x^3}\bigg|_{(0, t)} - V(0, t) = 0.$$

Here, E is the cantilever material Young's modulus, I is the beam cross-sectional moment of inertia, $\rho$ is the cantilever material density, A is the beam cross-sectional area, L is the length of the cantilever beam and $\Gamma$ is the viscous dampening constant for a beam element motion in air. M and V are the moment and shear at the end of the beam.

S1.2 Shear and Moment Derivation

The boundary conditions are an essential component for accurate determination of the cantilever behavior. The shear and bending moment for the boundary conditions of equation (7) can be determined from the FBDs shown in Figure b, Figure c and Figure d. Considering the FBD shown in Figure b, expressions for the shear and bending moment values may be written as follows $$V(0, t) = -m_{tip}\frac{\partial^2 z}{\partial t^2}\bigg|_{x=0} - F_z(t), \tag{8}$$

$$M(0, t) = -L_{tip} * F_x(t).$$

Here the lateral translation (translation in the x direction) of FBD shown in Figure b may not be constrained and, as depicted, the tip should accelerate forever to the right due to the lateral tip force $F_x$. To balance this force, there is an axial force (not shown in the figure) in the beam equal and opposite to the lateral tip force. This axial force in the beam as well as the vertical tip force $F_z$ will be assumed to intersect the tip center of mass so that they do not influence the system behavior. The forces at the tip have a unique frequency response subject to the constitutive model used for the sample. Depicted in the FBDs shown in Figure c and Figure d are two 2-parameter Kelvin-Voigt models for axial and lateral sample behavior represented by a parallel spring damper system. The forces at the tip can be determined via these FBDs as follows $$F_z(t) = k_f(z_T - \epsilon) + k_{fi}\frac{\partial(z_T - \epsilon)}{\partial t}, \tag{9}$$

$$F_x(t) = k_m x_T + k_{mi}\frac{\partial x_T}{\partial t}.$$

The position of the tip adds two extra variables. Because it is assumed that there is an axial force in the cantilever which balances the lateral force on the tip, the tip can only move vertically. Additionally, assuming a rigid cantilever tip and the vertical force which intersects with the center of mass, the tip positions can be approximated as follows $$x_T = -L_{tip}\frac{\partial z}{\partial x}\bigg|_{x=0}, \tag{10}$$

$$z_T = z(0, t).$$

S1.3 Cantilever Transfer Function

In this section, the governing equations of the cantilever for the full model may be solved. The governing equations with boundary conditions are summarized in equation (11)

$$EI\frac{\partial^4 z}{\partial x^4} + \rho A \frac{\partial^2 z}{\partial t^2} + \rho A \Gamma \frac{\partial z}{\partial t} = 0, \tag{11}$$

$$z(L, t) = 0, \quad \frac{\partial z}{\partial x}\bigg|_{(L,t)} = 0,$$

$$EI\frac{\partial^2 z}{\partial x^2}\bigg|_{(0,t)} - L_{tip}^2 k_m \frac{\partial z}{\partial x}\bigg|_{x=0} - L_{tip}^2 k_{m_i}\frac{\partial^2 z}{\partial t \partial x}\bigg|_{x=0} = 0,$$

$$EI\frac{\partial^3 z}{\partial x^3}\bigg|_{(0,t)} + m_{tip}\frac{\partial^2 z}{\partial t^2}\bigg|_{x=0} + k_f(z(0, t) - \epsilon) + k_{f_i}\frac{\partial(z(0, y) - \epsilon)}{\partial t} = 0.$$

This description may be different than previous disclosure. The transfer function of an out of plane expansion may be determined. Previous disclosure may use a force applied to the cantilever due to the sample expansion. The present disclosure may apply concepts of linear spring and dampers to recast that force as a sample expansion. Assuming linear spring behavior, this analysis is rigorous, and may directly relate the sample expansion to the cantilever deflection. First, it may be normalized by the EI term, scale the x dimension and regroup all constants. Equation (11) becomes the following $$\frac{\partial^4 z}{\partial x^4} + \frac{3m}{k_c}\frac{\partial^2 z}{\partial t^2} + \Gamma\frac{3m}{k_c}\frac{\partial z}{\partial t} = 0, \tag{12}$$

$$z(1, t) = 0, \quad \frac{\partial z}{\partial x}\bigg|_{(1,t)} = 0,$$

$$\frac{\partial^2 z}{\partial x^2}\bigg|_{(0,t)} - \frac{3k_m}{k_c}\left(\frac{L_{tip}}{L}\right)^2 \frac{\partial z}{\partial x}\bigg|_{x=0} -$$

$$\frac{3k_{m_i}}{k_c}\left(\frac{L_{tip}}{L}\right)^2 \frac{\partial^2 z}{\partial t \partial x}\bigg|_{x=0} = 0,$$

$$\frac{\partial^3 z}{\partial x^3}\bigg|_{(0,t)} + \frac{3m_{tip}}{k_c}\frac{\partial^2 z}{\partial t^2}\bigg|_{x=0} + \frac{3k_f}{k_c}(z(0, t) - \epsilon) + \frac{3k_{f_i}}{k_c}\frac{\partial(z(0, t) - \epsilon)}{\partial t} = 0.$$

To solve this, time may be converted to Laplace domain. Equation (12) reduces to the following system of equations $$\frac{\partial^4 \tilde{z}}{\partial x^4} - K_c^4 \tilde{z} = 0, \tag{13}$$

$$\tilde{z}(1, s) = 0, \quad \frac{\partial \tilde{z}}{\partial x}\bigg|_{(1,s)} = 0,$$

$$\frac{\partial^2 \tilde{z}}{\partial x^2}\bigg|_{(0,s)} = K_m \frac{\partial \tilde{z}}{\partial x}\bigg|_{(0,s)},$$

$$\frac{\partial^3 \tilde{z}}{\partial x^3}\bigg|_{(0,s)} + K_f \tilde{z}(0,s) = K_e \tilde{\epsilon}(s).$$

This is the general form of the Laplace domain governing equations for an Euler-Bernoulli cantilever for any sample stiffness model. There may be 4 frequency dependent stiffness constants: $K_c$, $K_m$, $K_f$, and $K_e$. By comparing equations (12) and (13), these constants equal the following $$K_f = \frac{3m_{tip}}{k_c}s^2 + \frac{3k_{f_i}}{k_c}s + \frac{3k_f}{k_c}, \tag{14}$$

$$K_e = \frac{3k_{f_i}}{k_c}s + \frac{3k_f}{k_c},$$

$$K_c^4 = -\left(\frac{3m}{k_c}s^2 + \Gamma\frac{3m}{k_c}s\right),$$

$$K_m = \frac{3k_{m_i}}{k_c}\left(\frac{L_{tip}}{L}\right)^2 s + \frac{3k_m}{k_c}\left(\frac{L_{tip}}{L}\right)^2.$$

The transfer function with respect to sample expansion may be solved. Since equation (13) is linear with respect to sample expansion, the transfer function may be solved by setting the expansion signal equal to one. Setting this to one in Laplace domain is equivalent to solving for the impulse response of the system or the transfer function relating the sample expansion to cantilever deflection. Equation (13) becomes the following $$\frac{\partial^4 H_c^*}{\partial x^4} - K_c^4 H_c^* = 0, \tag{15}$$

$$H_c^*(1, s) = 0, \quad \frac{\partial H_c^*}{\partial x}\bigg|_{(1,s)} = 0,$$

$$\frac{\partial^2 H_c^*}{\partial x^2}\bigg|_{(0,s)} = K_m \frac{\partial H_c^*}{\partial x}\bigg|_{(0,s)},$$

$$\frac{\partial^3 H_c^*}{\partial x^3}\bigg|_{(0,s)} + K_f H_c^*(0,s) = K_e.$$

The transfer function shown here maps any out-of-plane expansion signal to the full cantilever solution as follows $$\tilde{z}(x,s) = H_c^*(x,s)\tilde{\epsilon}(s). \tag{16}$$

The signal measured in the instrument will be approximated as the deflection of the cantilever at some position near the cantilever tip as follows $$H_c(s) = \frac{\partial H_c^*(x_o, s)}{\partial x}. \tag{17}$$

This function defines the frequency response of the cantilever deflection signal to an arbitrary expansion signal and represents the cantilever responsivity. The general solution to equation (15) is the following $$H_c^*(x,s) = C_1 e^{-K_c x} + C_2 e^{K_c x} + C_3 e^{-iK_c x} + C_4 e^{iK_c x}. \tag{18}$$

Applying the four boundary conditions, the 4 arbitrary constants of equation (18) are derived from the following system $$\begin{bmatrix} e^{-K_c} & e^{K_c} & e^{-iK_c} & e^{iK_c} \\ -K_c e^{-K_c} & K_c e^{K_c} & -iK_c e^{-iK_c} & iK_c e^{iK_c} \\ (-K_c)^2 - K_m(-K_c) & (K_c)^2 - K_m(K_c) & (-iK_c)^2 - K_m(-iK_c) & (iK_c)^2 - K_m(iK_c) \\ (-K_c)^3 + K_f & (K_c)^3 + K_f & (-iK_c)^3 + K_f & (iK_c)^3 + K_f \end{bmatrix} \tag{19}$$

-continued $$\begin{bmatrix} C_1 \\ C_2 \\ C_3 \\ C_4 \end{bmatrix} = \begin{bmatrix} 0 \\ 0 \\ 0 \\ K_e \end{bmatrix}.$$

This can be solved with a simple matrix inversion. Equations (14), (17), (18) and (19) provide a complete description of the cantilever deflection signal, transfer function to an out-of-plane expansion, and is easily computed with Matlab's symbolic toolbox.

Embodiment One: Supplemental Section S2: 1D Thermal Expansion

Throughout the present embodiment, the transfer function is measured using a short pulse of the QCL. To determine the transfer function, the sample expansion needs to have an instantaneous response, however, the thermal expansion response is not instantaneous. Thus, to accurately predict measured transfer function data, a model may be developed for the 1-dimensional thermal expansion. This analysis may be started by using potential function description of classical thermoelasticity $$\nabla^2 \Phi - \frac{1}{c_1^2} \frac{\partial^2 \Phi}{\partial t^2} = mT, \quad (20)$$

$$\nabla^2 \vec{\Psi} - \frac{1}{c_2^2} \frac{\partial^2 \vec{\Psi}}{\partial t^2} = 0,$$

$$\nabla^2 T - \frac{1}{\alpha} \frac{\partial T}{\partial t} - \eta \nabla^2 \Phi = -\frac{Q}{k},$$

$$\vec{u} = \nabla \Phi + \nabla \times \vec{\Psi}.$$

This system can be difficult to solve for an arbitrary geometry but consider the 1-dimensional film absorber shown in Figure. For the 1-dimensional case, the temperature will only affect the scalar potential field $\Phi$. Thus, the vector potential $\vec{\Psi}$ is zero. This may not be generally true, but the 1D geometry greatly simplifies the behavior. It is also important to note that the scalar potential field is governed by the acoustic wave equation. When the thickness of the film is much smaller than the acoustic wavelength, the scalar potential equation reduces to just the Laplacian term. With these two simplifications, equation (20) can be written as follows $$\frac{\partial u_z}{\partial z} = mT, \quad (21)$$

$$\nabla^2 T - \frac{1}{\alpha} \frac{\partial T}{\partial t} = -\frac{Q}{k}.$$

Here, $u_z$ is the displacement [m] in the z direction, T is the temperature [K], m is a thermoelasticity constant proportional to thermal expansion coefficient [1/K], $\alpha$ is the thermal diffusivity [m2/s], k is the thermal conductivity [W/(m*K)] and Q is the volumetric heating term [W/m^3]. This system applies separately to the film domain $\Omega_1$ and substrate domain $\Omega_2$. It may be assumed that the air side is insulating and the temperature at the interface is some arbitrary function. Scaling the z dimension by L and converting time to Laplace domain, the full temperature solution can be determined by solving the heat equation in region $\Omega_1$ and $\Omega_2$ separately as follows $$\frac{\partial^2 T_1}{\partial z^2} - \frac{sL^2}{\alpha_1} T_1 = -L^2 \frac{Q}{k_1}, \quad \frac{\partial^2 T_2}{\partial z^2} - \frac{sL^2}{\alpha_2} T_2 = 0, \quad (22)$$

$$T_1(s, 1) = T_i(s), \quad T_2(s, 1) = T_i(s),$$

$$\left. \frac{\partial T_1}{\partial z} \right|_{z=0} = 0, \quad \lim_{a \to \infty} T_2(s, a) = 0.$$

Equation (22) is well-posed except for the unknown interface temperature $T_i$. The temperature in the film and substrate are determined assuming an arbitrary interface temperature $T_i$. This interface temperature is then determined with the additional constraint that the heat flux at the interface must balance. This is a common solution technique for interfaces of semi-infinite domains. Equation (23) is the heat flux constraint $$k_1 \left. \frac{\partial T_1}{\partial z} \right|_{z=1} = k_2 \left. \frac{\partial T_2}{\partial z} \right|_{z=1}. \quad (23)$$

Equations (22) and (23) fully define the temperature field. The expansion follows from equation (21) shown here $$u_z(0,s) = m_1 L \int_0^1 T_1(z,s) dz + m_2 L \int_1^\infty T_2(z,s) dz. \quad (24)$$

The vertical displacement of the zero plane represents the expansion signal measured by the system. This is defined as the integral of the product of temperature and the local thermal expansion coefficient. Since it is not restricted that the film and substrate properties are equal, equation (24) requires two integrals. Equations (22), (23) and ((24) fully define the 1-dimensional sample expansion response of a film to arbitrary heating. Like any linear, time domain problem, the expansion transfer function may be determined by setting the heating term to one. This solution can be considered the impulse response of the film expansion. The transfer function solutions to the system shown in equation (22) are relatively straight forward to compute. The solutions as a function of the interface temperature are as follows $$T_1(s, z) = \frac{\left( T_i(s) - \frac{QL^2 \alpha_1}{k_1 sL^2} \right)}{\left( e^{\sqrt{\frac{sL^2}{\alpha_1}}} + e^{-\sqrt{\frac{sL^2}{\alpha_1}}} \right)} \left( e^{\sqrt{\frac{sL^2}{\alpha_1}} z} + e^{-\sqrt{\frac{sL^2}{\alpha_1}} z} \right) + \frac{QL^2}{k_1} \frac{\alpha_1}{sL^2}, \quad (25)$$

$$T_2 = T_i(s) e^{-\sqrt{\frac{sL^2}{\alpha_2}} (Z-1)}.$$

Applying these solutions to equation (23), the interface temperature can be determined. First, to simplify the results, the following dimensionless parameters may be defined $$N_1 = \sqrt{\frac{sL^2}{\alpha_1}}, \, N_2 = \sqrt{\frac{k_2 \rho_2 c_{p_2}}{k_1 \rho_1 c_{p_1}}}, \, N_3 = \quad (26)$$

$$\sqrt{\frac{m_2^2 \alpha_2}{m_1^2 \alpha_1}}, \, f(N_1) = \frac{(e^{N_1} + e^{-N_1})}{(e^{N_1} - e^{-N_1})}.$$

These three dimensionless grouped terms $N_1$, $N_2$ and $N_3$ as well as the function $f(N_1)$ allow for reducing the complexity of the solutions. The interface temperature may be written as follows $$T_i(s) = \frac{QL^2}{k_1} \frac{1}{N_1^2} (1 + N_2 f(N_1))^{-1}. \tag{27}$$

Using the temperature solutions, the expansion of the surface at the zero plane can be determined using equation (24). The surface expansion transfer function is the following $$u_z(0, s) = \frac{m_1 QL^3}{k_1} \frac{1}{N_1^2} \left\{ 1 + \frac{1}{N_1}\left(\frac{N_3 - N_2}{1 + N_2 f(N_1)}\right)\right\}. \tag{28}$$

This solution serves as a simplified 1-dimensional expansion theory which can be applied to determine the cantilever transfer function as well as the theoretical expansion of simple geometries.

Embodiment One: Supplemental Section S3: Curve Fitting the Cantilever Transfer Function The measurement of the transfer function in the real system has some additional bandwidth limitations associated with the response of the sample, the laser pulse profile and the electronics. To accommodate this, a few more parameters are needed to scale the amplitude of the transfer function. The first addition is due to the laser pulse width. In Laplace domain, a 300 ns laser pulse is not a perfect impulse. For curve fitting measured data, the frequency response of the laser pulse may be approximated as follows $$H_1(\tau_1, s) = \frac{(1 - e^{\tau_1 s})}{\tau_1 s}. \tag{29}$$

Here the time constant is the laser pulse width. This is the Laplace domain definition of a square pulse. In addition to the pulse width of the laser, the 1-dimensional sample response also acts as a multiplicative filter. The solution of this filter is defined in equation (28). Investigation of the 1-dimensional thermal expansion reveals that the sample thermal response is essentially a step function in time. For curve fitting in Laplace domain, it is approximated as the following $$H_2(A, s_c, n, s) = \frac{A}{s}. \tag{30}$$

The addition of these two filters to the curve fitting produce a monotonically decreasing frequency response acting to scale the amplitude as a function of frequency and does not affect the shape of the cantilever modes. The final curve fit function is the following $$H_{cfit}(s) = H_1(\tau_1,s) H_2(A,s) H_c(m,\Gamma,k_m,k_{m_f},k_f,k_{f_i},m_{tip},k_c,L, L_{tip},x_o,s) \tag{31}$$

This is the transfer function used for curve fitting. Since the solution is harmonic, all values of s may be replaced with $i2\pi f$ where $f$ is pulsing frequency in Hz. There are too many parameters here to fit the response curves. The laser pulse width $\tau_1$, the cantilever spring constant $k_c$, the cantilever length $L$ and the cantilever tip length $L_{tip}$ are fixed based on experimentally set parameters and supplier data. The remaining parameters can all be determined uniquely from curve fit data provided the measured data has enough cantilever resonance peaks. For the equipment used here, the frequency range used for curve fitting is 250 kHz to 2 MHz. Curve fitting is conducted using lsqcurvefit in Matlab with the equations above defined symbolically. An array of n parameters x(1:n) are fitted, which had the following functional form $\{m, \Gamma, \ldots\} = \{e^{x(1)}, e^{x(1)}, \ldots\}$ in relation to the unknown parameters. This is done to constrain the parameters $\{m, \Gamma, \ldots\}$ to be positive. The desired parameters $\{m, \Gamma, \ldots\}$ and 95% confidence intervals are then determined from the array of fit parameters. The 95% confidence intervals are computed using outputs from lsqcurvefit and nlparci functions in Matlab.

Embodiment One: Supplemental Section S4: FTIR Spectra of Polystyrene Polybutadiene Copolymer Film The heated polystyrene polybutadiene polymer films present characteristic FTIR peaks at 1492 $cm^{-1}$ and 1724 $cm^{-1}$ corresponding to the styrene aromatic ring and a carbon oxygen double bond respectively. Figure a shows the FTIR image at 1492 $cm^{-1}$ collected using a Spotlight 400 FTIR imaging system from Perkin Elmer. Figure b shows the FTIR image of the 1724 $cm^{-1}$ band. These images demonstrate that, after heating, the triblock copolymer film undergoes phase separation into two distinct, chemically specific regions. The 1492 $cm^{-1}$ is indicative of the polystyrene component of the polymer blend. Figure c shows the full spectra of the blue and orange points of Figure a. The absence of the 1492 $cm^{-1}$ band in the orange spectra suggest these regions lack the polystyrene component. Since the QCL used for collection of the PTIR data is limited to 1550 $cm^{-1}$, 1309 $cm^{-1}$ is used in lieu of the 1724 $cm^{-1}$ band as the orange spectra shows a broad increase in absorbance under 1400 $cm^{-1}$. This broad absorbance at 1309 $cm^{-1}$ and the presence of the 1492 $cm^{-1}$ band is consistent with PTIR showing similar phase separation in the images.

Embodiment Two: Introduction

Described below is another example or embodiment of the method and/or apparatus. For applications like Atomic Force Microscopy-Infrared (AFM-IR) spectroscopy, mapping the spatially variable out-of-plane expansion of a sample enables chemical imaging below the infrared (IR) diffraction limit; however, the use of a mechanical probe such as an AFM cantilever results in artifacts know as either probe-sample mechanical variations or cantilever responsivity variations.

For heterodyne or photothermal imaging methods, this responsivity effect at fixed frequencies may be eliminated by matching the local sample expansion with a secondary harmonic sample expansion produced by a mechanical actuator such as a piezoelectric element place under the sample. By matching the harmonic vibration of the sample with equal amplitude 180 degrees out of phase allows for measuring the local sample expansion free of the mechanical probe response variation. Instead of measuring the detector voltage directly, the proposed technique maintains a zero detector voltage and records the amplitude and phase of the harmonic voltage applied to the mechanical actuator below the sample which is proportional to the local sample expansion.

By matching and cancelling the local harmonic expansion, the detected voltage (such as the AFM harmonic deflection voltage) may be held at zero thus avoiding signal saturation and increased noise associated with large deflection signal. This is beneficial for improving the signal to noise ratio especially when measuring weak expansion signals in the presence of large DC expansion signals. For example, this design has potential applications in AFM-IR for measuring small IR absorbance variations of intracellular features in highly absorbing tissues or detecting monolayer scale materials such as graphene on strongly absorbing substrates. This method could also apply to Scanning Joule Expansion Microscopy (SJEM) to improve visualization of nanoscale heat transfer. The proposed technique in the present disclosure, in general, may allow for detecting any out-of-plane expansion signal free of mechanical probe responsivity variations with greatly improved sensitivity due to maintaining zero detection voltage.

The present disclosure may remove mechanical probe variations in sample expansion measurements with additional performance benefits described previously in the overview section. This may be directly applicable to Atomic Force Microscopy-Infrared (AFM-IR) spectroscopy techniques which is a commercially available product from Anasys Corporation which has now partnered with Bruker company. This also applies to Scanning Joule Expansion Microscopy techniques which use the same hardware except without a light source to generate heating. There are no novel, practical solutions for correcting responsivity variations currently. It may show ratios of two independent expansion signals such as two wavenumber images using AFM-IR can remove these mechanical probe variations, but doesn't allow for uniquely distinguishing the two wavenumber images.

Figure 13:
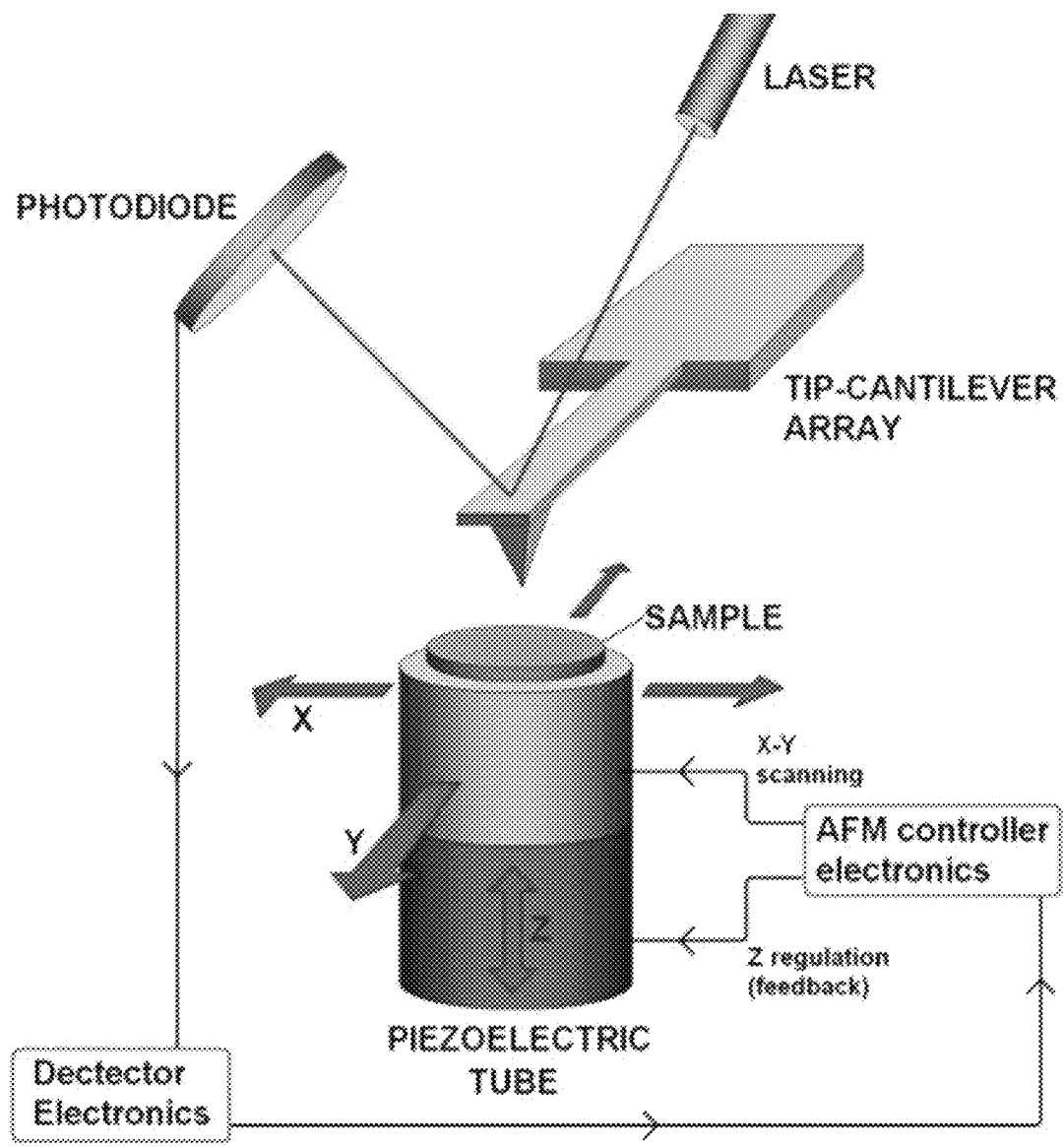
FIG. 13 describes an embodiment of the present disclosure.

FIG. 13 describes an embodiment of the present disclosure. The present disclosure describes a closed Loop Responsivity Correction (CLRC) implemented as hardware and software add-ons to Atomic Force Microscopy-Infrared (AFM-IR) instrument. The present disclosure may enhance image quality, reduce artifacts from cantilever, and greatly improve sensitivity. The present disclosure may mitigate one or more artifacts associated with existing methods/systems, for example but not limited to, from thicker materials (>1 nm), in weak expansion signals when in the presence of large DC expansion signals, variations from intracellular features in highly adsorbing tissues, and in monolayer scale materials on strongly absorbing substrates. The present disclosure may be applied to chemical profiling. In another implementation, the piezo actuator used for correcting responsivity variations may be a separate device.

Atomic force microscopy-infrared (AFM-IR) spectroscopic imaging offers non-perturbative, molecular contrast for nanoscale characterization. The need to mitigate measurement artifacts and enhance sensitivity, however, requires narrowly-defined and strict sample preparation pro-tocols. This limits reliable and facile characterization; for example, when using common substrates such as Silicon or glass.

The present disclosure describes a closed-loop (CL) piezo controller design for responsivity-corrected AFM-IR imaging. Instead of the usual mode of recording cantilever deflection driven by sample expansion, the principle of the approach in some embodiments of the present disclosure is to maintain zero cantilever deflection by CL control of a subsample piezo. The piezo voltage used to maintain a null deflection provides a reliable measure of the local IR absorption with significantly reduced noise. A complete analytical description of the CL operation and characterization of the controller for achieving robust performance are described. Accurate measurement of IR absorption of nanothin PMMA films on glass and Silicon validates the robust capability of CL AFM-IR in routine mapping of nanoscale molecular information.

Realizing the extraordinary potential of nanoscale materials for diverse applications such as high frequency nanoelectronics, NEMS and MEMS devices, and photonics requires reliable characterization tools. This need has driven significant advances in metrology capabilities using now well-established tools such as Atomic Force Microscopy (AFM) and Transmission Electron Microscopy (TEM) for visualizing both the physical structure and chemical composition of nanomaterials with sufficient spatial and molecular resolution. However, mapping the chemical composition of these materials remains a challenge that requires labeling or spectroscopic techniques. Infrared (IR) and Raman spectroscopy have been used extensively to study nanostructured materials by detecting molecular composition in bulk; however, the capabilities of far-field techniques are not suited for visualizing nanoscale materials.

Near-field spectroscopic methods are needed, which typically couple the contrast of vibrational spectroscopy with AFM mapping. However, near-field approaches are prone to artifacts whose understanding is critical for optimizing analytical measurements but as yet incomplete. For example, IR Scattering Scanning Near-Field Optical Microscopy (IR s-SNOM) and Tip-Enhanced Raman Spectroscopy (TERS) rely on specially designed probes for enhancing the near-field signal as well as complex, tip-specific models for interpreting the recorded chemical data. While tip models offer a much-needed but approximate understanding of the measured contrast, quantification of results is complicated by the difficult to predict tip-sample interactions. Similarly, while enhancement of the near field signal is necessary for measurements to be feasible, it can result in confounding factors that are difficult to control or mitigate experimentally. Small changes in experimental parameters can lead to large changes in recorded signals, amplified noise and inconsistent (less reproducible) measurements often imposing restrictions on sample preparation. This lack of consistency derives from a lack of under-standing of the dominant contributions to the recorded signal that does not allow for easy optimization. For example, innovative new techniques such as Photo induced Force Microscopy (PiFM) have great potential, but the recorded signal reportedly arises from a mixture of optical forces, tip-enhanced and direct thermal expansion and photoacoustic effects.

The present disclosure describes embodiments with a near-field spectroscopic method that ensures both robust and routine analytical measurements enabled by a thorough fundamental understanding, evaluation of relative contributions of nanoscale processes and systematic optimization of data recording.

AFM-IR spectroscopic imaging may involve a relatively simple mechanism of detecting the molecular absorption-induced thermal expansion of the sample, does not need the aid of a theoretical model for interpreting data, provides chemical contrast without labels and produces signal shown to be correlated to far-field absorption spectra. Despite these advantages, AFM-IR has a number of limitations that remain unsolved. Current state-of-the-art resonance-enhanced methods have shown monolayer sensitivity in detection; however, these studies rely on the signal enhancement of gold or polymer coated substrates. In addition, although the recorded signal (to first approximation) is proportional to far-field IR absorption, it may be demonstrated that the measured AFM-IR contrast is typically composed of contributions from chemical composition as well as mechanical features that arise from cantilever responsivity variations. Correcting for the cantilever responsivity using a subsample piezo expansion has been shown to improve chemical accuracy of the recorded contrast, but offers little improvement in sensitivity compared to the previous state-of-the-art. Thus, despite the relative simplicity and the potential of AFM-IR, it remains mired in many of the same trade-offs as other near-field approaches. Enhancement, need for narrowly defined sample preparation, convolution with confounding factors and low chemical sensitivity (especially compared to state-of-the-art IR microscopy) together restrict the analytical potential and fidelity of current AFM-IR methods to study molecular properties of nanoscale materials on substrates of importance to the nanotechnology community such as Silicon or glass.

The present disclosure describes some embodiments with the theory and demonstrate implementation of a robust closed-loop responsivity-corrected AFM-IR measurement capability. The design is geared to be universally applicable to minimizing measurement noise in AFM-IR, thereby enabling accurate, high sensitivity compositional mapping at the nanoscale without the need for overly restrictive sample preparation methods or need for specialized substrates. In contrast to the current practice of recording signal arising from cantilever deflection, the principle of the strategy is to modulate and record a harmonic voltage applied to a subsample mechanical actuator (piezo) to maintain a near-zero cantilever deflection voltage by real-time feedback control. This "closed-loop" method of operation can greatly reduce susceptibility of the recorded chemical signal to both spatial and time-varying changes in cantilever resonance, thereby simultaneously improving the chemical accuracy while reducing noise. Further, the strategy of maintaining a null deflection obviates issues of detector saturation to enable the simultaneous use of high laser power and cantilever resonance amplification. Together, the closed-loop approach seeks to make AFM-IR a more sensitivity, accurate and easier to use technique. To demonstrate, first the AFM-IR signals is theoretically described to provide a complete design, analysis and characterization of the controls for robust, high quality measurements. The present disclosure also demonstrates improvements of the developed instrumentation relative to prior state-of-the-art methods by mapping the infrared absorption of nanoscale-thick PMMA films on glass and Silicon eliminating the need for restrictive sample preparation on gold or polymer coated substrates.

Embodiment Two: Description of Method and Apparatus

The present disclosure may be implemented as embodiment two alone, or may be implemented as a combination of a portion of one embodiment (e.g., embodiment one) and a portion of embodiment two.

Concept for Closed-Loop AFM-IR. The foundation of the approach is shaped by recent progress in understanding of the recorded AFM-IR signal. The signal recorded in conventional AFM-IR measurements is the amplitude of the harmonic cantilever deflection driven by absorption-induced sample expansion. To first approximation, this signal is proportional to the local IR absorption of the sample near the cantilever tip; however, probe-sample coupling results in non-molecular contributions to the signal. The source of this non-chemical contrast can be described as variations in the cantilever's responsivity, which relates any out-of-plane, free-surface sample expansion to the recorded cantilever deflection voltage. Measuring cantilever deflection driven by a subsample piezo to estimate responsivity can help correct for non-chemical contrast (hereafter referred to as Open-Loop (OL) responsivity corrected AFM-IR or just OL), improving on post-processing methods such as IR peak ratios, experimental techniques such as resonance tracking (hereafter referred to as Resonance Enhanced (RE) AFM-IR or just RE) or conventional AFM-IR cantilever ring down measurements (hereafter referred to as Photo Thermal Induced Resonance or PTIR). While interlaced piezo and QCL signal acquisitions can be used to mitigate responsivity contributions, it may not be possible to demodulate both signals in real time. Due to low signal and repeatability challenges associated with imaging nanoscale materials, factors such as noise and sample drift that are typical of AFM measurements can significantly influence ratio data of fine sample features. Additionally, measuring two signals for a correction can only possibly decrease the SNR from the levels of either one. Thus, while this approach shows utility for responsivity correction of coarser features, smoothing fine features and no native enhancement of the signal result in a trade-off between accuracy and sensitivity in nanoscale measurements. Given the rigorous analytical approach to responsivity correction developed, the present disclosure describes embodiments following this path to seek an AFM-IR design that obviates this trade-off.

Closed Loop Piezo Controller Design. The closed-loop formulation may include a design. The first step to implementing it consists of describing the process mathematically. To begin this description, consider the governing behavior of a cantilever $$D[n]=H_c[n](\epsilon_1[n]+H_p v_2[n]). \tag{32}$$

The complex-valued harmonic amplitude signals sampled may be written in discrete time n where D is the cantilever deflection, $H_c$ is the cantilever transfer function (or responsivity), $\epsilon_1$ is the IR photo-induced, out-of-plane, free surface expansion amplitude and $v_2$ is the piezo modulation voltage. The resulting expansion of the piezo $\epsilon_2 = H_p v_2$ is mathematically equivalent to an amplifier bias (via interference of the two harmonic expansion signals $\epsilon_1$ and $\epsilon_2$). This insight allows to hypothesize that a bias can be applied to the IR expansion to maintain a constant deflection signal. Specifically, holding the deflection to zero provides a piezo voltage that is proportional to the photo-induced sample expansion. Hence, the approach of maintaining zero deflection through control of the piezo voltage offers an alternative way to record a signal (piezo voltage) which converges to the AFM-IR molecular expansion signal in real time, free from both spatial and temporal variations in cantilever responsivity (hereafter referred to as Closed-Loop (CL) responsivity corrected AFM-IR or just CL).

Although the transient photothermal sample response may be as fast as 10 ns, this may not fundamentally restrict the temporal resolution requirements of the proposed CL controller. The CL design incorporates heterodyne detection of a quasi-steady state harmonic signal induced by a pulsed infrared laser. While a fast, transient thermal-mechanical response requires high temporal resolution in time-domain measurements, the quasi-steady harmonic signal obviates the need for high-bandwidth measurement. The only transient effect which needs to be accounted for is the AFM scan speed which is quite slow relative to the transient response of the cantilever probe. For a noiseless, artifact-free system, the CL approach may perfectly nullify the harmonic expansion signal regardless of the transient thermal sample response.

FIG. 124 shows a closed-loop AFM-IR piezo controller schematic. (a) AFM-IR schematic (right) with QCL and piezo induced harmonic expansions $\epsilon_1$ and $\epsilon_2$ respectively. The total expansion E is detected via the cantilever (1410)'s deflection voltage which is demodulated using a dual lock-in amplifier (left, 1420). The x and y demodulated signals are processed via a discrete-time PID controller, the output of which is feed to a Quadrature Amplitude Modulator (QAM, 1430). The harmonic voltage output of the QAM is used to drive the piezo expansion. (b) Discrete-time, closed-loop piezo controller diagram depicting the AFM-IR system response, lock-in sensor and PID controls. A discrete-time integral controller with adjustable gain $K_I$ allows for sufficient control of the piezo modulation voltage $v_2$ in order to maintain a nominally zero deflection voltage. (c) Phasor diagram of the complex-valued signals showing how the change in the piezo expansion $\Delta\epsilon_2$ at each iteration will reduce the total expansion $\epsilon$. For stable performance, the total expansion (and deflection) converge to zero. The integral gain $K_I$ can be adjusted in real time to compensate for variable cantilever responsivity $H_c$ to ensure stable and optimal controller performance FIG. 124 a depicts a piezo-controller design based on the CL concept. The operation is similar to conventional AFM-IR, wherein a pulsed, IR source is weakly focused to the sample under the probe tip and the resulting photo-induced thermal expansion drives a harmonic cantilever oscillation which is recorded using the AFM electronics (such as a quad diode). This signal is demodulated using a dual Lock-in amplifier to extract both the X and Y modulation voltages. The relation between the cantilever deflection and the recorded lock-in signal can be defined as follows $$L[n]=|H_L|(D[n]+b). \quad (33)$$

Here, L[n] is the demodulated X and Y lock-in voltages (described mathematically as a complex-valued signal), $|H_L|$ and b are the lock-in gain and bias terms and D[n] is the cantilever deflection. It is important to note that for this relation to hold, the transient response of the lock-in signal must be faster than the refresh rate of the discrete-time controller and is described in detail in supplementary section. The demodulated lock-in signal L can be applied to a discrete-time integral controller to determine the piezo modulation voltage $v_2$ defined as follows $$v_2[n+1]-v_2[n]=K_I[n](s-L[n]). \quad (34)$$

Here, $K_I[n]$ is the time-varying integral gain, s is the controller set-point and L is the lock-in modulation voltage. The piezo modulation voltage from the integral controller is applied to a custom Quadrature Amplitude Modulator (QAM) which allows for analog control of the amplitude and phase of a harmonic voltage signal. Implementation of the integral controller and design of the QAM are described in the methods and supplementary section respectively. The output of the QAM is then applied to the piezo shown in FIG. 124a to drive a spatially-constant, out-of-plane sample expansion. Note the piezo actuator used for the CL control is separate from the piezo stage used for height tracking and sample scanning. FIG. 124b depicts the complex-valued, discrete-time CL controller diagram for the piezo modulation voltage which incorporates the cantilever, lock-in and integral controller relations.

To visualize the processing of these complex modulation signals, the present disclosure utilizes a phasor diagram to illustrate their relationships (FIG. 124c). The complex signals $\epsilon_1$ and $\epsilon_2$, representing the photo and piezo induced expansions respectively, add as vectors in the complex plane, resulting in the total surface expansion, $\epsilon$. The total expansion vector is scaled and rotated by the cantilever transfer function $H_c$ (or responsivity) resulting in the cantilever deflection D at the probe laser focus position. The reflected probe laser is converted to a voltage via a quad diode, recorded with the lock-in and processed (again scaled and rotated through $H_p$ and $K_I$) such that the sum of the complex expansion vectors $\epsilon_1$, $\epsilon_2$ and $\Delta\epsilon_2$ reduce the magnitude of the total expansion $\epsilon$. For stable CL operation, the piezo expansion $\epsilon_2$ will converge to the QCL photo-induced expansion $\epsilon_1$. Thus, the recorded piezo voltage will be proportional to the photo-induced expansion signal, independent of spatial and temporal cantilever responsivity variations. The present disclosure may have wide applicability. Recording any heterodyne expansion signal in the manner proposed can be applied to many similar modalities including AFM-IR, nano-vis, and Scanning-Joule Expansion Microscopy (SJEM) with similar performance benefits.

Optimized Controller Tuning for Robust CL AFM-IR Imaging. To assess the behavior of this design and ensure optimal performance, the present disclosure may rearrange the governing equations as a complex-valued, discrete time-varying state space with the following form $$x[n+1]=A[n]x[n]+B[n]u[n],$$

$$y[n]=Cx[n]+Du[n]. \quad (35)$$

Here, x is the state vector, u is the input stimulus, and y is the desired output signal. A, B, C and D are the state, input, output and feedthrough matrices (time-varying, complex-valued scalars in this case) respectively. Equations (32, 33, and 34) may be combined to determine the state equation from Equation (35) by eliminating the lock-in and deflection signals to explicitly relate the piezo voltage and photo-induced expansion. Additionally, the state-space output, y, may be defined to equal the piezo voltage since this is the desired measurable signal. By applying these operations, the state, input and output vectors of the state-space representation may be the following $$x[n] = v_2[n], \quad (36)$$

$$u[n] = H_p^{-1}\epsilon_1[n] + H_p^{-1}H_c^{-1}[n]\left(b - \frac{s}{|H_L|}\right),$$

$$y[n] = v_2[n].$$

The state of the system and the output are both equal to the piezo voltage which (for stable operation) will converge to the input vector u. The input vector is, by design, proportional to the desired photo-induced expansion, $\epsilon_1$, but also the lock-in bias, b. Non-zero bias signal may result from either bias voltage in the electronics or non-local sources of signal such as photo-induced sample acoustics or non-local heating of the cantilever. The bias term serves as a source of additive noise when defining the system performance and is often assumed to have zero mean value, which is valid under most sample conditions. The state-space matrices are defined as follows $$A[n] = (1 - |H_L|K_I[n]H_c[n]H_p), \quad B[n] = -|H_L|K_I[n]H_c[n]H_p, \quad (37)$$
$$C = 1, \quad D = 0.$$

Without loss of generality, the system has a time-varying response as a result of both spatial and transient cantilever responsivity variations $H_c[n]$. A time-invariant system, however, is desired as it would allow for quantitative and optimal control of the system's stability and performance. To approximate a time-invariant response, the integral gain $K_I[n]$ needs to be adjusted such that the state-space matrices are constant with respect to time. An easy way to implement this idea is to measure the lock-in deflection voltage produced by driving the piezo with a constant voltage in order to estimate $|H_L|H_c[n]H_p$ as a function of sample position. The CL measurement can then be collected on a subsequent scan with the integral gain $K_I[n]$ set as follows $$K_I[n] = K_o(|H_L|H_c[n]H_p)^{-1}. \quad (38)$$

With this approach, the controller will function with a time-invariant response and performance (SNR, response time, etc.) set by the complex constant $K_o$, whose optimal value can be determined by a time-invariant performance analysis. Assuming the matrices are constant for the measurement time, the time-invariant system transfer function may be analytically described as follows $$y[n] = \sum_{l=-\infty}^{\infty} g[l]u[n-l] \quad (39)$$

$$g[n] = \begin{cases} \delta[n-1] & \text{if } Ke^{i\theta} = 1 \\ \frac{Ke^{i\theta}}{Ke^{i\theta}-1}(\delta[n] - (1-Ke^{i\theta})^n) & \text{if else} \end{cases}$$

The piezo voltage signal (state-space output y) is equal to the discrete-time convolution of the input vector u with the CL controller transfer function $g[n]$ where $Ke^{i\theta}$ is the complex-valued controller gain defined as follows $$K = |H_L||K_I||H_c||H_p|,$$
$$\theta = \angle K_I + \angle H_c + \angle H_p. \quad (40)$$

The behavior of this system (by design) may be identical to that of Euler's method and has the following stability criteria $$|1 - Ke^{i\theta}| \le 1. \quad (6)$$

To quantify the performance of the controller, a step function may be applied to the piezo for an array of 150×150 values of the integral gain $K_I$ and fit the theoretical step response to the measured data.

Figure 15:
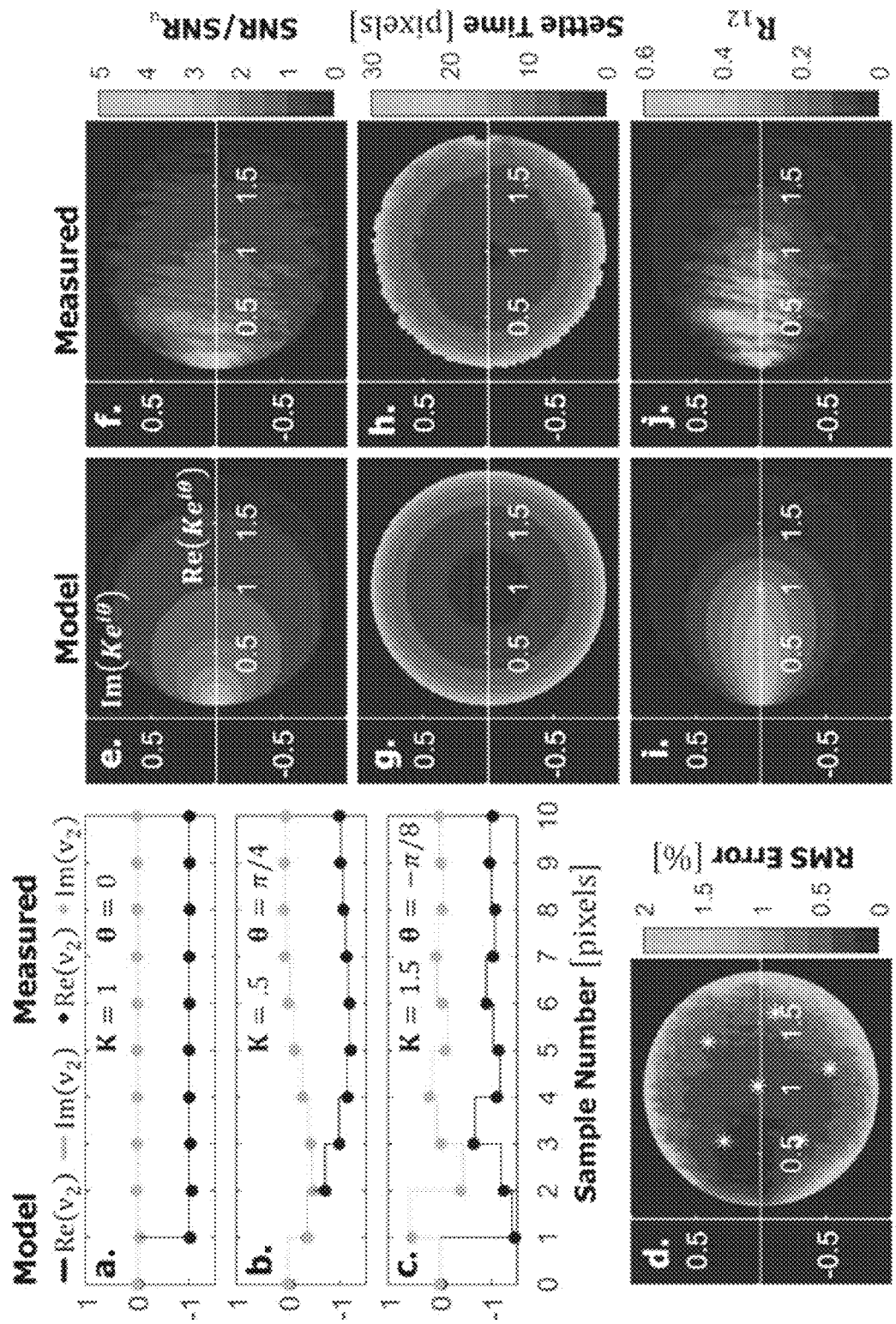
FIG. 15 describes a closed-Loop AFM-IR Piezo Controller Characterization in one or more of the embodiments.

FIG. 15 describes a closed-Loop AFM-IR Piezo Controller Characterization. A step voltage is applied to the piezo at t=0 for 150×150 values of complex integral gain (Re($K_I$)× Im($K_I$)) and then repeated 8 times for calculating Signal to Noise Ratio (SNR) as a function of the complex controller gain $Ke^{i\theta}$. (a), (b), and (c) Complex piezo control voltage step response with model fit and measured data for select controller gain values. The controller has a minimum response of 1 iteration and converges to the opposite of the input signal when operated in the stability region of the controller gain defined as $|1-Ke^{i\theta}| \le 1$. (d) RMS error between the model and measured step response as a function of the controller gain. The white points indicate the data used to fit the model and measured step response. (e) and (f) Controller SNR enhancement as a function of controller gain for the model and measured data respectively. (g) and (h) Controller settle time for the model and measured data respectively. (i) and (j) Normalized Pixel Rate (NPR) for the model and measured data respectively. Optimal controller performance (maximum NPR) is achieved for any real-valued controller gain $Ke^{i\theta}$ between 0 and 1. Operation in this optimal regime can be achieve by measuring the cantilever responsivity and using that estimate to set the integral gain $K_I$.

Figure a, b and c show the controller step response for three values of the controller gain and Figure d shows the RMS error of the fit for all values of the controller gain within the stability region. For each step response within the stability region, the piezo voltage signal approach a value of minus one, equal and opposite of the step input. This is the expected response as the two signals need to destructively interfere. Additionally, this demonstrates that the response of the controller varies depending on the complex controller gain $Ke^{i\theta}$. To determine the optimal controller gain, the controller settle time and Signal to Noise Ratio (SNR) may be determined to be associated with the convolution of the controller transfer function with a noisy input. The controller SNR can be described as follows.

$$SNR = SNR_u \sqrt{\frac{2\cos(\theta) - K}{K}}. \quad (42)$$

The SNR of the piezo control voltage (SNR) is proportional to the SNR of the input signal ($SNR_u$) and an additional function of the gain parameters resulting from signal smoothing of the controller transfer function. Figure e and f show the model and measured SNR of the piezo voltage respectively. For values of K approaching zero, the transfer function smooths the input signal, lowering the noise at the expense of controller response, defined by $$T_s = \frac{2\ln(.1)}{\ln(K^2 - 2K\cos(\theta) + 1)} + 1. \quad (43)$$

The controller response (settle time) describes the time elapsed from application of a step input for the piezo voltage to remain within a 10% error band of the final voltage. This settle time constrains the minimum sampling rate for recording independent samples. Figure g and h show the model and measured controller settle time plots respectively. The fastest response occurs in the center of the stability region, but the SNR improves near zero. The optimum performance can be determined by definition of the Normalized Pixel Rate defined as follows $$R_{21}(K,\theta) = \frac{n_2}{n_1}\frac{t_1}{T_s}\left(\frac{SNR}{SNR_1}\right)^2. \quad (44)$$

This metric allows for comparing the performance of two measurements, assuming the validity of the commonly accepted square root relationship between number of samples averaged and noise. The embodiment may directly compare the performance of OL to CL (measurements 1 and 2 respectively) for an equal number of samples ($n_1 = n_2$)

where every OL pixel has SNR equal to the input ($SNR_1=SNR_u$) and response time equal to half a CL pixel ($t_1=0.5$) due to the time dedicated for processing and writing the piezo output voltages. Figure i and j show the model and measured normalized pixel rate plots respectively. The optimum set point for controller gain $K_o$ lies anywhere on the real axis between values 0 and 1 for optimal NPR. Because there is some variability in the estimate of $|H_L|H_c[n]H_p$, it is best to set the value of $K_o$ equal to 0.5 in the center of the optimal NPR.

Hereafter, all CL data reported in the present disclosure may incorporate this value of $K_o$ applied to the gain measurement approach described above and operate at a fixed laser repetition rate. Additionally, all responsivity corrected signals (both OL and CL) may represent estimates of the input signal u and may be labeled as such without signal averaging or smoothing. Derivations of the equations in this section may be found in supplementary section.

Minimizing Time-Varying Cantilever Resonance Effects with CL AFM-IR. The high sensitivity of current state-of-the-art RE AFM-IR has been widely reported. Many of these reports rely on the combination of tip-enhancement and cantilever resonance for high sensitivity. The results indicate the possibility of improved measurements by operating with resonance sensitivity while minimizing time-varying cantilever resonance effects using CL controls.

Figure 16:
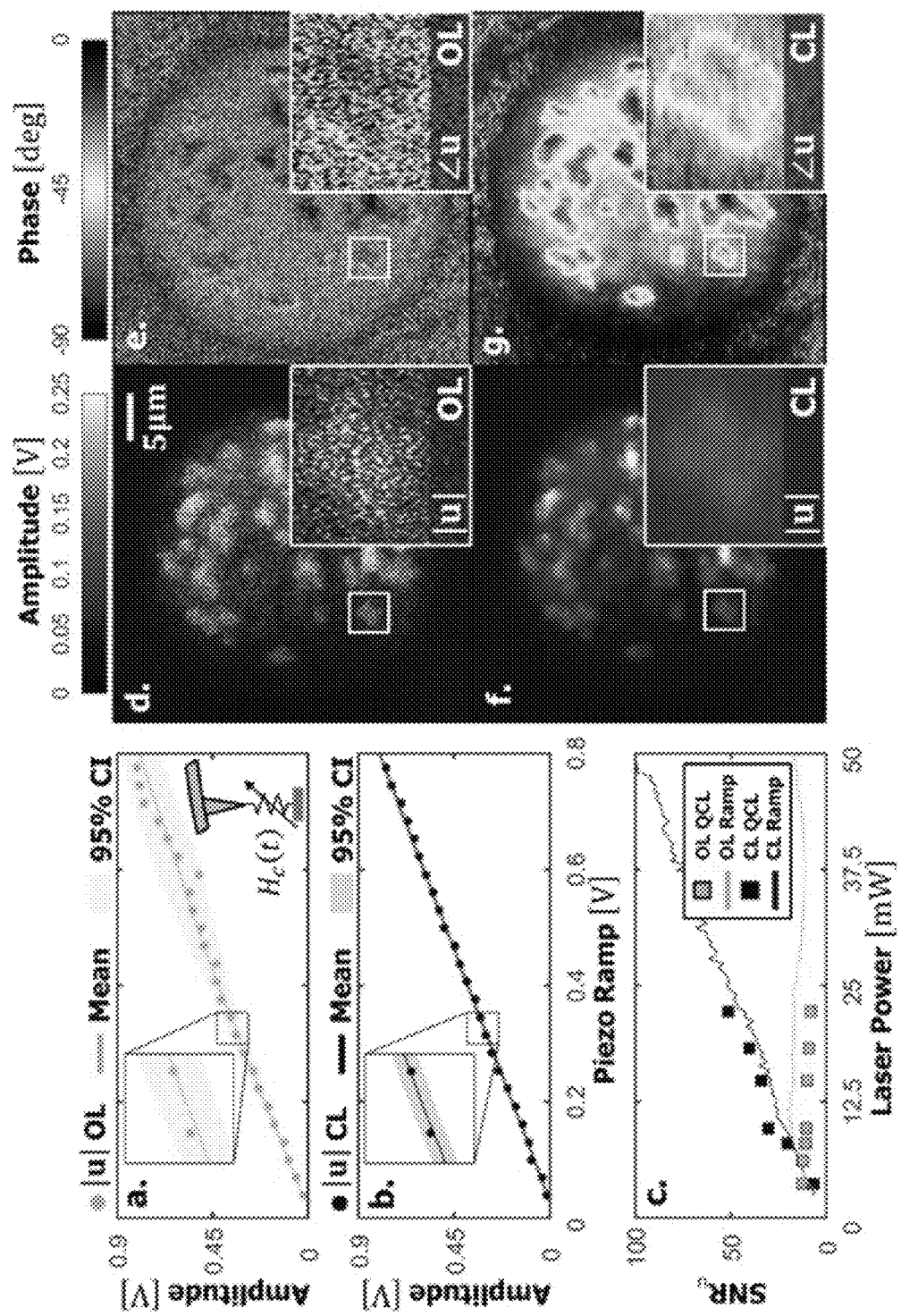
FIG. 16 describes effects of time-varying cantilever resonance in open-loop AFM-IR in one or more of the embodiments.

FIG. 16 describes effects of time-varying cantilever resonance in AFM-IR. (a) Amplitude of the cantilever deflection voltage demodulated at fixed 1007 kHz ($6^{th}$ resonance mode) resulting from driving the piezo amplitude from 0V to 1V within 0.5 seconds (single scan). The recorded deflection signal is scaled by an averaged measurement of responsivity to match the closed-loop signal $\|u\|$ while retaining the noise behavior of the raw deflection signal. Data points represent samples taken from a single representative scan plotted with mean and 95% confidence intervals (CI) of 50 repeat scans. Signal variance (noise) is observed to be constant for low signal (below 0.1V) and then increases linearly with the cantilever deflection. (b) Amplitude of the closed loop (CL) responsivity corrected signal under the same conditions as (a). The CL signal exhibits constant noise equal the minimum noise achieve in the OL signal (i.e. at 0V from (a)). (c) Signal to Noise Ratio (SNR) for the OL and CL ramped signals from (a) and (b) respectively. SNR is also measured using the signal produced by a 400 nm SU8 film heated by a Quantum Cascade Laser (QCL) at discrete laser power levels for both OL and CL modes. The laser power is correlated to the ramp voltage (x-axis) using the relation between the CL signal and laser power. The SNR of the QCL driven signal exhibits the same behavior as the piezo ramp measurements suggesting the OL noise scales with cantilever deflection (not laser power) most likely due to time-dependent variations in the cantilever's resonance behavior. (d) and (e) OL amplitude and phase responsivity corrected AFM-IR images of chromosomes from a metastatic breast cancer cell line (MCF10A series) collected at fixed 360 kHz ($3^{rd}$ resonance). (f) and (g) Same sample and conditions as (d) and (e) except operated in CL. Both OL and CL are collected with resonance enhanced sensitivity; however, the OL signal is degraded by rapid time-variations in resonance resulting in high noise and inaccurate phase signal due to processing the ratio of noisy measurements FIG. 16a shows the demodulated cantilever deflection signal at 1007 kHz ($6^{th}$ resonance) in response to a ramp voltage applied to the piezo over a 0.5 second scan. This measurement is performed on a 400 nm thick SU8 film and repeated 50 times. The variance of repeat scans is constant for piezo voltages below 0.1 V but grows linearly with increasing signal. FIG. 16b shows the same dataset collected while operating in CL with constant variance among repeat scans equal to the minimum value achieved in OL. This may be the first demonstration of multiplicative noise sources in AFM-IR and highlights the importance of CL operation to further improving AFM-IR measurements. However, the source of this variance cannot be ascertained from piezo ramp data alone. FIG. 16c shows the SNR of the ramp measurement in OL and CL, as well as SNR of measurements driven by photo-induced expansion. Both the photo-induced and piezo ramp measurements show similar behavior, suggesting the increased noise observed in the OL signal is independent of the source of signal and likely originates instead from effects that amplify the signal, such as cantilever resonance. It is hypothesized that this effect results from explicit time variations in cantilever resonance that, in OL operation, would produce noise proportional to the signal (regardless of the source). Because the CL signal u from equation (36) is independent of cantilever responsivity $H_c$, rapid, time-dependent changes in resonance have minimal influence on the recorded signal. Further investigation into the CL signal SNR is provided in supplementary section.

The implications of minimizing resonance variability using closed-loop controls are apparent when recording large signals. For example, FIG. 16d and e show the OL amplitude and phase Amide II absorption images of chromosomes collected at 360 kHz ($3^{rd}$ resonance) without signal averaging or smoothing. FIGS. 16f and g show the same sample for CL operation. Time-dependent variations in cantilever resonance result in a significant increase in noise in the OL images. Further, inaccurate phase signal trending toward a −90° phase (blue) can be observed on the substrate compared to the CL dataset, which can be expected when processing the ratio of noisy measurements. Thus, conventional AFM-IR techniques and the OL approach are less effective when measuring small signals such as chromosomes over large DC signals which amplify noise. This is the factor that limits use of OL AFM-IR to small, isolated absorbers on IR compatible substrates such as gold, Zinc Selenide (ZnSe), or polymer coated ZnSe. For the same reason, the CL approach can enable these measurements on more commonly used substrates such as glass and Silicon with minimal loss of performance.

Enabling Nanoscale IR Absorption Measurements on Arbitrary Substrates. Far-field infrared absorption measurements provide rich molecular information through analysis of both the shape and position of absorption bands. For example, analysis of the Amide I band shape is often used to characterize the secondary structure of proteins which has been widely demonstrated with both far-field[48] and near-field techniques. Although the low noise of far-field FT-IR techniques has enabled reliable identification of peak characteristics, enabling nanoscale equivalent measurements remains a challenge due to artifacts, noise and non-linear signals. Scattering-based near field methods, for instance, rely on optimally designed cantilever probes for sufficient sensitivity; however, tip-enhancement results in a non-linear signal and can cause artifacts arising from spatial heterogeneity that can limit both chemical fidelity and mapping capabilities. AFM-IR offers an alternative route to record nanoscale signal linearly correlating to far-field absorption; however, conventional methods do not provide the necessary performance to enable reliable measurements of thin materials on common nanoelectronic substrates. The present disclosure demonstrates the utility of the CL method by measuring IR absorption of 100 nm thick PMMA film applied to glass.

Figure 22:
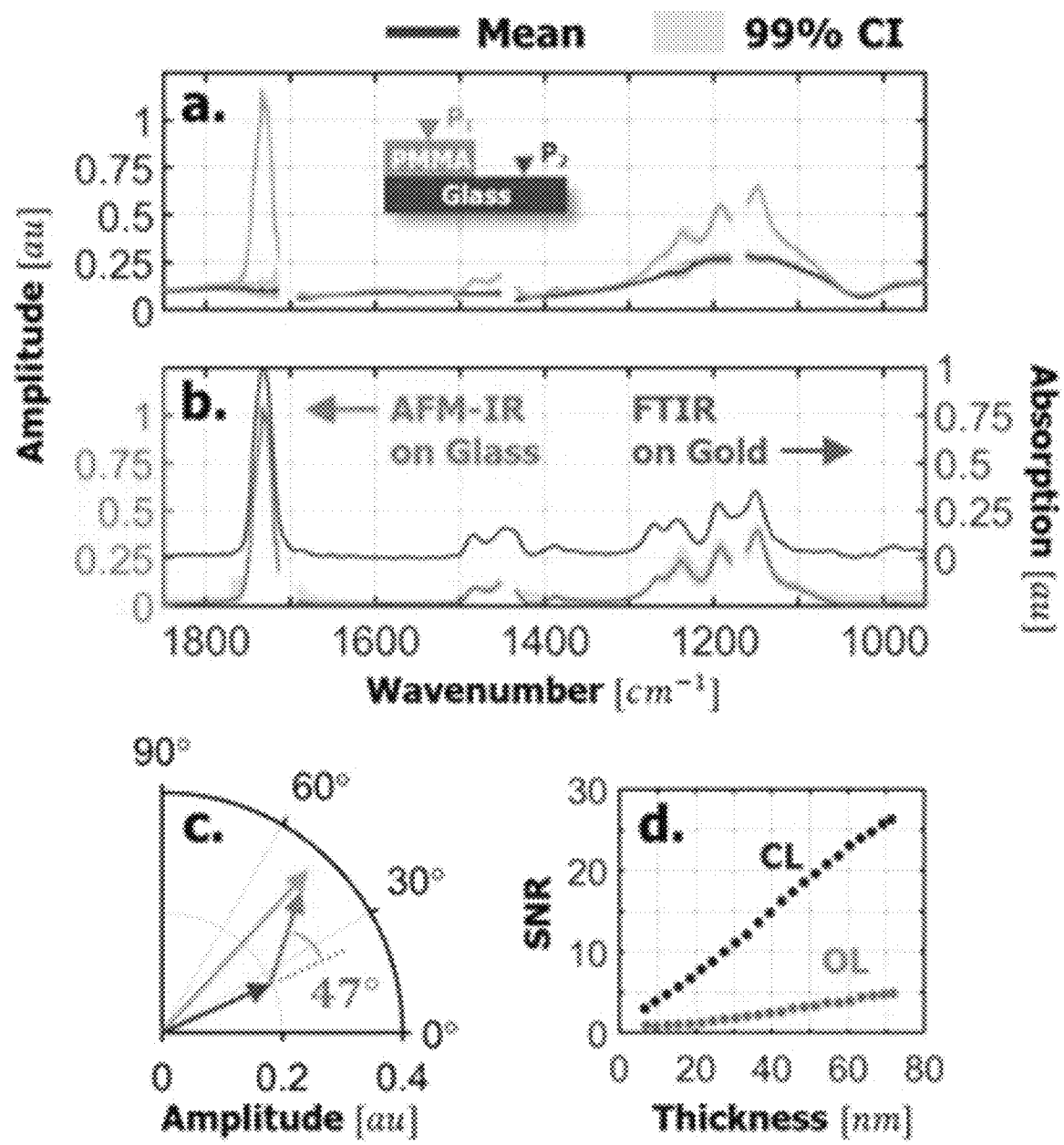
FIG. 22 describes nanoscale infrared absorption measurements on Glass.

FIG. 22 describes nanoscale infrared absorption measurements on Glass. (a) Infrared point spectra collected in closed-loop on 100 nm PMMA film (orange) and on glass substrate (blue). Data are omitted at QCL laser transitions due to artifacts and increased noise resulting from insufficient spot focus and low laser power. (b) Difference spectrum of PMMA and glass spectra from (a) compared with FT-IR reflection-absorption spectra of 100 nm PMMA film on gold. (c) Complex amplitude of point and difference spectra at 1244 $cm^{-1}$. The PMMA signal is 47 degrees out-of-phase from the baseline which is attributed to thermal diffusion. (d) Signal to Noise Ratio (SNR) versus film thickness of difference spectrum signal at 1732 $cm^{-1}$ for closed-loop and open-loop methods.

FIG. 22a shows the CL spectra (mean of 100 samples) collected at the PMMA film and glass substrate locations with 99% confidence intervals for single measurements recorded at the 4 ms pixel rate of the controller. The PMMA point spectra reveal characteristic spectral features riding on a baseline signal, which resembles the glass spectra. For conventional AFM-IR, spectra collected at two separate sample locations can exhibit different scaling due to spatially-varying responsivity effects and is often normalized in an ad hoc manner. Moreover, because the expansion signals are harmonic, the substrate and sample contributions can exhibit interference effects which cannot be corrected using conventional RE or PTIR amplitude measurements alone. Only responsivity corrected measurements provide properly scaled, complex-valued signal allowing for reliable correction of the observed substrate baseline signal. FIG. 22b shows the difference spectra of the PMMA and glass sample locations compared to FT-IR reflection-absorption spectra of 100 nm PMMA film on gold. The difference spectrum shows good agreement with bulk FT-IR measurements, enabling accurate chemical analysis of nanomaterials on common substrates.

The CL method enables accurate detection of the complex-valued photo-induced expansion, which is paramount to ensure reliable absorption measurements of nanomaterials. FIG. 22c shows the complex phasor plot of the point and difference spectra for 1244 $cm^{-1}$ revealing a 47° phase shift between difference and baseline signals. Phase shifted signal can occur as the result of a number of effects such as thermal diffusion of the photo-induced heat. Recording only the harmonic amplitude typical of conventional AFM-IR and processing the difference, for example, would result in approximately 32% error at the 1244 $cm^{-1}$ peak. Moreover, in theory, both OL and CL responsivity corrected measurements should result in the same complex-valued signals; however, processing the ratio of noisy OL measurements can not only result in heightened levels of noise but also inaccurate signal, which is observed previously with the chromosome sample. FIG. 22d shows the SNR of the 1732 $cm^{-1}$ absorption peak for CL and OL methods for PMMA thickness down to 10 nm demonstrating approximately 5× improvement in noise. Thus, the CL method provides a complete, complex-valued measurement with minimal noise for accurate detection of nanothin materials on arbitrary substrates.

Mapping Molecular Information of Nanomaterials. A number of reports demonstrate high-sensitivity AFM-IR imaging of nanothin materials such as 2D materials, Self-Assembled Monolayers (SAM) and isolated proteins; however, accurate AFM-IR absorption measurements on arbitrary substrates is often limited by non-local signals, non-chemical effects (responsivity) and noise. The CL method is designed to address these challenges.

FIG. 23 describes mapping molecular information of nanothin materials on silicon. (a) Height map of a 4 nm thick PMMA film on Silicon. (b) Closed-loop (CL) baseline corrected infrared maps of 1732 $cm^{-1}$ and 1850 $cm^{-1}$ of the 4 nm film collected off resonance at 500 kHz. (c) Same measurement as (b) collected at 460 kHz near the cantilever's 3rd resonance mode. (d) Magnitude of the PMMA film signal extracted from CL hyperspectral images compared to FTIR. CL image contrast recorded near cantilever resonance had increased sensitivity (i.e. lower substrate noise) but also additional signal uncorrelated with the local PMMA absorption which is attributed to photo-induced sample acoustics. (e) Comparison of CL and OL maps at 1732 $cm^{-1}$. Line profiles reveal improved Signal to Noise Ratio (SNR) for CL operation. The color scale for the OL measurement is scaled by a factor of 2 due to the increase noise. (f) Same maps as (e) using previous state-of-the-art Resonance Enhanced (RE) and Photo Thermal Induced Resonance (PTIR) methods. For RE measurements, the 3rd resonance mode is tracked using the commercial Nano-IR2 software. Overall this slowed acquisition time down by a factor of 2.5 in addition to worse performance when compare to CL. For PTIR measurements, coaveraging is set to produce a pixel rate equivalent to the CL and OL measurements.

To demonstrate its capabilities, a 4 nm thick PMMA film is applied to Silicon as shown in the height map of FIG. 23a. FIG. 23b shows the 1732 $cm^{-1}$ and 1850 $cm^{-1}$ baseline corrected CL absorption maps of the same region collected at 500 kHz (off resonance). The CL measurements reveal accurate maps of the localized PMMA absorption with little contribution from other non-chemical effects. Collecting this same data at 460 kHz (near $3^{rd}$ resonance) shown in FIG. 23c results in improved sensitivity (based on reduced substrate noise); however, the 1850 $cm^{-1}$ map reveals relatively high signal on the PMMA film. FIG. 23d shows the PMMA film signal extracted from CL hyperspectral images compared to FT-IR absorption normalized by the 1732 $cm^{-1}$ peak. Data collected at 500 kHz (off resonance) shows good agreement with FTIR absorption data and tends toward the noise floor at 1900 $cm^{-1}$; however, the 460 kHz data (near $3^{rd}$ resonance) seems to plateau at some other limiting value. It may be suspected that photo-induced sample acoustics or other non-local sources of cantilever heating are driving the cantilever signal producing a non-zero bias signal that is further amplified under resonance conditions. According to the CL signal defined in equation 36, a constant bias value b can become encoded spatially through variations in cantilever responsivity $H_c^{-1}b$ resulting in non-chemical contrast even after baseline correction. This is just one of a number of effects which are now detectable with the improvements in noise and accuracy of the CL method. Further investigation is required to understand the true nature of these signals to enable accurate chemical measurement with the high sensitivity of cantilever resonance. Regardless, even operating off resonance, the CL method provides accurate chemical signal with optimal noise compared to previous state-of-the-art deflection-based measurements.

FIG. 23e shows a comparison of CL and OL 1732 $cm^{-1}$ absorption maps collected at 500 kHz (off resonance). The line profiles reveal significantly reduced noise while operating in CL consistent with previous ramp and chromosome measurements. FIG. 23f shows the same measurements collected using prior RE and PTIR deflection amplitude measurements revealing high levels of noise and questionable chemical contrast in addition to reduced pixel rate to allow for resonance tracking and signal averaging respectively. Parameters of RE and PTIR measurements are provided in the methods section. The 4 nm film is easily resolved and its signal can be quantified in the CL approach. Notably, IUPAC guidelines typically recommend a signal 10-fold greater than noise to quantify results. In this case, only the CL method provides the necessary measurement performance to quantify spectra and can be a reliable method for sub-10 nm films. For example, the slight increase in the intensity of the edge of the PMMA film is ~1 nm and can be easily measured with the noise floor seen on the ordinary silicon substrate. In terms of measurement capability, thus, this work moves AFM-IR sensitivity to the realm of organic monolayers of widespread importance such as supported lipid bi-layers and self-assembled alkanethiols that are typically 1-5 nm thick. While this work has analyzed some of the more apparent sources of noise and presents a means to decrease the same, the high quality data now also allows investigation into further sources of noise and can potentially result in greater improvements to the quality of recorded data. The results also illustrate the general applicability of the approach to conventional AFM-IR instrumentation. With the CL approach, existing AFM-IR users can rapidly implement the described improvement and obtain more consistent and accurate data. Not only is the CL approach highly compatible with existing instrumentation, its deployment can also make the conduct of experiments more user-friendly to make nanoscale chemical measurements more accessible.

Extending the Detection limits of Nanoscale Chemical Imaging using Closed-Loop AFM-IR. In addition to robustness and broad applicability of the embodiments of the present disclosure, the present disclosure may rigorously quantify the advantage in quality of data. The sensitivity (responsivity) of a detector which defines the system's output response to an input stimulus is often used to compare performance of near-field spectroscopic techniques; however, this metric alone is only a partial assessment of quality since noise and output bandwidth are not considered. The high sensitivity achieved on resonance can improve detection of small, isolated absorbers, for example, but has also been shown to result in worse SNR performance when compared to data collected off resonance which may be attributed to resonance instability. Because the noise associated with resonance instability is difficult to quantify, the limits of detection in conventional open-loop AFM-IR cannot be estimated reliably. In fact, the only reported value to date is the $$3 \frac{fm}{\sqrt{Hz}}$$

readout noise of optical cavity AFM probes most likely due to highly stable mechanical resonance of the device. Here, the present disclosure describes a similar analysis and demonstrates the improved detection limits of CL AFM-IR using standard contact mode probes.

Figure 17:
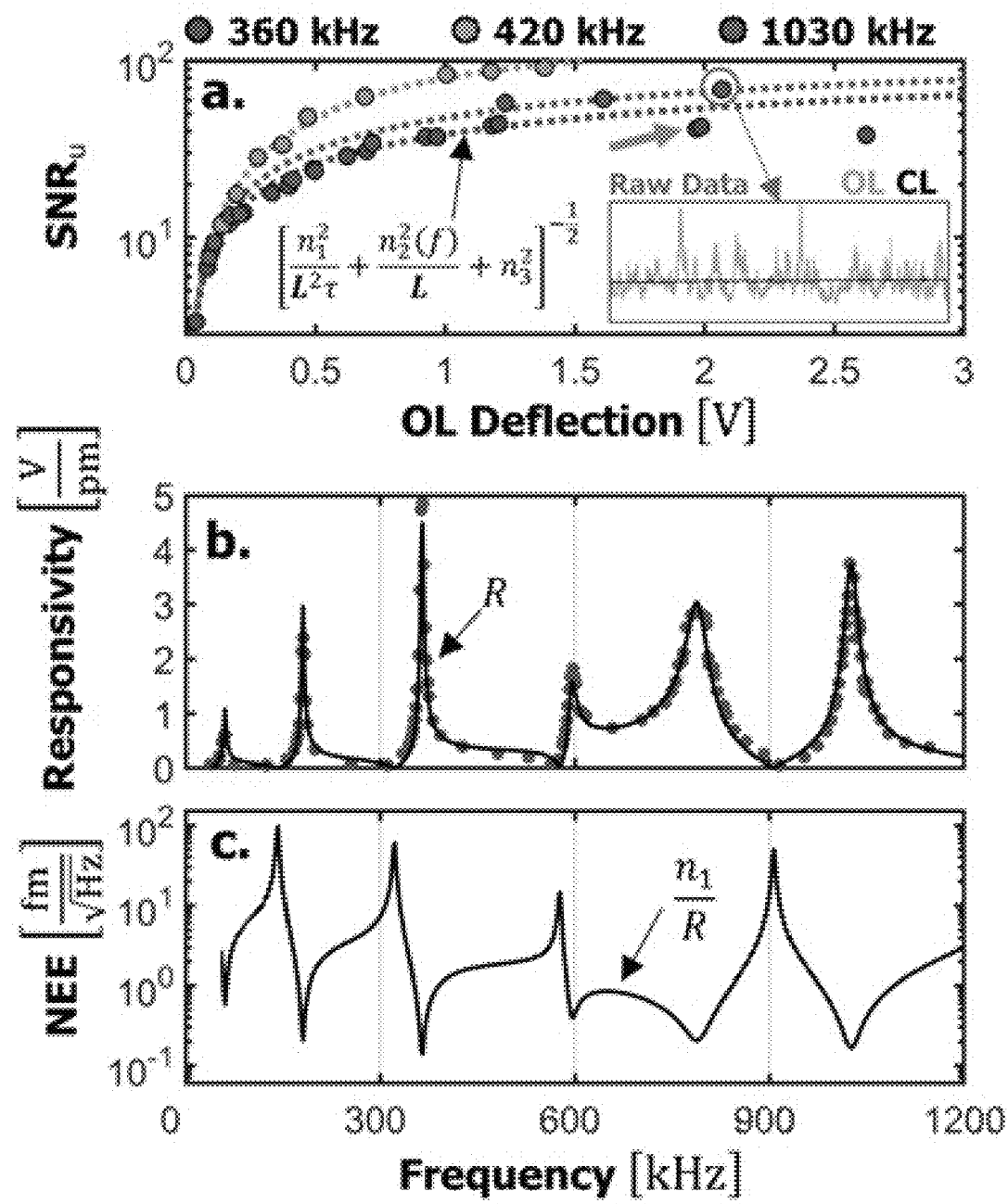
FIG. 17 describes one or more detection limits of closed-loop AFM-IR in one or more of the embodiments.

FIG. 17 describes detection limits of closed-loop AFM-IR. (a) Signal to Noise Ratio (SNR) of Closed-Loop (CL) responsivity correct AFM-IR collected using the signal produced by a 100 nm PMMA film heated by a Quantum Cascade Laser (QCL). The x-axis is the raw lock-in signal produced by operating the QCL in Open-Loop (OL). The resonance enhanced frequencies 360 kHz ($3^{rd}$ resonance) and 1030 kHz (6th resonance) exhibit reduced SNR (or relatively larger noise) at large signal when compared to an off-resonance frequency 420 kHz. This reduction is attributed to the same resonance stability from OL operation and is observed to exhibit lower SNR (non-linear noise) with increasing signal indicated by the blue arrow. Despite the diminishing performance at large deflection, CL operation still exhibits optimal SNR shown in the inset comparing OL and CL at 1030 kHz and 100% laser power. All curves shown have the same, constant noise (electronic noise $n_1$) in the low signal regime. (b) Measured cantilever responsivity (blue) with cantilever transfer function curve fit (black). The fit function is scaled such that the y intercept matched the slope of the force curve equal to $$9.2 \left[ \frac{V}{\mu m} \right]$$

and then scaled by $$3514 \left[ \frac{V}{V} \right]$$

to convert to lock-in voltage. (c) Noise Equivalent Expansion (NEE) which is equal to the electronic noise from (a) divided by the cantilever responsivity. NEE describes the minimum measurable expansion signal with an SNR of 1 in a one hertz output bandwidth. As expected, resonance enhancement offers the highest sensitivity, but only with the minimal noise of CL operation.

FIG. 17a shows the SNR per single pixel (4 ms bandwidth) for CL image data from the photo-induced expansion of a 100 nm thick PMMA film. The OL deflection (x-axis) equals the CL signal scaled by $|H_L|H_cH_p$. The relationship between SNR and OL deflection is derived in supplementary note 4 of the supplemental section. For large deflection, data recorded at 360 kHz ($3^{rd}$ resonance) and 1030 kHz ($6^{th}$ resonance) exhibit worse SNR than those at 420 kHz (off resonance) repetition rate, which is attributed to residual effects of resonance stability. For a given expansion, SNR can be improved by tuning the laser repetition rate closer to a resonant mode (increasing deflection) but will either plateau at a maximum value of $$\frac{1}{n_3}$$

or possibly reduce due to residual effects of resonance instabilities. For example, the 360 kHz data set shows this reduction in SNR for increasing deflection, indicated by the blue arrow of FIG. 17a, suggesting the noise increases nonlinearly. Although the CL signal is affected by resonance stability, it still exhibits optimal noise compared to OL as shown in the line profiles of the inset of FIG. 17a. This critical advance over the state-of-the-art allows for high-sensitivity resonance enhanced detection of small signal variations over large DC bias signals which can amplify noise.

For the small deflection regime shown in FIG. 17a, the signal is dominated by constant, electronic noise $$\left(n_1 = 735\left[\frac{\mu V}{\sqrt{Hz}}\right]\right)$$

regardless of modulation frequency; however, these conditions are typically only realized when measuring small, isolated absorbers on IR compatible substrates. Regardless, the present disclosure may quantify the minimum detectable expansion signal to serve as a standard of comparison between near-field techniques using the measured electronic noise (collected while imaging) and cantilever responsivity. FIG. 17b shows the measured cantilever responsivity (blue dots) plotted with the transfer function fit (black line) following the procedure, details of the curve fit procedure are provided in the methods section. The transfer function is scaled such that the y-intercept (at 0 Hz) is equal to the slope of the measured force curve of the cantilever used $$\left(9.2\left[\frac{V}{\mu m}\right]\right)$$

and then subsequently divided by the lock-in gain $$\left(3514\left[\frac{V}{V}\right]\right)$$

to relate OL deflection voltage to harmonic expansion. The combination of constant electronic noise (at low deflection) and responsivity allows for defining a Noise Equivalent Expansion (NEE) shown in FIG. 17c. This metric is analogous to the Noise Equivalent Power (NEP) of conventional photon detectors and offers a direct way of assessing the limits of detection on resonance as well as forming comparisons between detectors such as paddle probes and optical resonance cavities. The CL design with a standard 450 µm cantilever is capable of detecting subpicometer expansion signals of $$0.16\left[\frac{fm}{\sqrt{Hz}}\right] \text{ and } 0.2\left[\frac{fm}{\sqrt{Hz}}\right]$$

for the $3^{rd}$ (360 kHz) and $6^{th}$ (1030 kHz) resonance modes respectively. Operating off resonance at fixed 420 kHz is an order of magnitude higher $$\left(1.72\left[\frac{fm}{\sqrt{Hz}}\right]\right).$$

These figures of merit can be improved with more sensitive mechanical probes combined with the low noise achieved with CL controls. The design of such probes could be guided and optimized by the analysis provided here. Moreover, this metric could also allow for comparing other near-field methods provided additional details relating absorption to expansion.

Photothermal Phase Imaging for Routine Compositional Mapping of Monolayers. With current state-of-the-art AFM-IR, spectra are often normalized by known absorption peaks for removing unwanted baseline signal; however, this approach is influenced by competing factors such as cantilever responsivity and thermal relaxation effects and cannot be used arbitrarily to ensure reliable analytical measurements. CL responsivity corrected AFM-IR offers two unique properties to address this issue for routine nanoscale compositional mapping: reliable baseline correction and accurate phase detection. To demonstrate the importance of the enabled methods, a 20 nm thick 1951 USAF resolution target is fabricated using SU8 photoresist on various substrate. The samples are then coated with 100 nm PMMA photoresist similar to previous disclosure with polymer embedded samples or polymer coated substrates. The coating approach, however, improves imaging fidelity and is less restrictive than previous methods allowing for sample preparation on the intrinsic substrate surface essential for preparation of Self-Assembled Monolayers and many applications in nanoelectronics such as 2D material-based devices on Silicon. While the PMMA coating is not necessary for detecting the SU8 molecular signal, similar embedded samples are often unavoidable and present a challenge for accurate spectral analysis. The closed-loop design inherently allows for simple subtraction of PMMA spectra for correction.

Figure 18:
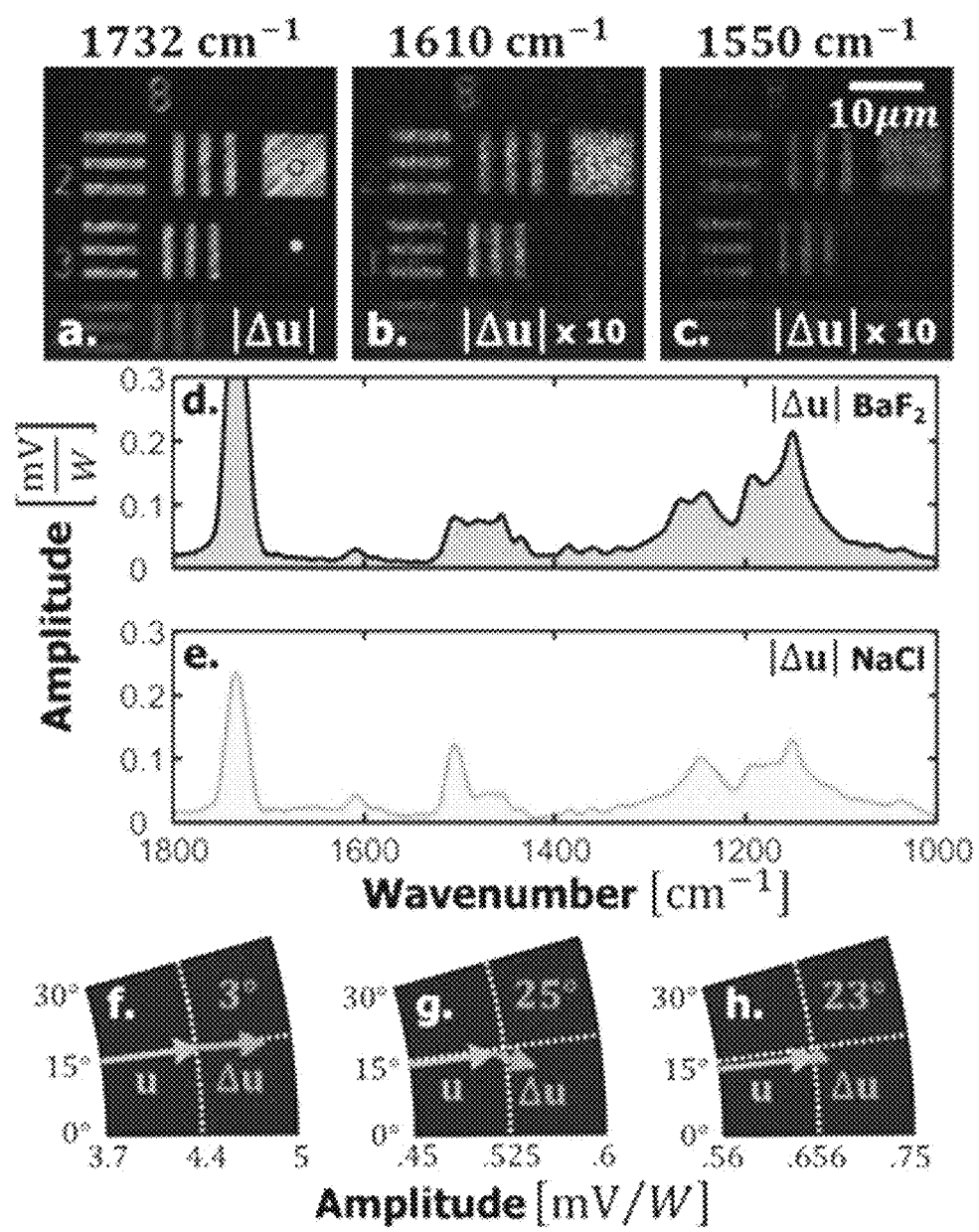
FIG. 18 describes a method for processing the complex-valued closed-loop signal for mapping monolayer composition in one or more of the embodiments.

FIG. 18 describes a complex-valued baseline correction for mapping monolayer composition. (a), (b) and (c) Closed-Loop (CL) images at 1732 cm$^{-1}$ (PMMA peak), 1610 cm$^{-1}$ (SU8 peak) and 1550 cm$^{-1}$ respectively of a 20 nm thick SU8 USAF target on a Barium Fluoride (BaF$_2$) substrate coated with 100 nm PMMA. The images are collected at fixed 710 kHz ($5^{th}$ resonance), baseline flattened and scaled as shown. (d) Amplitude of the baseline corrected signal of an SU8 feature on a BaF$_2$ substrate. The spectra has characteristic PMMA features attributed to thermal insulating properties of SU8 which reduce heat losses to the highly conductive substrate $$\left(11.72\left[\frac{W}{mK}\right]\right).$$

(e) same spectra as (d) but on a Sodium Chloride (NaCl) substrate. NaCl has an order of magnitude lower thermal conductivity $$\left(1.15\left[\frac{W}{mK}\right]\right)$$

which results in a reduction of the PMMA signature and a recovery of characteristic SU8 peaks at 1500 cm$^{-1}$ and 1244 cm$^{-1}$ in the baseline flattened data. (f), (g) and (h) Phasor plots with PMMA baseline signal (blue) and the baseline corrected SU8 (green) taken from the blue and green locations from (a) respectively. The PMMA baseline has nearly-constant phase for all wavenumbers; however, the corrected SU8 signal rotates 25° out-of-phase relative to the baseline for the SU8 absorbing band (1610 cm$^{-1}$). This phase-lag is attributed to the thermal diffusion response of the sample and can result in loss of part (if not all) of the SU8 signal when processing conventional AFM-IR amplitude data. Accurate detection of the complex-valued signal using CL operation ensures reliable quantification of the small signals masked by larger baseline signals.

FIGS. 18a, b and c show the CL AFM-IR images of the SU8 target sample on a Barium Fluoride (BaF$_2$) substrate for 1732 cm$^{-1}$, 1610 cm$^{-1}$ and 1550 cm$^{-1}$ respectively. The same baseline flattening method commonly used for processing AFM height images may be applied to correct for DC bias signal associated with polymer embedding techniques (e.g. PMMA coating) or IR absorbing substrates. This approach allows for isolating the photo-induced expansion signal local to the SU8 features and cannot be applied using conventional AFM-IR methods due to spatially varying responsivity contrast. Plotting the SU8 signal extracted from the baseline flattened images as a function of wavenumber highlights the difficulty of previous peak normalization methods when reporting spectra. FIG. 18d shows the spectra collected on an SU8 feature; however, the signal has strong characteristic PMMA peaks at 1732 $cm^{-1}$ and 1150 $cm^{-1}$. Although this is possibly the result of inaccurate baseline flattening or a build-up of PMMA on SU8 during coating, an alternative hypothesis is that the SU8 acts as an insulating layer between the PMMA and thermally conductive $BaF_2$ substrate which enhances the local PMMA signal contribution. Additionally, a disproportionate amount of heat generated in the SU8 will be lost to the substrate adding to the relative PMMA signal contribution; however, this alone is insufficient for describing the observed increase in PMMA signal local to the SU8 feature. To test this hypothesis, the same sample is prepared on a Sodium Chloride (NaCl) substrate which has 10 times lower thermal conductivity than $BaF_2$. Due to the reduced mismatch between PMMA and substrate thermal conductivities, the baseline flattened spectra extracted from the SU8 feature to have reduced PMMA signature. FIG. 18e shows the same spectra for the NaCl substrate revealing an increase in SU8 absorption peaks at 1500 $cm^{-1}$ and 1244 $cm^{-1}$ relative to the PMMA signature. Thermal mechanical properties such as thermal conductivity can influence both raw (DC) and difference (AC) signals. Normalizing raw AFM-IR data by the PMMA 1732 $cm^{-1}$ peak would result in unreliable, difficult to predict signal variability due to the competing influence of cantilever responsivity and thermal relaxation effects (e.g. thermal conductivity variations). The CL AFM-IR signal provides an unbiased way to distinguish these two effects by correcting responsivity directly followed by baseline correction.

Another factor limiting the identification of nanoscale absorbers is inaccurate detection of the photothermal phase signal. FIGS. 18f, g and h show the complex valued baseline signal (u) and the baseline corrected SU8 signal (Δu) collected at the blue and green sample locations depicted in FIG. 18a respectively. For the 1610 $cm^{-1}$ dataset of FIG. 18g, the SU8 signal is 25° out-of-phase with respect to the baseline and an order-of-magnitude weaker. Phase shifted signal can occur as a result of thermal diffusion of a local heat source (such as SU8) to the surrounding material (such as PMMA film or the substrate). Weak, complex signals can be completely subsumed in the expansion phase when competing against large DC bias signals further impeding detection of monolayer materials. The two effects reported here are often missed or overlooked due to noise and inaccurate phase detection of OL AFM-IR methods. The enhanced sensitivity and phase detection achieve with CL AFM-IR enables detection of weak signals produced by monolayer absorbers in arbitrary sample conditions. Consequently, this enables new applications which require proper understanding and reliable processing to fully utilize the signals for characterization of nanoscale devices. Baseline correction processing methods combined with accurate, high-sensitive CL AFM-IR enables routine analytical measurements of nanoscale materials not possible with previous state-of-the-art methods.

Imaging Monolayer Graphene Oxide on Silicon. A number of reports demonstrate high-sensitivity AFM-IR imaging of graphene materials, Self-Assembled Monolayers, and isolated proteins; however, each case relies on gold or polymer coated substrates for enhanced signal. In contrast, full chemical analysis is commonly performed on infrared transparent substrates such as Zinc Selenide[2] for recording accurate nanoscale spectra. The CL methods overcome these challenges enabling accurate compositional mapping and analysis of monolayers prepared on common nanoelectronic materials such as Graphene Oxide (GO) on Silicon.

Figure 19:
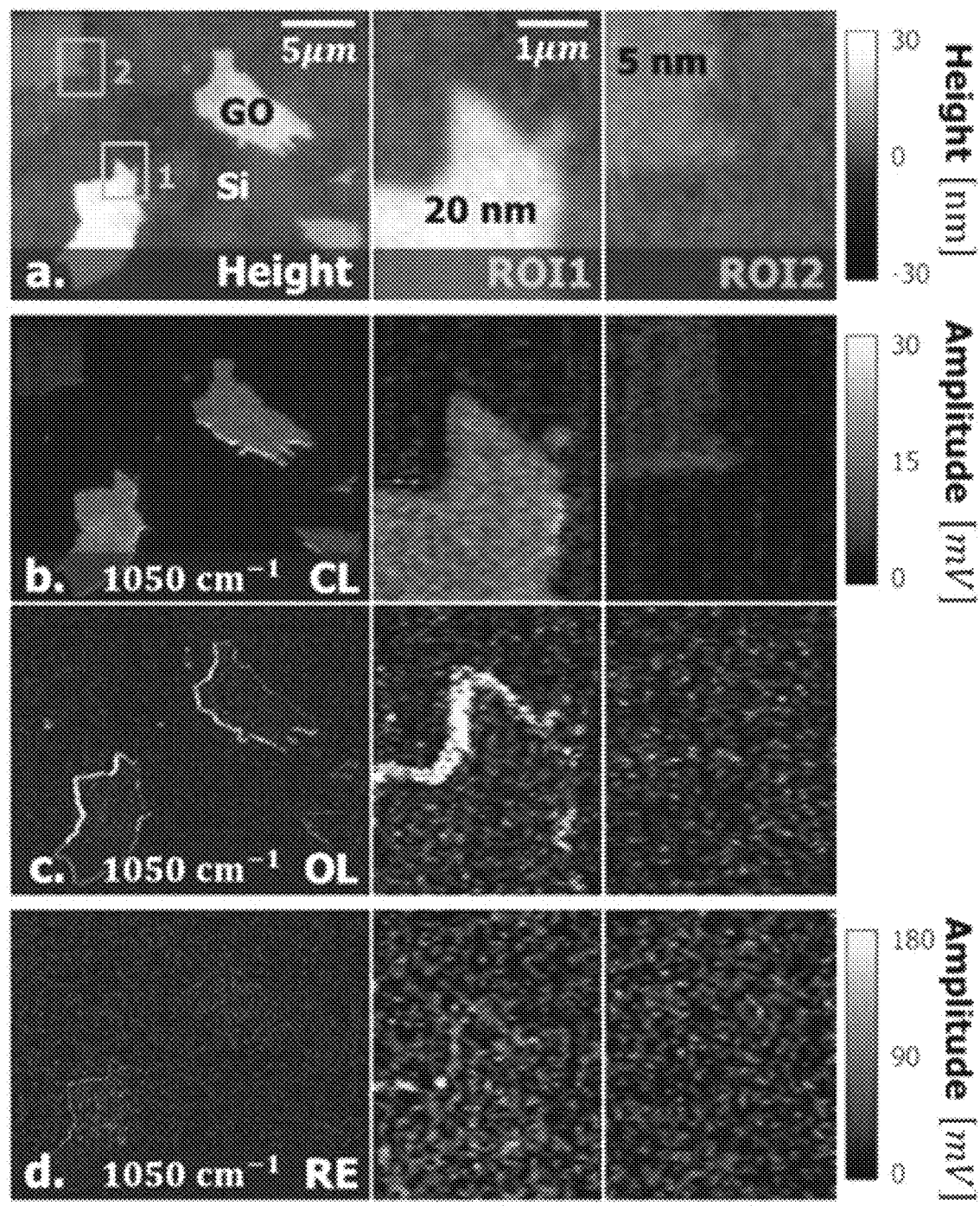
FIG. 19 describes a method for mapping C—O absorption of multi and monolayer Graphene Oxide (GO) on Silicon (Si).

FIG. 19 describes a mapping C—O absorption of multi and monolayer Graphene Oxide (GO) on Silicon (Si). All images depicted here were collected at 0.1 Hz scan rate with 1000×1000 pixels. (a) AFM height map of GO flakes of varying thickness on a Si wafer applied via spin coating. R011 and R012 depict 20 nm and 5 nm thickness GO flakes respectively. (b) Closed-Loop (CL) AFM-IR images of the C—O (1050 cm-1) band for the same regions depicted in (a). (b) Open-Loop (OL) AFM-IR images of the C—O (1050 $cm^{-1}$) band for the same regions depicted in (a). Both OL and CL images were collected at a fixed laser repetition rate of 360 kHz (3rd resonance) and 100% laser power. As expected, the sensitivity of CL is far higher than OL with significantly reduced noise and improved chemical accuracy. (d) Resonance Enhanced (RE) AFM-IR images of the C—O (1050 $cm^{-1}$) band for the same region depicted in (a). Resonance tracking is performed using the commercial Nano-IR2 software with a 20 kHz scan range, 0.01 s scan time and 10 points per scan. Current state-of-the-art RE AFM-IR results in a 10× reduction in pixels with little to no sensitivity improvement due to resonance stability noise.

FIG. 19a shows the AFM height image of multilayer Graphene Oxide with zoomed regions of 20 nm and 5 nm thick flakes. FIG. 19b shows the corresponding CL C—O (1050 $cm^{-1}$) absorption signal of the same region demonstrating sufficient sensitivity capable of detection photothermal signal down to near monolayer thicknesses. In comparison, FIG. 19c and d show the same regions for OL and RE AFM-IR respectively; however, these prior state-of-the-art methods have significant levels of noise (most likely due to resonance instability) with little chemical contrast. In fact, only changes in responsivity near edges result in observable signal. This not only provides an incomplete chemical image of the material but may mislead practitioners into optimistic estimates of resolution and sensitivity in AFM-IR data reported thus far. Moreover, in addition to reduced noise, the RE data set is collected at 40% total laser power due to saturation of the deflection signal further reducing the sensitivity benefits of operating on resonance.

The present disclosure describes the CL method, which opens new opportunities for nanoscale devices and technology. This makes AFM-IR compatible with common nanoelectronic materials and allows for characterization of materials in the environments that they will be used, rather than the environments in which they provide measurable signal. The CL approach used here further opens other characterization possibilities. The combination of CL AFM-IR with Scanning Joule Expansion Microscopy, for example, could provide high-sensitive, co-registered nanoscale maps of oxide content and Joule heating in reduced GO-based circuits to better understand and improve methods for tuning GO electrical conductivity. The ability to reliably map composition of 2d materials on arbitrary substrates has a number of potential industrial applications for metrology and quality control.

Embodiment Two: Summary and Conclusion

Figure 14:
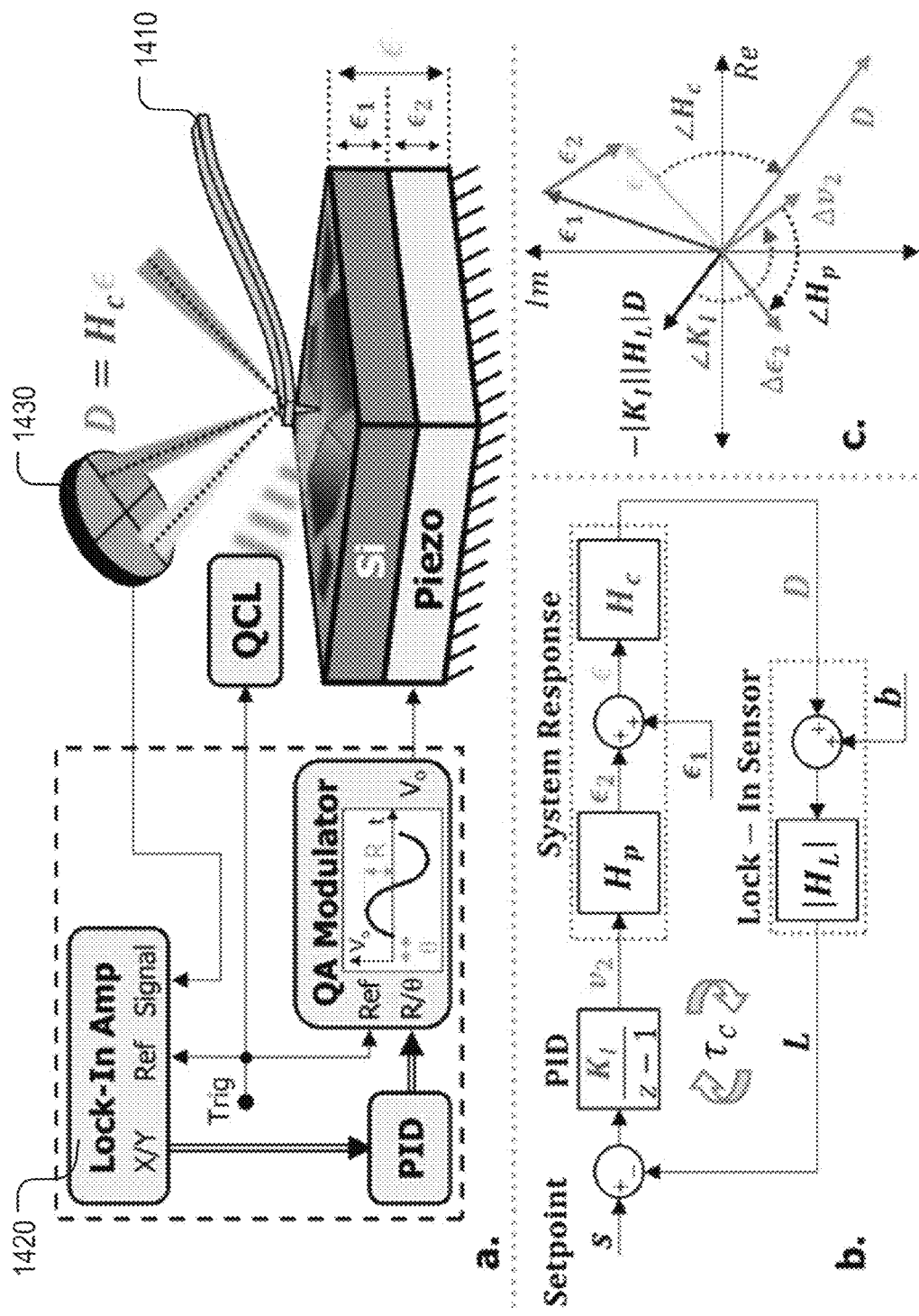
FIG. 14 describes a closed-loop (CL) piezo controller design in one or more of the embodiments.

The present disclosure describes a method and apparatus including an usage of an AFM-IR and a custom built circuit and software for controlling piezo signal generation, as shown in FIG. 14. A closed loop configuration may include that a piezo signal is proportional to the cantilever response to sample expansion; the piezo signal adjusted according to sample expansion response to maintain a zero set point; and change in voltage determines sample expansion.

Near field spectroscopy methods often require tip- or sample-induced signal enhancement that permit sensitive measurements but also make signal and noise difficult to predict and optimize. Consequently, AFM-IR offers the potential for high sensitivity and fidelity nanoscale chemical imaging but has been limited to small, isolated samples on specific substrates. Here, the present disclosure first demonstrates that the performance of AFM-IR is limited by the effects of time-varying cantilever resonance that result in a significant increase in noise at large cantilever deflection, especially for samples that produce a large DC bias signal. The present disclosure then utilizes this insight to devise a CL AFM-IR approach. As opposed to conventional AFM measurements that emphasize larger cantilever deflections, the CL approach maintains near-zero cantilever deflection while measuring an applied signal to a subsample piezo instead using feedback control. This CL control strategy results in a regime where noise and saturation effects are minimal, enabling high sensitivity IR absorption measurements on arbitrary substrates. The present disclosure provides a complete analysis of the proposed controls for robust, optimal performance. The present disclosure then implements the concept on a standard commercial AFM-IR instrument and characterizes the advancement. The improved sensitivity and reliable phase signal unique to the CL method are shown to improve data collection and processing to enable nanoscale composition mapping on common substrates such as Silicon and glass. This advance augments AFM-IR to provide metrology capabilities to a wide range of fields in need of reliable nanoscale composition imaging such as high frequency nanoelectronics, NEMS and MEMS, and photonics.

The present disclosure describes a new algorithm and/or method for controlling the hardware resulting in piezo control for maintaining zero voltage set point.

The present disclosure describes a method and apparatus including a closed loop implementation to maintain zero set point voltage to determine sample expansion.

Embodiment Two: Methods

Closed-Loop Hardware and Implementation. All AFM-IR data are collected using a modified Nano-IR2 from a vendor, for example but not limited to, Anasys Instruments Corporation (now Bruker Corporation), using a standard Anasys contact mode probe (for example but not limited to, PN PR-EX-nIR2-10). The closed-loop integral controller is implemented using a hardware-timed single point I/O described in the supplementary section. The high-speed deflection voltage of the AFM is accessed via the J12 SMA connector on the back panel of the Nano-IR2 and applied to a SR844 lock-in amplifier. The demodulated X and Y channels of the lock-in (with 10V output) are fed to analog input channels of a PCIe-6361 DAQ (set with 10V dynamic range) and processed with the gain-scheduled integral controller to determine the piezo modulation voltages. The piezo voltages are sent to the analog output channels on the DAQ and applied to the Quadrature Amplitude Modulator (QAM) circuit which is described in the supplementary section. The CL and OL controller signals are mapped to the sample position by counting the pulses of a 20 MHz clock synchronized to start at the beginning of every trace and retrace scan using the Nano-IR2 scan line trigger.

Data Collection and Processing. Resonance enhanced AFM-IR measurements are conducted using the commercial Nano-IR2 software with a 20 kHz scan range, 0.01 second scan time and 10 points per scan for tracking $3^{rd}$ resonance mode. Conventional PTIR measurements are collected by pulsing the laser at 1 kHz while measuring the peak deflection voltage which is band pass filtered at the $2^{nd}$ resonance mode where signal is highest. Averaging of the PTIR signal is adjusted between 4 and 32 scans to maintain CL-equivalent pixel rates, but produced little improvement in SNR. All data are reported with no additional post-processing or smoothing.

Sample Preparation. The 100 nm PMMA film is applied to glass via spin coating at 3000 rpm for 80 seconds using PMMA photoresist from MicroChem Corporation (PN 950PMMA A2). The film is scratched and heated to 160° C. overnight to produce a polymer ramp for thickness measurements. The 4 nm PMMA film is applied to Silicon via spin coating at 3000 rpm using a 16% w/w dilution of the PMMA A2 photoresist in Anisole.

MCF10A normal human mammary epithelial cell line is obtained from a vendor, for example but not limited to, the American Type Culture Collection (ATCC), and cultured using the standard protocol prescribed by ATCC. The cells are grown to a confluency of 40-70% to ensure that they are actively dividing. The cells are then treated with colcemid to achieve a final concentration of 0.5 ug/ml (this can range between 0.5-1.0). These cells are incubated for 10 hours at 37° C. The cell flask is tapped and the colcemid solution is collected in a conical tube. The flask is washed with 10 ml sterile PBS, tapped and the solution is collected into a conical tube. This is subsequently centrifuged for 5 mins at 1000 rpm. Sometimes the cells can be highly adherent to the flask resulting in an insufficient cell yield. In this case, a quick rinse (~1 min) with warm trypsin is done. 3 ml of warm trypsin is added to the flask and incubated for 1 min. The floating cells are checked and 7 ml of fresh warmed (37° C.) media is added. The flask is tapped, and the media and trypsin are collected in a conical tube. All tubes (can be mixed into one) are centrifuged for 5 mins at 1000 rpm. The supernatant is aspirated, and the pellet is gently re-suspended in 5 ml of 0.4% KCL (hypotonic solution). The suspension is incubated for 25 mins at 37° C. Next, 5 ml of fixative (3:1 methanol-acetic acid solution) is added and kept for 10 mins. The tube is centrifuged at 1000 rpm for 10 mins. The pellet is re-suspended in 10 ml of fixative again for 10 mins and this step is repeated three times. To prepare the sample, gold coated Si wafers are first sterilized and snap frozen using liquid nitrogen. 10 μl of cell suspension is dropped to the frozen substrate from a height of about 60 cm (this height is optimized for the system and the desired yield). This caused the swollen nuclei to break and the chromosomes to spread out so that they can be analyzed individually. The samples are placed in a vacuum oven to dry.

Embodiment Two: Supplemental Section

S1: Controller Implementation and Transient Behavior
The integral controller for processing the Lock-In signal is implemented with a hardware-timed I/O in Labview using a data acquisition device, for example but not limited to, a PCIe-6361 DAQ device from National Instruments.

Figure 20:
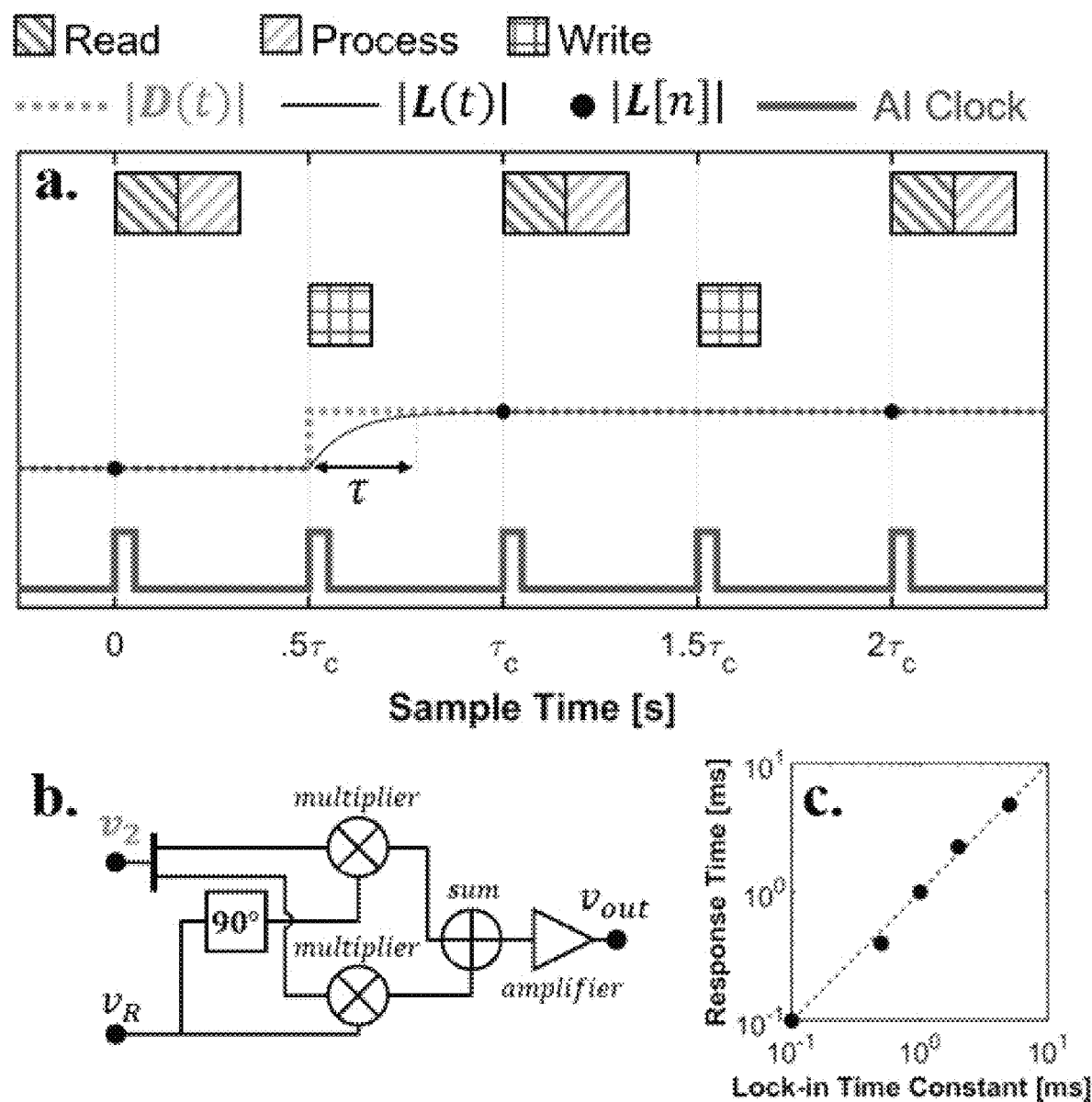
FIG. 20 describes a controller implementation and transient behavior in one or more of the embodiments.

FIG. 20 describes a controller implementation and transient behavior. (a) Hardware timed I/O diagram showing the continuous time lock-in signal L(t) sampled on the rising edge of the Analog Input (AI) clock pulse every controller loop constant $\tau_c$. The sampled, dual lock-in X and Y voltages are processed via the integral controller to produce two analog output voltages which are written to the DAQ analog output (AO) at hardware-timed half steps between AI read operations. The output voltages are wired to the piezo driver circuit at $v_2$ shown in (b) and are used to modulate a 0 and 90 degree shifted periodic (sine) reference voltage $v_R$ thus allowing for analog control of the amplitude and phase of a harmonic voltage used to drive the piezo actuator. The reference voltage $v_R$ and its 90 degree shifted signal are produced with the DAQ and together with the piezo driving circuit form a Quadrature Amplitude Modulator (QAM) (c) Lock-in signal response versus lock-in time constant showing a linear trend down to 100 µs which suggests any transient behavior of the piezo and the cantilever are negligible for $\tau_c$=4 ms. An example perturbation of $v_2$ is depicted in (a) at $0.5\tau_c$ which results (ideally) in an instantaneous change in the high speed, cantilever deflection signal D(t). The lock-in response time $\tau$ must be set less than or equal $0.5\tau_c$ in order to assume the sampled lock-in and deflection signals are identical definitions in the discrete-time description (i.e. L[n]∝D[n]).

The labview code reads the lock-in modulation voltages and stage position on every clock rising edge spaced every $0.5\xi_c$ then discards samples at half-integral time points ($0.5\tau_c$, $1.5\tau_c$, etc.) as shown in Figure a. The half integral clock pulses are used to write the two piezo modulation voltages to the DAQ analog output (AO). This method of hardware timing ensures minimal jitter between read and write operations. The loop time constant $\tau_c$ is set to 4 ms to allow sufficient time for processing the data. The AO piezo modulations voltages $v_2$ are wired to a custom built piezo driver circuit shown in Figure b. The details of the piezo driver circuit are described in section S2. To ensure accuracy of the discrete-time analysis presented in the main text, the continuous-time response of the system (lock-in, cantilever, etc.) has to be faster than the update rate of the controller. Figure c shows the transient response of the deflection signal as a function of the lock-in time constant which suggests the system response is limited only by the time-constant of the lock-in down to 100 µs. Thus, the lock-in time constant must be set such that the signal settle time is less than $0.5\tau_c$ as shown in Figure a. For all data collected here, the lock-in time constant is set to 300 µs resulting in a settle time of about 1.2 ms.

Figure 21:
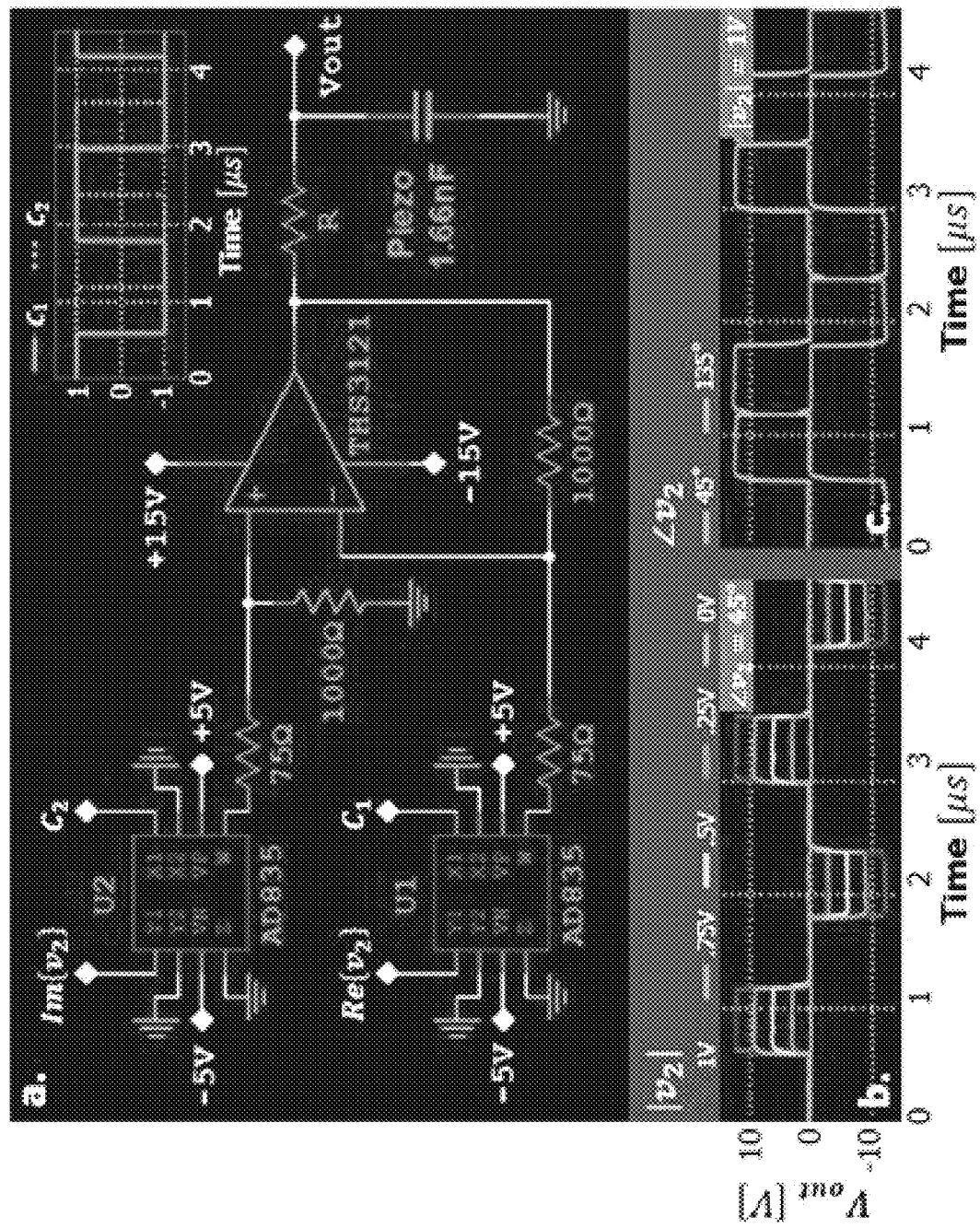
FIG. 21 describes a piezo driver circuit in one or more of the embodiments.

FIG. 21 describes a piezo driver circuit. (a) Piezo driver circuit schematic with two AD835 4-quadrant multipliers and one THS3121 operation amplifier. The multipliers have unity gain with 1V limits on the input pins which are connected to the in-phase and quadrature carrier signals $C_1$ and $C_2$ as well as the piezo modulation control voltage Im{$v_2$} and Re{$v_2$}. The modulated signals are applied to a differential op amp with gain of ~13 resulting in a maximum of 26 Vpp output voltage across the piezo. The piezo actuator is PRYY+0107 from Physik Instrumente (PI) and had a measured capacitance of 1.66 nF. The series resistance R is nominally 0 Ohm and is increased to match the AFM-IR expansion signal. The bandwidth of the circuit is ~10 MHz limited by the capacitive load of the piezo. The inset shows the two carrier signals which were generated and synced with the laser using the DAQ device. (b) Output voltage of the piezo driver circuit at select piezo modulation voltages. (c) Output voltage of the piezo driver circuit at two phase angles of the piezo modulation voltage.

S2: PIEZO Driving Circuit The Quadrature Amplitude Modulator (QAM) is implemented using signals carrier signals generated in the DAQ and applied to the piezo driver circuit shown in FIG. 21a. The carrier signals from the DAQ are produced with two counters synced to the TTL trigger which drives the Quantum Cascade Laser (QCL).

S3: Time-Invariant State-Space Model Defining the closed-loop controller performance analytically requires solving for the time-invariant controller transfer function using the state-space representation from the paper. The following unilateral z-transform definition is used.

$$F(z) = \sum_{n=0}^{\infty} f[n]z^{-n} \quad (45)$$

Here, $f[n]$ is any discrete-time function and F(z) is its z-domain equivalent. Using the discrete-time-invariant state-space matrices, the controller transfer function in z-domain can be defined as follows $$G(z) = B(z - A)^{-1} = -\left(\frac{z-1}{Ke^{i\theta}} + 1\right)^{-1} \quad (46)$$

The time-domain solution is trivially solved by applying the appropriate inverse z-transform to this equations. Moreover, the z-domain form contains information about the performance of the controller such as stability which defines the necessary conditions for convergence of the signal. The controller is stable (and causal) if all the poles of the transfer function are contained in the unit circle in the complex plane. The poles of the transfer function are defined as follows $$z_P = 1 - Ke^{i\theta} \quad (47)$$

Thus, the controller output converges (or is stable) provided the controller gain is set within a shifted unit circle. The step response of the system reported in the main text can be derived as the product of the transfer function and step input z-transform as follows $$S(z) = G(z)(1 - z^{-1})^{-1} \quad (48)$$

The n-domain step response can be determined with the method of partial fractions and inverse z-transforms or by use of Mathematica or Matlab symbolic math resulting in the following $$s[n] = \begin{cases} \delta[n] - 1 & Ke^{i\theta} = 1 \\ (1 - Ke^{i\theta})^n - 1 & \text{else} \end{cases} \quad (49)$$

This is the step response used for characterization. The settle time of the controller can be defined as the time for the step response to be within some designated error band of unity. The settle time is a positive, real number which satisfies the following $$|s[T_s - 1] + 1| = e \quad (50)$$

This relation describes a continuous bound to the step response shifted to approach 0 at infinite time to allow for defining the error band e. The definition is also shifted in time such that the minimum response is a single pixel. Using the n-domain definition of the step response, the bound can be written as follows $$|s[n]+1| = (K^2 - 2K\cos(\theta) + 1)^{\frac{n}{2}} \quad (51)$$

This result can be applied to the settle time definition with an error bound e=0.1.

A single sampled value of the state-space output (or any random, complex signal) can be described as the sum of expectation value of y and a zero-mean, random complex-valued signal for the noise component. The most appropriate definition of SNR of such a signal is the magnitude of its expected value divided by Root Mean Square (RMS) average of the noise magnitude as follows.

$$SNR = \frac{|E\{y\}|}{\sqrt{E\{|y-E[y]|^2\}}} = \frac{|E\{y\}|}{\sqrt{\text{Var}\{y\}}} \quad (52)$$

The RMS average is simply the definition of the variance of the complex-valued output. The challenge is to define this in terms of the input signal using the convolution properties of the transfer function. By applying the convolution definition of the transfer function to the output and commuting operations, the following is obtained $$|E\{y[n]\}| = \left|\sum_{l=0}^{\infty} g[l]E\{u[n-l]\}\right| \quad (53)$$

Here, the input u may be assumed to have a constant expectation value for all time as is the case for the measurement of a uniform polymer film used for characterization or stationary operation. Thus, the expectation value of input is a constant and can move outside the sum. By definition, the sum of g[l] is equal to negative one allowing for the following result $$|E\{y\}| = |E\{u\}| \quad (54)$$

To complete the analysis of SNR, a similar relation for variance may be needed. The variance of a complex-valued random variable can be split into sum of the variance of the real and imaginary terms. Applying this operation, using the convolution definition of the output and commuting operations; the following may be shown $$\text{Var}\{y\} = \sum_{l=0}^{\infty} |g[l]|^2 \text{Var}\{u[n-l]\} \quad (55)$$

As previously used, the input u may be assumed to have the same statistics (in this case variance) for all time points. Thus, the variance of the input is a constant and can move outside the sum resulting in the following $$\text{Var}\{y\} = \frac{K^2}{2K\cos(\theta) - K^2} \text{Var}\{u\} \quad (56)$$

Applying this definition and equations (54) and (52) results in the SNR relation.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for correcting responsivity variation in photothermal imaging, the method comprising:
    sending, during a first time period, a light-driving signal to a light source so that the light source is configured to output a series of light pulses onto a sample, wherein the sample is under photothermal-induced expansion according to the series of light pulses;
    obtaining, during the first time period, a first deflection signal from a cantilever, wherein the cantilever is configured to interact with the sample;
    sending, during a second time period, an actuator-driving signal to an electromechanical actuator so that the electromechanical actuator is configured to move according to the actuator-driving signal, wherein the electromechanical actuator is coupled with the sample;
    obtaining, during the second time period, a second deflection signal from the cantilever; and
    obtaining a photothermal image of the sample based on the first deflection signal and the second deflection signal.

2. The method according to claim 1, wherein:
    the cantilever is a part of an Atomic Force Microscope (AFM);
    the electromechanical actuator is configured to move along an out-of-plane direction based on the actuator-driving signal; and
    the light source is configured to output infrared (IR) light.

3. The method according to claim 1, wherein:
    the first time period and the second time period are consecutive time periods.

4. The method according to claim 3, wherein the obtaining the photothermal image of the sample based on the first deflection signal and the second deflection signal comprises:
    obtaining a raw-sample image based on the first deflection signal;
    obtaining a raw-actuator image based on the second deflection signal; and
    obtaining the photothermal image based on the raw-sample image and the raw-actuator image.

5. The method according to claim 4, wherein the obtaining the photothermal image based on the raw-sample image and the raw-actuator image comprises:
    dividing the raw-sample image by the raw-actuator image to obtain the nanoscale photothermal image.

6. The method according to claim 3, further comprising:
    obtaining the light-driving signal based on a first Transistor-Transistor Logic (TTL) pulse-train signal; and
    obtaining an actuator-driving signal based on a second TTL pulse-train signal.

7. The method according to claim 1, wherein:
the first time period and the second time period are concurrent time periods; and
the first deflection signal and the second deflection signal are same deflection signal.

8. The method according to claim 7, further comprising:
feeding the first deflection signal to a closed loop controller; and
obtaining, by the closed loop controller, an updated actuator-driving signal based on the first deflection signal and a pre-determined setpoint, so that a resulting deflection signal is zero.

9. The method according to claim 8, wherein the obtaining, by the closed loop controller, the updated actuator-driving signal based on the first deflection signal and the pre-determined setpoint comprises:
obtaining the updated actuator-driving signal by calculating:
$v_2[n+1]=v_2[n]+K_I[n](s-L[n])$, wherein n is a positive integer, $v_2[n+1]$ is the updated actuator-driving signal at a time point n+1, $v_2[n]$ is the actuator-driving signal at a time point n, $K_I[n]$ is a time-varying integral gain at the time point n, s is the pre-determined setpoint, and $L[n]$ is a demodulated lock-in voltage at the time point n.

10. The method according to claim 1, wherein:
the electromechanical actuator comprises a piezo actuator; and
the light source comprises a quantum cascade laser (QCL).

11. The method according to claim 1, wherein:
the electromechanical actuator comprises a nanoscale stage configured to comprise a flat frequency response over a pre-determined frequency range.

12. The method according to claim 11, wherein:
the pre-determined frequency range comprising a frequency range between 1 KHz and 2 MHz.

13. An apparatus for correcting responsivity variation in nanoscale photothermal imaging, the apparatus comprising:
a memory storing instructions; and
a processor in communication with the processor, when the processor executes the instructions, the processor is configured to cause the apparatus to:
send, during a first time period, light-driving signal to a light source so that the light source is configured to output a series of light pulses onto a sample, wherein the sample is under photothermal-induced expansion according to the series of light pulses,
obtain, during the first time period, a first deflection signal from a cantilever, wherein the cantilever is configured to interact with the sample,
send, during a second time period, an actuator-driving signal to an electromechanical actuator so that the electromechanical actuator is configured to move according to the actuator-driving signal, wherein the electromechanical actuator is coupled with the sample,
obtain, during the second time period, a second deflection signal from the cantilever, and
obtain a photothermal image of the sample based on the first deflection signal and the second deflection signal.

14. The apparatus according to claim 13, wherein:
the cantilever is a part of an Atomic Force Microscope (AFM);
the electromechanical actuator comprises a piezo actuator configured to move along an out-of-plane direction based on the actuator-driving signal;
the light source is configured to output infrared (IR) light; and
the light source comprises a quantum cascade laser (QCL).

15. The apparatus according to claim 13, wherein:
the first time period and the second time period are consecutive time periods.

16. The apparatus according to claim 15, wherein, when the processor is configured to cause the apparatus to obtain the photothermal image of the sample based on the first deflection signal and the second deflection signal, the processor is configured to cause the apparatus to:
obtain a raw-sample image based on the first deflection signal;
obtain a raw-actuator image based on the second deflection signal; and
obtain the photothermal image based on the raw-sample image and the raw-actuator image.

17. The apparatus according to claim 16, wherein, when the processor is configured to cause the apparatus to obtain the photothermal image based on the raw-sample image and the raw-actuator image, the processor is configured to cause the apparatus to:
divide the raw-sample image by the raw-actuator image to obtain the photothermal image.

18. The apparatus according to claim 13, wherein:
the first time period and the second time period are concurrent time periods; and
the first deflection signal and the second deflection signal are same deflection signal.

19. The apparatus according to claim 18, wherein, when the processor executes the instructions, the processor is configured to further cause the apparatus to:
feed the first deflection signal to a closed loop controller; and
obtain an updated actuator-driving signal based on the first deflection signal and a pre-determined setpoint, so that a resulting deflection signal is zero.

20. The apparatus according to claim 19, wherein, when the processor is configured to cause the apparatus to obtain the updated actuator-driving signal based on the first deflection signal and the pre-determined setpoint, the processor is configured to cause the apparatus to:
obtain the updated actuator-driving signal by calculating:
$v_2[n+1]=v_2[n]+K_I[n](s-L[n])$, wherein n is positive integer, $v_2[n+1]$ is the updated actuator-driving signal at a time point n+1, $v_2[n]$ is the actuator-driving signal at a time point n, $K_I[n]$ is a time-varying integral gain at the time point n, s is the pre-determined setpoint, and $L[n]$ is a demodulated lock-in voltage at the time point n.

* * * * *